US009020769B2

(12) United States Patent
Rada et al.

(10) Patent No.: US 9,020,769 B2
(45) Date of Patent: Apr. 28, 2015

(54) AUTOMATIC DETECTION OF APPLIANCES

(75) Inventors: Patrick A. Rada, San Jose, CA (US); John H. Magnasco, San Jose, CA (US)

(73) Assignee: Geneva CleanTech Inc., San Jose, CA (US)

(*) Notice: Subject to any disclaimer, the term of this patent is extended or adjusted under 35 U.S.C. 154(b) by 757 days.

(21) Appl. No.: 13/013,764

(22) Filed: Jan. 25, 2011

(65) Prior Publication Data

US 2011/0251807 A1 Oct. 13, 2011

Related U.S. Application Data

(63) Continuation-in-part of application No. 12/694,171, filed on Jan. 26, 2010, now Pat. No. 8,447,541, and a continuation-in-part of application No. 12/694,153, filed on Jan. 26, 2010, now Pat. No. 8,450,878.

(Continued)

(51) Int. Cl.
*G01R 21/00* (2006.01)
*G01D 4/00* (2006.01)

(52) U.S. Cl.
CPC .............. *G01D 4/00* (2013.01); *Y02B 90/245* (2013.01); *Y04S 20/38* (2013.01); *Y04S 20/40* (2013.01); *Y04S 20/46* (2013.01)

(58) Field of Classification Search
USPC ............ 705/63, 412; 702/60, 62, 64, 81, 130, 702/176, 188–189; 700/83, 295, 297; 361/437
See application file for complete search history.

(56) References Cited

U.S. PATENT DOCUMENTS

| | | |
|---|---|---|
| 6,993,417 B2 | 1/2006 | Osann, Jr. |
| 7,272,518 B2 | 9/2007 | Bickel et al. |
| 7,483,797 B2 | 1/2009 | Nambu |
| 7,541,941 B2 | 6/2009 | Bogolea et al. |

(Continued)

FOREIGN PATENT DOCUMENTS

| | | |
|---|---|---|
| JP | 04331422 | 11/1992 |
| JP | 10304568 | 11/1998 |

(Continued)

OTHER PUBLICATIONS

Guy et al., Pathways to 'Smarter' Utility Meters: the Socio-Technical Shaping of New Metering Technologies. Electronic Working Paper No. 23, University of Newcastle upon Tyne, School of Architecture, Planning & Landscape, Global Urban Research Unit. Published Dec. 1995. Retrieve fro m internet <URL:hhtp://www.ncl.ac.uk/guru/assets/documents/ewp23.pdf>.

(Continued)

*Primary Examiner* — Elias Desta
(74) *Attorney, Agent, or Firm* — Haverstock & Owens LLP

(57) ABSTRACT

Devices and methods for identifying an electrical device, and its state, in a network of electrical devices are disclosed. An energy monitoring device is programmed to identify an electrical device coupled to a power supply, and a state of the electrical device, from a change in successive measurements of the power supply. Algorithms for determining a load signature for an electrical device and its state are disclosed. A stored table of load signatures for states is used to identify devices, and states. Energy monitoring information is collected and presented to the user on a display, a remote display, or is transmitted over a network to a remote device such as a personal computer, personal digital assistant, an iPhone®, a cell phone, voice mail, email, or text message.

37 Claims, 28 Drawing Sheets

Related U.S. Application Data

(60) Provisional application No. 61/435,921, filed on Jan. 25, 2011, provisional application No. 61/435,658, filed on Jan. 24, 2011, provisional application No. 61/434,250, filed on Jan. 19, 2011, provisional application No. 61/298,112, filed on Jan. 25, 2010, provisional application No. 61/298,127, filed on Jan. 25, 2010, provisional application No. 61/206,051, filed on Jan. 26, 2009, provisional application No. 61/206,072, filed on Jan. 26, 2009.

(56) References Cited

U.S. PATENT DOCUMENTS

| | | |
|---|---|---|
| 2005/0043907 A1 | 2/2005 | Eckel et al. |
| 2008/0106241 A1 | 5/2008 | Deaver et al. |
| 2008/0224892 A1 | 9/2008 | Bogolea et al. |
| 2008/0262820 A1* | 10/2008 | Nasle ............................. 703/18 |
| 2009/0045804 A1 | 2/2009 | Durling et al. |
| 2009/0195349 A1 | 8/2009 | Frader-Thompson et al. |
| 2009/0206059 A1 | 8/2009 | Kiko |

FOREIGN PATENT DOCUMENTS

| | | |
|---|---|---|
| JP | 63202225 | 12/1998 |
| JP | 2003037937 A | 2/2003 |
| JP | 2005073459 A | 3/2005 |
| JP | 2008048536 A | 2/2008 |
| RU | 2131611 | 10/1999 |

OTHER PUBLICATIONS

International Search Report and Written Opinion dated Apr. 6, 2011, PCT Application No. PCT/US2011/022474, filed Jan. 25, 2011, Geneva CleanTech Inc.

International Search Report for PCT Application No. PCT/US2012/022430 dated Jan. 24, 2012.

* cited by examiner

400

| Public Usage Database | | | | | |
|---|---|---|---|---|---|
| IP Address | Zip Code | User Type | Sq.Ft. | Usage Type | Total KWH |
| 128.0.0.128 | 12345-7890 | Residence | 1750 | Electronics | 56 |
| 128.0.0.128 | 12345-7890 | Residence | 1750 | Appliances | 550 |
| 128.0.0.128 | 12345-7890 | Residence | 1750 | Heating/cooling | 750 |
| 128.0.0.128 | 12345-7890 | Residence | 1750 | Lighting | 450 |
| 12.34.56.78 | 12345-7890 | Business | 9500 | Electronics | 750 |
| 12.34.56.78 | 12345-7890 | Business | 9500 | Heating/cooling | 1200 |
| 12.34.56.78 | 12345-7890 | Business | 9500 | Lighting | 500 |
| 12.34.56.78 | 12345-7890 | Business | 9500 | Office Equipment | 2500 |
| 85.0.1.237 | 12345-8000 | Industrial | 20000 | Drill press | 5000 |

| Public Load Signature Database ||||||
| Mfr. | Model | Description | State | Voltage | Load Sig. |
|---|---|---|---|---|---|
| Phillips® | MO699SST | Microwave | Defrost | 110 | |
| Generic | Drill | ¼ HP hand drill | ON – FAST | 110 | |
| Generic | A/C Unit | 12000 BTU portable | ON - HIGH | 110 | |
| Generic | Light Bulb | 40W incandescent | ON | 110 | |
| Generic | Coffee maker | 10 cup, drip brew | BREWING | 110 | |
| Samsung® | LN0B750 | 40" LCD television | On | 110 | |
| Samsung® | LN0B750 | 40" LCD television | Standby | 110 | |
| Maytag® | MHWE950WW | Washer | Fill | 110 | |
| Maytag® | MHWE950WW | Washer | Wash | 110 | |
| Maytag® | MHWE950WW | Washer | Rinse | 110 | |
| Maytag® | MHWE950WW | Washer | Spin | 110 | |
| Maytag® | MEDE900VW | Dryer, electric | Dry – High heat | 220 | |
| Maytag® | MEDE900VW | Dryer, electric | Dry – Medium heat | 220 | |
| Maytag® | MEDE900VW | Dryer, electric | Dry – Tumble | 220 | |
| Maytag® | MEDE900VW | Dryer, electric | Off | 220 | |
| Sylvania® | 60W | Incandescent bulb | On | 110 | |
| Sylvania® | 60W | Incandescent bulb | Off | 110 | |
| Toshiba® | LT-1000 | Laptop computer | On | 110 | |
| Toshiba® | LT-1000 | Laptop computer | Standby | 110 | |
| Toshiba® | LT-1000 | Laptop computer | Off | 110 | |

AUTOMATIC DETECTION OF APPLIANCES

CROSS-REFERENCE TO RELATED APPLICATIONS

This application is a continuation-in-part of the co-pending U.S. patent application Ser. No. 12/694,171, filed Jan. 26, 2010, and titled "ENERGY USAGE MONITORING WITH REMOTE DISPLAY AND AUTOMATIC DETECTION OF APPLIANCE INCLUDING GRAPHICAL USER INTERFACE," which claims the benefit of U.S. Provisional Patent Application Ser. No. 61/206,072, filed Jan. 26, 2009 and entitled "ENERGY USAGE MONITORING WITH REMOTE DISPLAY AND AUTOMATIC DETECTION OF APPLIANCE INCLUDING GRAPHICAL USER INTERFACE", under 35 U.S.C. §119(e), U.S. Provisional Patent Application Ser. No. 61/298,127, filed Jan. 25, 2010, and entitled "AUTOMATIC DETECTION OF APPLIANCES", under 35 U.S.C. §119(e), and U.S. Provisional Patent Application Ser. No. 61/435,658, filed Jan. 24, 2011, filed by inventors Patrick A. Rada and John H. Magnasco, under 35 U.S.C. §119(e), and titled "AUTOMATIC DETECTION OF APPLIANCES", all of which are incorporated by reference. This application is also a continuation-in-part of U.S. Non-provisional patent application Ser. No. 12/694,153, filed Jan. 26, 2010, and titled "METHODS AND APPARATUS FOR POWER FACTOR CORRECTION AND REDUCTION OF DISTORTION IN AND NOISE IN A POWER SUPPLY DELIVERY NETWORK," which claims the benefit of U.S. Provisional Patent Application Ser. No. 61/206,051, filed Jan. 26, 2009 and entitled "POWER FACTOR AND HARMONIC CORRECTION METHODS", under 35 U.S.C. §119(e), U.S. Provisional Patent Application Ser. No. 61/298,112, filed Jan. 25, 2010 and titled "POWER FACTOR AND HARMONIC CORRECTION METHODS", under 35 U.S.C. §119(e), U.S. Provisional Patent Application Ser. No. 61/434,250, filed Jan. 19, 2011, filed by inventors Patrick A. Rada and John H. Magnasco, and titled, "POWER FACTOR AND HARMONIC CORRECTION METHODS", under 35 U.S.C. §119(e), U.S. Provisional Patent Application Ser. No. 61/435,921, filed Jan. 25, 2011, filed by inventors Patrick A. Rada and John H. Magnasco, and titled, "POWER FACTOR AND HARMONIC CORRECTION METHODS", under 35 U.S.C. §119(e), all of which are hereby incorporated by reference in their entirety for all purposes.

U.S. Non-provisional patent application, U.S. patent application Ser. No. 13/013,737, filed Jan. 25, 2011, filed by inventors Patrick A. Rada and John H. Magnasco, and titled, "METHODS AND APPARATUS FOR POWER FACTOR CORRECTION AND REDUCTION OF DISTORTION IN AND NOISE IN A POWER SUPPLY DELIVERY NETWORK" is hereby incorporated by reference for all purposes.

FIELD OF THE INVENTION

The present invention relates to the field of monitoring energy usage. More specifically, the present invention relates to monitoring the detailed energy usage of an electrical device in a network of electrical devices such as in a home or small office from a single point in the network.

BACKGROUND OF THE INVENTION

Department of Energy studies have shown as much as 15% reduction in energy usage just by making consumers aware of how much energy they are using and the costs associated with their energy usage. An analogous result has been shown in the hybrid automobile market. A hybrid vehicle driver can increase their gas mileage and reduce their energy usage by utilizing feedback provided to the driver as to their usage. Energy consumers have also become aware of the environmental impact of their energy usage, often expressed as a "carbon footprint." Thus, reduction in energy usage translates into both economic and ecological benefits for energy users. But, in order to make choices on how best to reduce usage, an energy user needs relevant energy usage information about the devices and usage patterns comprising his energy usage.

Current solutions for reducing home and office energy usage include monitoring total, aggregate power usage of a plurality of electrical devices at a single power supply point, monitoring power usage at one or more wall outlet power supply points, controlling the state of individual devices through timed, programmatic control of devices, and manually controlling devices by observing that one or more electrical devices are on, but not in use, and switching the device(s) off.

Aggregate Power Monitoring

The simplest, and most widespread, aggregate power usage monitoring system found in the prior art is a power utility monitoring the total usage of a customer via a power meter located at the customer's supply point, located near the branch off of the main distribution grid. The power meter accumulates total power used, the meter is actually read once per fixed period, such as a month, and the customer is billed for the power that the customer used in that billing period. Utilities have billing rates which are tiered, where a higher rate is charged per kilowatt hour (KWH) after a certain usage threshold is reached. Some tariff schedules charge a higher rate per KWH based upon usage at peak demand times. Utility bills will often breakdown the total power usage in accordance with the tariff schedule to show customers how much power was charged at each tariff rate. With this information, there are few facts available to a customer with which to make power saving decisions.

Newer aggregate monitoring systems can comprise a customer power meter downstream of the utility meter. The customer power meter is usually installed at, or near, the customer's main circuit breaker downstream of the utility meter. The customer power meter reads the total amount of power being used by the customer at specified increments, and shows this value on a display. The meter information may be transmitted to a personal computer where the power meter readings can be processed. One example of such a device is "WATTSON", made by DIY KYOTO in London, England. A corresponding product, "HOLMES", also made by DIY KYOTO, processes the information received from WATTSON to give the customer a more granular view of their total power consumption with respect to the time of day. However, this still only gives the customer a view of total power used, and how the total power usage is distributed in time over the billing period.

Monitoring Power Usage at Each Power Outlet

Another method of monitoring power usage is to monitor the usage at each power outlet in a power distribution system. In some example products, an electrical device plugs into the power outlet monitor which in turn plugs into the wall power outlet. The power outlet monitor may comprise an LCD display for displaying the total KWH used, the cost of such usage, and the current voltage, amperage, watts, Hz, and volt-amps active on the outlet. An example product is "Kill A Watt™" made by P3 International. This device enables a user to monitor power usage at a particular wall outlet via an LCD display, but the data is not stored for retrieval and analysis. The "Energy Logger and Power Usage Analyzer" made by Extech further comprises storage for data logging, wherein usage data can be stored and later transferred to a personal computer by an on-board memory in the energy logger. If an energy user has more than one Extech logger, the power usage information acquired by each logger is not aggregated. Collection of power usage data requires manual retrieval of the memory card in each wall outlet power monitor and retrieval of the information from each card with a computing device having memory card reading capability, before the data can be analyzed. Further, the usage data is only as granular as the device count per outlet. For example, if a multi-outlet power strip, with devices plugged into each outlet, is plugged into a wall outlet power monitor, the power usage for each device is not measured. Moreover, the cost to measure the power can become impractically high as each power outlet monitor may cost $50.00 or more, and one such device is required for every power outlet to be monitored. The large initial hardware cost of monitoring equipment, the inconvenience of manually retrieving and reading each outlet monitor memory card, and the indeterminate savings based on reduced power usage, if any, make monitoring power usage at each power outlet an impractical solution to reducing energy usage.

Monitoring Usage at Each Circuit Breaker

Yet another method of monitoring aggregate power usage is to monitor the usage at each circuit breaker, thereby monitoring the power usage for each circuit. Such a system, with an associated iPhone® application is named WattBot, described in the *CHI 2009—Student Design Competition* entry by Dane Peterson, Jay Steele and Joe Wilkerson. In their paper, *WattBot: A Residential Electricity Monitoring and Feedback System*, the authors describe a system similar to DIY KYOTO's Wattson, described above, except that Watt-Bot measures the power used by each circuit of a house, rather than measuring the usage of power for the whole house. Energy information is displayed on the iPhone®. WattBot requires hardware to sense and monitor the energy used on each circuit, and WattBot does not give detailed usage information for a single electrical device unless the electrical device is dedicated to a single circuit on the circuit breaker for the house. Even if a single circuit is dedicated to a single device, WattBot does not give detailed energy usage by each state of the electrical device.

Manual Monitoring and Control

A consumer of electrical power can always walk through their home or office periodically, making note of devices which appear to be on but not in use, and turning off those devices in order to reduce power usage. While this method may save money without an associated equipment cost, no data is acquired for analysis of devices deemed appropriate to be left on or devices improperly seen as being off, when in fact they are actually consuming power. Importantly, many modern electronic devices have a "standby" state which consumes power without giving the visible appearance of the device being powered on. Thus, a consumer manually monitoring their devices would not know the cost or effect of power usage associated with devices appearing to be off, but in fact consuming energy in standby mode.

Programmatic Control of Individual Devices

Yet another method of reducing energy consumption is to programmatically control one or more devices to ensure that the devices are turned off when non-use is anticipated. For example, a system for programmatically controlling electrical devices may schedule a certain device, such as an overhead light in the den, to be off between the hours of 11 p.m. and 6 a.m. because it is anticipated that the den will not be used during those hours. Such systems require control circuits for each outlet or power control, such as a dimmer or switch, and a central controller to manage the electrical device network programming. For example, INSTEON® Smartlabs design products, sold by Smarthome™, can comprise INSTEON® network controllable devices such as dimmers, switches, thermostat controls, and appliance outlets using a device network protocol such as INSTEON® or X10 protocol, or a combination of both, coupled to a central controller. Such a system has the benefit of programmatically controlling the operation of electrical devices, but it requires a substantial commitment to hardware, installation and associated costs without any identified cost-saving information reported to the user to make decisions on how to reduce their power usage.

Current solutions for reducing home and office energy usage include monitoring total, aggregate power usage of a network of electrical devices at a single power supply point, monitoring power usage at one or more wall outlet power supply points, controlling the state of individual devices through programmatic control, and manually observing that one or more electrical devices are on, but not in use, and switching the device(s) off. Monitoring power usage at the supply point does not provide sufficient information regarding the power consumed by electrical devices in order to determine power usage associated with a specific device. Solutions which monitor power usage at the power outlet either do not aggregate power usage information for analysis or aggregate such information only by manual means and at a high equipment cost. Even if automated aggregation of usage information were available, a substantial investment in monitoring equipment is required by the current means. The prior art lacks a low cost, effective means to provide detailed energy usage information regarding individual electrical devices in a home or business. The prior art further lacks an effective means to aggregate detailed energy usage information regarding individual devices for presentation to an energy user so that the energy user can make meaningful changes in their energy usage behavior to reduce energy usage and energy costs.

SUMMARY OF THE INVENTION

An energy monitoring device is disclosed which provides low cost, real-time monitoring of energy usage of each electrical device in a home or business from a single, central location with no requirement for additional hardware or wiring any electrical devices in the home or business. The energy monitoring device includes an I/O module for interfacing other sensors systems present on a property to the energy monitoring device. Alternatively, other sensors systems present on the property can be interfaced to the energy monitoring device by a home network system. Other sensor systems include, but are not limited to, a home security system with a window sensor, a door sensor, a motion detector, a sound sensor, and a light sensor, a home weather system, flow meter sensors such as for gas, water, steam, pressurized gases, and fuel oil, and temperature sensors including the temperature of water in a hot water heater, air temperature in a room in a building on the property where the energy monitoring device is located, steam temperature, refrigerator temperature, freezer temperature, and oven temperature. The energy monitoring device can detect and identify an electrical device on the property, detect the state of the device such as ON, OFF, 30% of maximum power, or STANDBY, and measure the energy consumed by the device. Interfacing other home systems and sensors to the energy monitoring device can create a power tool for reducing energy usage, and improving a user's ability to manage their property. The following examples illustrate just a few commonly occurring situations where the energy monitoring device, interfaced to other home systems and sensors, help a user reduce energy and manage their property.

Examples

In a first example, the property owner is at work, and her daughter has just returned home from school, but has forgotten to close the front door completely. It is 100° F. outside, the air conditioner is running, and cool air is going out the front door, wasting energy. The energy monitoring device detects that the air conditioner is running. The home security system door detector detects, and reports to the energy monitoring system, that the front door is ajar. The home security system motion detector detects and reports to the energy monitoring system that a person is in the house. The energy monitoring system generates and transmits a message to the property owner to call home to the daughter to close the front door.

In another example, a home weather system detects, and reports to the energy monitoring system, that it is currently raining and 42° F. outside. The home security system detects, and reports to the energy monitoring system, that a window is open. The energy monitoring system detects that the heater is running. The gas meter reports to the energy monitoring system that gas is flowing through the meter, confirming that the heater is on. The energy monitoring system generates and transmits a message to the property that the window is open, the heater is on, and it is raining. The property owner can choose to come home and close the window to save heating energy and reduce property damage due to raining coming in the window.

In yet another example, the property owner is at work. A temperature sensor in the oven can detect and report to the energy monitoring device that the oven temperature is at 400° F., and is therefore ON. A gas meter on the property is interfaced to the energy monitoring device, and reports gas consumption to the energy monitoring device. If the oven is electric, the energy monitoring device detects that the oven is ON by its load signature and power consumption. The energy monitoring device generates and transmits to the property owner a message that the oven is ON. The property owner can call a neighbor to come turn off the oven.

In another example, the property owner is subscribed to a utility demand response program. On a hot day with a temperature over 100° F., the high peak electricity demand for cooling units exceeds the capacity of the power network at a specific time. The utility sends a demand response command to all subscribers to avoid a general blackout. The property owner's energy monitoring system receives the command and shuts off the HVAC automatically for 3 hours. The energy monitoring device then sends a message to the owner to inform the property owner of the demand/response action. The property owner can rearrange his schedule to come home when the cooling unit on his property has been back on long enough to cool his home on the property.

A user who is curious about how much energy is consumed, and what it costs, to take a hot bath with his whirlpool tub can use the energy monitoring device to determine the total costs for his bath. The energy monitoring device is interfaced to the gas meter and water meter to measure gas and water usage and costs. The energy monitoring device can detect the starting of the whirlpool jet pump motor. After his bath, the use can view the gas, water, and electricity usage and costs associated with the bath, including warming the water, circulating the water, and furnishing the water for the bath. The result can be viewed, broken down by each usage and cost component.

In another example, a user can monitor his irrigation costs by monitoring water usage in conjunction with the energy monitoring device. The energy monitoring device can detect that an automatic irrigation cycle has been started. The energy monitoring device monitors the water used during the irrigation cycle. The water usage and electricity usage can be stored and compared against prior usage data to determine the total cost of irrigation. Analysis can include detecting variances from past irrigation cycles, by minute, hour, day, week, month, season or year. By comparing current usage with past data, the user can determine whether he has a leak in an irrigation line as compared to a prior data.

In yet another example, a solar panel system having two series strings of panels where the strings are coupled in parallel on a property having an energy monitoring device. Wind has blown leaves and debris on two of the sixteen panels, reducing the output of the two obstructed panels. The two obscured panels are in difference series strings of solar panels. The energy monitoring system has detected that the solar panel system production has fallen by 35% nominal. The energy monitoring system, interfaced with a home weather system, monitors the outdoor ambient light and determines that the outdoor sunlight has not substantially changed, as might be due to clouds or rain. No rainfall has been measured, but an increase in wind velocity has been detected. Thus, the energy monitoring devices sends a warning notice to the property owner that the solar panel system production has unexpectedly fallen by 35% and that the solar panel system should be examined. The property owner can then inspect the panels, see the debris on two panels, clear the debris, and restore his solar energy production without waiting for a month to receive a bill that his solar energy production was lower than expected.

In an ultra-compact implementation, the energy monitoring device is able to comprise a single integrated circuit or chip, programmed with the features described below. The energy monitoring device is installed downstream of the utility energy meter, upstream of the circuit breaker panel, upstream of the network of electrical devices installed in the home or business, and without any additional connection to the electrical devices. In an alternative embodiment, the energy monitoring device is installed in an open slot in the circuit breaker panel in the same form factor of a typical circuit breaker unit. The energy monitoring device is able to automatically detect when loads are turned on or off and can identify which load was switched on or off. Loads are identified by detecting a load signature for each state of each electrical device installed in the electrical network of devices. Each electrical device in the network of electrical devices is able to be identified by its load signatures and states. The state, and load signature for each state, of an electrical device is able to be acquired during a learning phase. The learning phase can be automated or performed with manual steps. To facilitate the manual learning phase, a user of the energy monitoring device is able to populate a data store with information about the location and characteristics of the electrical devices in the home or small business. This private information is able to be stored in a private database comprising a list of electrical devices, rooms of the house or small business, and possible states of the electrical devices. The process of populating the data store of private information is able to be facilitated by an application running on a portable electronic device such as a Smart Phone, a cellular phone, a personal digital assistant, or other portable device comprising a user display and user input interface. The private database is able to be downloaded to the energy monitoring device via a communications connector on the energy monitoring devices, or via a network connection, wired or wireless. The more devices and states which a user pre-identifies, the easier the manual learning phase will be. Private database and private information refer to information generated by a particular energy monitoring device, information related to the persons, devices, structure or attributes of any of these, where a particular energy monitoring device is installed. Examples of private information include the name of users in a home or business structure in which an energy monitoring device is installed, the specific devices installed in the structure, the rooms in the structure, the usage information generated by a user when the user does not intend to share the usage information, the user's power bill, et al. "Public database" and "public information" refer to information generated for use by the public, accessible to the public, or generated by the public. Examples of public information include load signatures for devices and states created for public use or public access, public usage information which a user has chosen to share, which would otherwise be private, tariff schedules published by utilities or Public Utilities Commissions, notifications of power outages, and other broadcast information from a utility. The terms "public database" and "private database" refer both to the data contained within a database, generically, and the database structures disclosed herein, and their equivalents, not limited to any particular data format. It will be readily apparent to one skilled in the art that various methods of handling, storing and accessing the data and information can be employed with the methods not limited to those described. Databases and tables are only one method among many that could be effectively used in an implementation of the system.

In a manual learning phase, the energy monitoring device prompts the user to change the state of one of the devices in the private database. The user then changes the state, and either notifies the energy monitoring device that the state has been changed, or permits the energy monitoring device to detect the change. The load signature is computed and presented to the user for editing and/or acceptance. Alternatively, the user is able to skip the detection of the load signature for a single state of a device, or skip the load signature detection of all states for a device. If the user accepts the load signature data, then the load signature and associated state are stored in a load signature table. The load signature table is able to be maintained inside the energy monitoring device in a memory dedicated for that purpose, or in a general purpose memory. In an automated learning process, the energy monitoring device monitors the power supply for changes in one or more power supply parameters to signal that an electrical device within the home of office has changed state. The energy monitoring device then computes a load signature from the changed data, or takes additional samples as needed, and computes the load signature. The next step is to identify the signature to an appliance by comparing it to a list of devices from the private database and a public database of load signatures. The public database of load signatures includes the signatures of numerous possible appliances and load signatures for the states of the appliances. The public database of load signatures is not limited to the load signatures of a particular home or small business. After the signature has been identified, and a corresponding appliance and state have been identified, the result is presented for the user to edit and accept, or the system times out and accepts the data.

By identifying the load signature and the state for each electrical device, the energy monitoring device is able to provide detailed energy usage for each electrical device that consumes energy in the home or small business. The detailed energy usage information for each electrical device can be displayed on the energy monitoring device, a remote display device such as a Smart Phone (i.e., an iPhone®, Droid®, Blackberry®), a tablet PC, a PDA, or remote laptop, or on a local personal computer. The detailed energy usage information can be displayed generally through any wired or wireless device. Detailed energy usage information can comprise power consumption, energy, current, power factor, THD, spectral content and other relevant parameters that benefit the user. Energy usage information is able to be tracked by time of day, elapsed time, week, month, year, and season for comparison. Energy costs can be calculated and displayed showing the current consumption rate in dollars per hour as well as cumulative costs over a period. The energy monitoring device can provide projections of energy consumption by week, month, quarter, season or year based on the history of energy usage tracked by the energy monitoring device. Detailed energy usage information can further comprise specific information about electrical devices having a standby mode of operation, and information about energy consumption at off hours, such as the night time or when a user is away on vacation. Detailed energy usage information can also comprise advice to the end-user such as how to reduce their monthly electrical bill. This may include adding devices to improve the power factor, replacing old or inefficient appliances, or alternatively, advice on how to correct time-of-day scheduling of energy usage for a more favorable use of a tariff schedule, or suggesting of an alternate tariff schedule. Detailed energy usage information is further able to be used to optimize the settings of various appliances such the temperature setting of a refrigerator. Advice information is further able to comprise notices from a power utility such as urgent warnings from the utility, offers or incentives, notices of tariff schedule changes, or notice that a user's account is due or past due. The energy monitoring device is also able to monitor the quality of the network and notify the user as to weak power factor, weak total harmonic distortion, under-performance or noisy grid, and ways to improve or correct these inefficiencies.

An energy monitoring device is disclosed which is coupled to a power supply, such as a grid power supply, having an electrical device coupled to the power supply downstream of the energy monitoring device, the electrical device having a plurality of states. In one aspect, an energy monitoring device is programmed to identify the presence of an electrical device coupled to a power supply, and a state of the electrical device, from a change in successive samples of the power supply taken at a point upstream of the electrical device to be monitored, and the energy monitoring device is further programmed to monitor an additional input coupled to the energy monitoring device. The additional input is able to be coupled to a flow meter. The flow meter is able send usage information to the energy monitoring device regarding the commodity that the flow meter is measuring. In some embodiments, the flow consumption over a period of time, or measured volume, and associated cost can be sent to the energy monitoring device. The energy monitoring device can additionally download rate schedules for utilities such as water and natural gas. The meter can measure the flow or volume of water, steam, gas, oil, fuel oil, air, or inert gas. One skilled in the art will recognize that the flow meter can measure the flow or volume of a wide variety of commodities. In some instances, these data can be coupled with load data and correlated to improve signature detection algorithms. In some embodiments, the additional input can be coupled to a home security system. The home security system can transmit status information to the energy monitoring system for any of the home security system inputs. Such inputs include whether a window is open or closed, whether a door is open or closed, whether a motion detector detects a motion, whether an audio sensor detects a sound, and whether a light sensor detects light. The additional input can further be coupled to a temperature sensor. The temperature sensor can transmit temperature information to the energy monitoring device. The temperature sensor can monitor the temperature of a room in a structure on the property where the energy monitoring device is located, hot water in a hot water heater, the air temperature outside a structure on the property, the air temperature inside a structure on the property, the air exiting a heating ventilating and air conditioning unit, steam temperature, refrigerator temperature, freezer temperature and an oven temperature. The additional input can further be coupled to a home weather system. Weather information can be transmitted to the energy monitoring device, including inches of rain, air speed, temperature in the sun, temperature in the shade, barometric pressure, and humidity. Any of the foregoing information that is transmitted to the energy monitoring device can be relayed to the property owner. The programmed energy monitoring device comprises at least one of selected and interconnected discrete components, a microprocessor, an application specific integrated circuit (ASIC), a programmed field programmable gate array (FPGA), and one or more configured and interconnected integrated circuits, including analog-digital mixed mode. The energy monitoring device is able to be as small as a single integrated chip set, programmed to interact with an iPhone® or similar consumer electronic device running a user interface application. Power supply parameters are defined as the value of one or more measured parameters of the power supply and the computed parameters which can be derived from the measured parameters. In a preferred embodiment, the power supply parameters include phase voltage, phase current, neutral voltage, neutral current, apparent power, active power, reactive power, energy, elapsed time for energy consumed, the power factor percentage, cos(phi), the total harmonic distortion of the current, voltage, active power, reactive power, an approximation of the total harmonic distortion taking into account a limited number of harmonics (e.g. up to the $15^{th}$ harmonic), spectral content of the current, voltage, active power, reactive power, and fundamental active power, frequency, period, over/under-voltage, conditions, time to establish full power or settling time, in-rush current, sags and number of periods for the events, quality of the network, and other non-electrical data such as time, date, temperature, and humidity. The voltage and current values can be collections of instantaneous sample values, stored as a one-dimensional table, or calculated as an RMS value computed from averaging or integrating a one dimensional table of sample values.

RMS values can also be derived from a fixed moving window of "n" points, and therefore be available e.g. every millisecond after an initial set time of, e.g., 1 second. An example table of recorded and/or computed data for a single-phase, 2-wire configuration is shown below:

TABLE I

| Power supply parameter | Example Value(s) |
|---|---|
| RMS Phase Voltage [$V_{AC}$] 0-max | 112 |
| RMS Phase Current [$A_{AC}$], 0-max | 4.7 |
| RMS Neutral Voltage [$V_{AC}$], 0-max | 2.4 |
| RMS Neutral Current [degree], 0-360 | 4.6 |
| RMS Apparent Power [VA], 0-max | 645 |
| RMS Active Power [W], 0-max | 527 |
| RMS Reactive Power [$V_{AR}$], 0-max | 167 |
| Energy [J], 0-max consumed in time $T_1$ [sec] | 2340, 7456 |
| Power factor [%], 0-100 | 87 |
| Phase Current THD to, e.g. $25^{th}$ harmonic[%] | 14 |
| Phase Current THD to, e.g. $5^{th}$ harmonic [%] | 12.7 |
| Phase Voltage THD to, e.g. $25^{th}$ harmonic [%] | 2.1 |
| Phase Voltage THD to, e.g. $5^{th}$ harmonic [%] | 1.8 |
| Frequency [Hz], 40-70 | 59.5 |
| Quality of the network [%], 0-100 | 96 |
| Time, Date | (09:37 pm, Dec. 04, 2009) |
| Temperature, C. ° | 28 |
| Humidity [%] | 43 |
| Vector AA = Instantaneous Current [A], n samples | (12.1, 13.5, 14.5, 15.1, 13.8, 11.9, 8.2, 5.6, 2.1, −0.1, −2.8) |
| Vector VV = Instantaneous Voltage [V], n samples | (65, 78, 99, 107, 112, 103, 87, 64, 21, 3, −34) |

A sample is defined as (i) one or more instances of one or more power supply parameters, measured or computed, without regard to a time interval, (ii) one or more instances of one or more power supply parameters, measured or computed, within a fixed time interval, or (iii) RMS values computed from one or more instances of one or more power supply parameters, measured or computed. Detecting a change in successive samples is defined as (i) detecting a change in one or more power supply parameters in a first sample against one or more parameters in a second sample, wherein the sample interval is not a fixed interval, (ii) detecting a change in one or more power supply parameters in a first sample against one or more parameters in a second sample, wherein the sample interval is a fixed interval, (iii) detecting a change in one or more parameters in a first sample against all subsequent samples until a change is detected as against the first sample, (iv) detecting a change in one or more power supply parameters in a first sample against a second sample and, subsequently setting the first sample equal to the second sample before obtaining a next sample; and (v) comparing RMS values of a base sample of one or more power supply parameters against each subsequent sample. Electrical device states can comprise on, off, standby, power down, power up, a percentage of full power, or a named sequence of states. Identification of the presence of an electrical device is accomplished by monitoring the power supply parameters and detecting a change in one or more of the power supply parameters. The load signature corresponding to the electrical device and to the electrical device's state comprises one or more of the power supply parameters as shown in Table I, above. The load signature, an identifier for the electrical device, and a state of the electrical device can be stored in the private database in a memory. In some embodiments, identifying the electrical device and the state can comprise lookup up the load signature in a memory. The load signature can be looked up in a first group of load signatures corresponding to a plurality of electrical devices predetermined to be most probable to yield a matching load signature. A group can be predefined by a user entering a list of electrical devices into the group. A group can also be determined by the energy monitoring device recognizing a pattern in the loads turned on or off in a particular period of time, such as 6:30 a.m. to 7:30 a.m., when a user may be getting ready for work. A second group can also be created. The second group can have a lower probability of yielding a match to the load signature to be looked up. Each load signature and device in a group can have a probability associated with it. If a load signature is looked up in the group, and not found, the nearest non-matching signature can have its probability lowered. If the probability of the drops below a specified threshold, then the electrical device and load signature can be dropped to a lower group, such as from the first down to the second group.

The memory in the energy monitoring device is able to comprise a plurality of pre-stored signatures. The energy monitoring device can further comprise a communications module, coupled to a remote device via a network, in some embodiments. The energy monitoring device is able to transmit to at least one of the energy monitoring device display module, and a remote device. The communications module is able to both transmit and receive energy monitoring information. Energy monitoring information is able to comprise electrical device information, power usage information, electrical network information, user advice, and power utility information. Examples of electrical device information can comprise an identifier of an electrical device in the plurality of devices, the state of the electrical device, the load signature data of the device for a state of the device, and the power utilization information associated with the device. Examples of power usage information are able to include, but are not limited to, aggregate power consumption information, energy, current, power factor, and total harmonic distortion. Electrical network information is able to comprise weak power factor, weak THD, noisy grid, and circuit performance. User advice is able to comprise information to the user of the availability, or past due date, of a utility bill, advice on how to reduce the bill, usage information categorized by electrical device, predicative usage information based upon past usage patterns, advice on how to improve power factor, when to replace old or inefficient appliances, and detection and advice of planned or unplanned power outage.

In another aspect, computing the load signature for the electrical device and the state comprises the steps computing the active power, P, as the difference between the active power in the first power supply parameters and the active power in the second power supply parameters, computing the total active power, PT, including all of the harmonics and noise, computing the reactive power, Q, as the difference between the reactive power in the first power supply parameters and the reactive power in the second power supply parameters, computing the total reactive power, QT, including all of the harmonics and noise, computing the RMS voltage, U, and computing the total active power spectrum, comprising "n" values. In some embodiments, the method further comprises computing the harmonics and noise in the total reactive power, QT_THD, as the difference between the total reactive power QT and the reactive power Q, computing the harmonics and noise in the total active power, PT_THD, as the difference between the total active power PT and the active power P, substituting QT_THD for QT in the load signature, and substituting PT_THD for PT in the load signature. For continuously variable loads, computing the load signature can comprise correlating the data elements of the load signature with the data elements of a second load signature representing second state of an electrical device capable of producing a continuously variable load. In some embodiments, detecting a change in at least one power supply parameter can comprise detecting a change in the active power, the reactive power, or the apparent power. A method of determining the energy used by an electrical device coupled to a power supply can further comprise receiving additional power supply parameters, after detecting a change in at least one power supply parameter, and before computing the load signature for the electrical device.

In some embodiments, sampling a plurality of power supply parameters comprises measuring one of phase voltage, phase current, neutral voltage, neutral current, apparent power, cos(phi), period, frequency, active energy, reactive energy, frequency, period, over/under-voltage conditions, temperature, and humidity. The states of an electrical device can comprise off, on, standby, power up, power down, a percentage of full power, and a named sequence of states. In some embodiments, the load signature for the electrical device and the state is able to comprise phase voltage, phase current, neutral voltage, neutral current, apparent power, cos (phi), active energy, reactive energy, apparent power, frequency, period, over/under-voltage conditions, percentage of power factor, RMS current, instantaneous current, RMS voltage, instantaneous voltage, current harmonic THD percentage, voltage harmonic THD percentage, quality of the network percentage, time, date, temperature, and humidity. In some embodiments, the load signature is able to comprise the measured active power, the measured reactive power, the computed apparent power, the computed current based on the nominal voltage of the power supply, and the computed power factor. In some embodiments, energy monitoring information can be transmitted to one or more of a display device and a remote device, including a cell phone such as an iPhone®. Energy monitoring information is able to comprise electrical device information, power usage information, electrical network information, user advice, and power utility information. Electrical device information is able to comprise an identifier of an electrical device in the plurality of electrical devices, the state of the electrical device, the load signature data of the device, and the power utilization associated with the device. Power usage information can comprise aggregate power consumption information, energy, current, power factor, and total harmonic distortion (THD). Electrical network information is able to comprise weak power factor, weak THD, noisy grid, and circuit performance. In some embodiments, user advice is able to comprise informing the user of a current daily, weekly, or monthly bill, how to reduce the bill, predictive information regarding future power usage based upon patterns of usage, bill information by categorized by electrical device, how to improve power factor, when to replace old or inefficient appliances, what time of day to schedule device usage to lower the bill, detection and advice as to utility power interruption. In some embodiments, power utility information comprises a tariff change notice, a planned power outage, an imminent power cut-off, a bill due, a suggestion as to how to reduce power bill costs, an incentive offer, a power bill, and an estimated forecast power bill.

In still another aspect, a method of creating a database of load signatures for a plurality of electrical devices having a plurality of states, comprises selecting an electrical device in a first state, measuring a first plurality of power supply parameters, changing the state of the selected electrical device to a second state, measuring a second plurality of power supply parameters, computing a load signature, and storing a database record comprising the load signature, the second state, and an identifier for the selected device, thereby creating a database of load signatures for a plurality of electrical devices having a plurality of states. A first state is able to be OFF and a second state is able to be ON. A method of creating a database of load signatures is further able to comprise looking up the load signature in a database to determine a nearest matching electrical device and state, after computing the load signature, presenting the nearest matching electrical device and state to a user for confirmation of the electrical device and state, and accepting user changes to at least one of the electrical device and state in a database record further comprising the load signature, if the user changes the electrical device or state.

BRIEF DESCRIPTION OF THE DRAWINGS

FIG. 4 illustrates a diagram of a public power usage database according to some embodiments.

FIG. 5 illustrates a diagram of a public load signature database according to some embodiments.

DETAILED DESCRIPTION OF THE DRAWINGS

A preferred embodiment of an energy monitoring device comprises an energy meter coupled to a power supply system wherein the energy meter makes successive samples of power supply parameters. The power supply parameters are further able to be processed by a controller with a memory. The measurements are able to be used to display current energy usage information and to compute a load signature for a state of an electrical device coupled to the power supply 190, wherein the electrical device has one or more states. At a minimum, a monitored electrical device will have a number of states including an ON state, during which the electrical device will have be an electrical load, and most often will also have an OFF state in which the electrical device will not act as a load or the load will be reduced. Other intermediate states are possible, including a STANDBY state, where an electrical device can visually appear to be OFF, but the electrical device is consuming some amount of power to maintain its STANDBY state. In STANDBY, an electrical device typically can achieve the ON state faster than if the device were powered up from the OFF state.

Figure 1A:
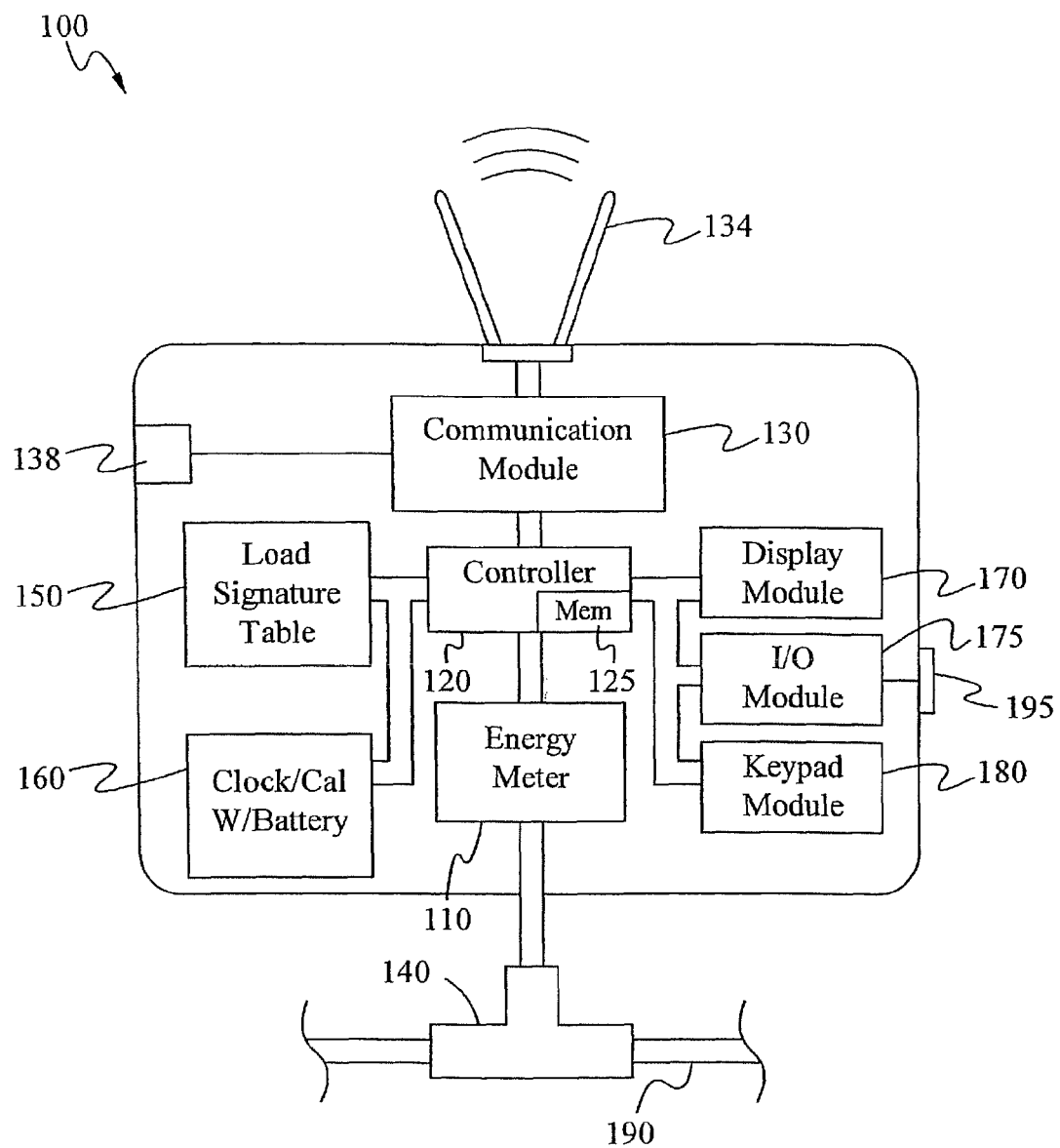
FIG. 1A illustrates a diagram of the internal components of an energy monitoring device coupled to a power supply according to some embodiments.

An energy monitoring device can further comprise a controller or processor, a memory, and a communications module. The controller or microprocessor is able to obtain successive power supply measurements from the energy meter and transmit the power supply measurements to a remote device for processing. Processing of power supply measurements can include storing the measurements, typically with a date/time stamp, computing a load signature for a state of an electrical device coupled to the power supply based on a change in the successive power supply measurements, displaying power usage information including kilowatt-hours used, power usage trends over time, and cost information. The energy monitoring device is able to further comprise, e.g., a USB interface coupled to the communications module. The USB interface is able to be coupled to a personal computer, e.g., for downloading software upgrades to the energy monitoring device, or other data exchange Energy Monitoring Device FIG. 1A illustrates an energy monitoring device 100 coupled to a power supply 190 via a power supply connection 140, which is able to be grid power supplied by a utility, through a meter, to a mains box, and into a home or small business. The power supply is able to comprise any of a wide variety of known power supply types such as 110V single phase, 110V three phase, 440V three phase, 220V three phase, 380V three phase, et al. The power supply 190 is further able to comprise DC voltage sources such as a self-powered structure with a solar panel, DC generator, or other non-grid power supply. The energy monitoring device 100 comprises an energy meter 110, a controller 120 with a memory 125, a communications module 130, a memory for a load signature table 150, a clock/calendar with a battery backup 160, a display module 170, an I/O module 175 with an associated I/O connector 195, an input module 180, a wireless antenna 134, and a USB port 138. The I/O module 175 and associated connector 195 enable the energy monitoring device to monitor other, non-electrical, devices such as a gas meter, a water meter, and a home security system. One skilled in the art of embedded systems design would recognize that the controller 120, memory 125, load signature table 150, communications module 130, and energy meter 110 could be implemented as a single system on a chip, the system on a chip having dedicated modules and resources for these functions, or having memory and programming to perform these functions. The energy meter 110 makes successive measurements of the power supply 190. Such measurements can include one or more of phase voltage, phase current, neutral voltage, neutral current, apparent power, cos(phi), active energy, reactive energy, frequency, period, over/under-voltage conditions, quality of the network percentage, time, date, temperature, and humidity. The controller 120 further includes a memory 125 programmed with instructions for computing a load signature from successive power supply measurements. The controller can be a programmed device which is able to comprise at least one of: selected and interconnected discrete components, a microprocessor, an application specific integrated circuit (ASIC), a programmed field programmable gate array (FPGA), and one or more configured and interconnected integrated circuits. The clock/calendar module 160 is coupled to the controller 120 such that the controller is able to date/time stamp the energy meter measurements. A display module 170 comprising a display and a display interface is coupled to the controller 120 such that power supply usage information is able to be displayed on the display 170. An input module 180 can comprise a plurality of keypads and a keypad interface such that the controller 120 is able to perform different functionality in response to a user's inputs. The display module 170 and the input module 180 are able to comprise a touch screen module 176 (not shown). A default display mode for the display is able to comprise display of the power being used, or a graph trend line of power usage over a specified period of time. The energy A person of skill in the art of embedded system design would recognize that any of the data measured, computed, or analyzed by the energy monitoring device is able to be displayed on the display module 170. The controller 120 is further coupled to a communications module 130. The communications module 130 is able to communicate using one or more protocols including RS-232 serial communication, RS-485 serial communication, IEEE 802.11 wireless, IEEE 802.15 wireless, Zigbee® wireless, Blue Tooth® wireless, USB, IEEE 802.3x, IEEE-1394, IEEE 802.15.4, I$^2$C serial communication, Ida. or other communications protocol. The communications are further able to comprise secure (encrypted) transmission protocols to maintain privacy. As shown in FIG. 1A, the communications module 130 is coupled to a USB port 138 and a wireless antenna 134 in some embodiments. The memory 125 and the load signature table 150 are both able to be read or written to via the communications interface. For example, the USB port 138 can be used to upgrade the software stored in memory 125. Energy meter information and load signature information are able to be communicated to remote device(s) via the wireless antenna 134. The controller 120 is further able to be programmed to compute and store load signatures in the load signature table memory 150. The controller 120 is also able to retrieve load signatures from the load signature table 150. The load signature table memory 150 is able to further comprise memory for storing private databases, described further below, configuration information, and other uses.

Figure 1B:
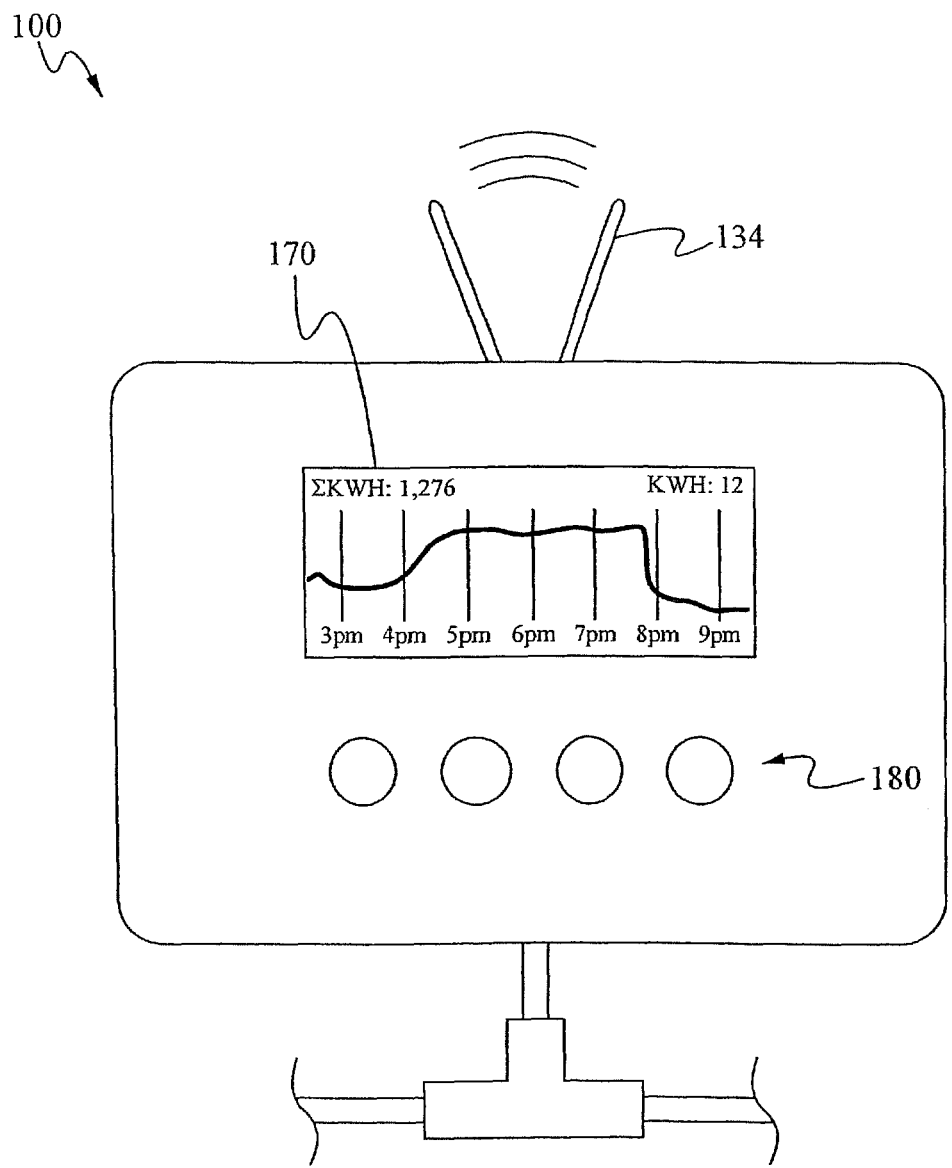
FIG. 1B illustrates a diagram of an external view of an energy monitoring device coupled to a power supply according to some embodiments.

FIG. 1B illustrates an energy monitoring device coupled to a power supply according to some embodiments. In FIG. 1B, a power usage trend line is shown on the display 170, with total kilowatt-hours ("1 KWH") of power used and the current kilowatt-hours ("KWH") used, displayed over an hourly trend line. In some embodiments, the energy monitoring device is able to display power consumption, energy, current, power factor, THD, and spectral content by time, time of the day, week, month, and season. Energy monitoring information is able to be transmitted to a remote device via communications module 130 and, for example, a wireless antenna 134. Utilizing the input module 180, alternate views of energy usage information (not shown) can be displayed, such as energy usage for a specific device, energy usage per room or per floor, energy usage per circuit, energy usage per type of appliance, mixed display where for instance energy usage is mixed with logos of appliances turned on and/or colors are providing information, a list of connected devices and their current state, a list of devices in a specific state and their energy usage information. The keypads are also able to be used to select configuration screens and enter energy monitoring device configuration information.

Figure 2:
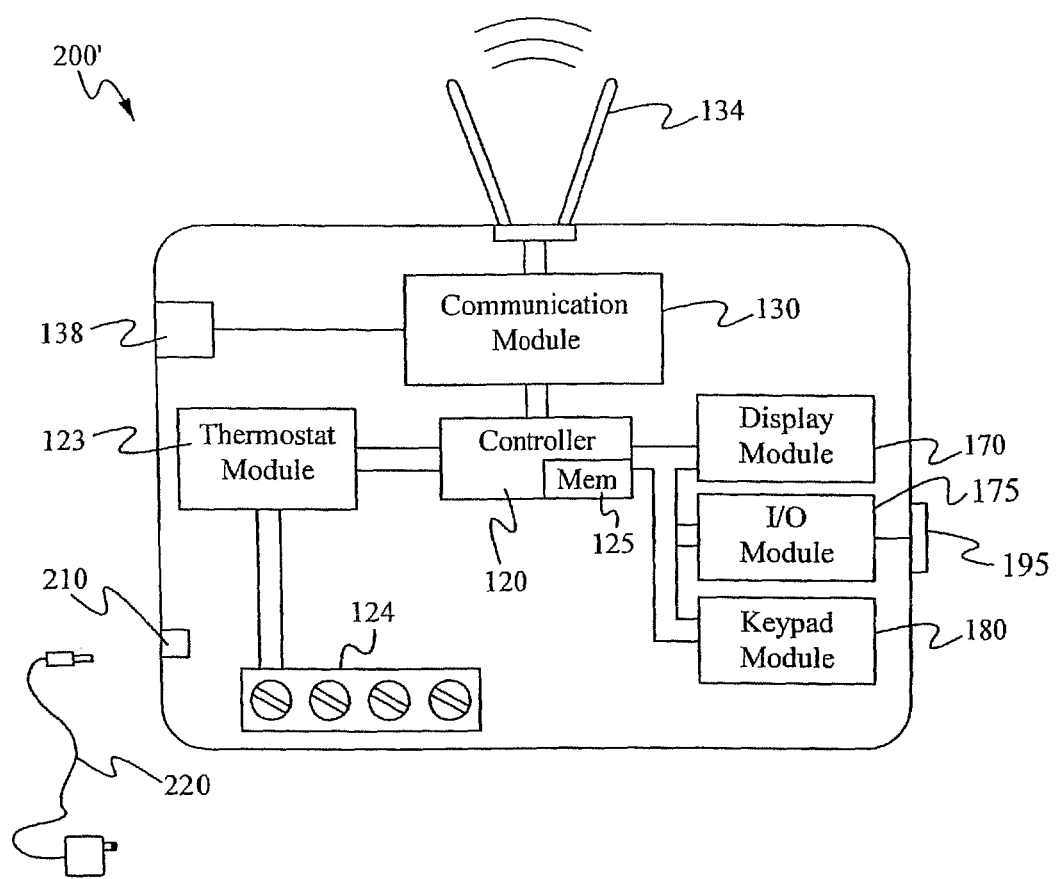
FIG. 2 illustrates a diagram of the internal components of a remote energy monitoring device, including a thermostat module, according to some embodiments.
Figure 3A:
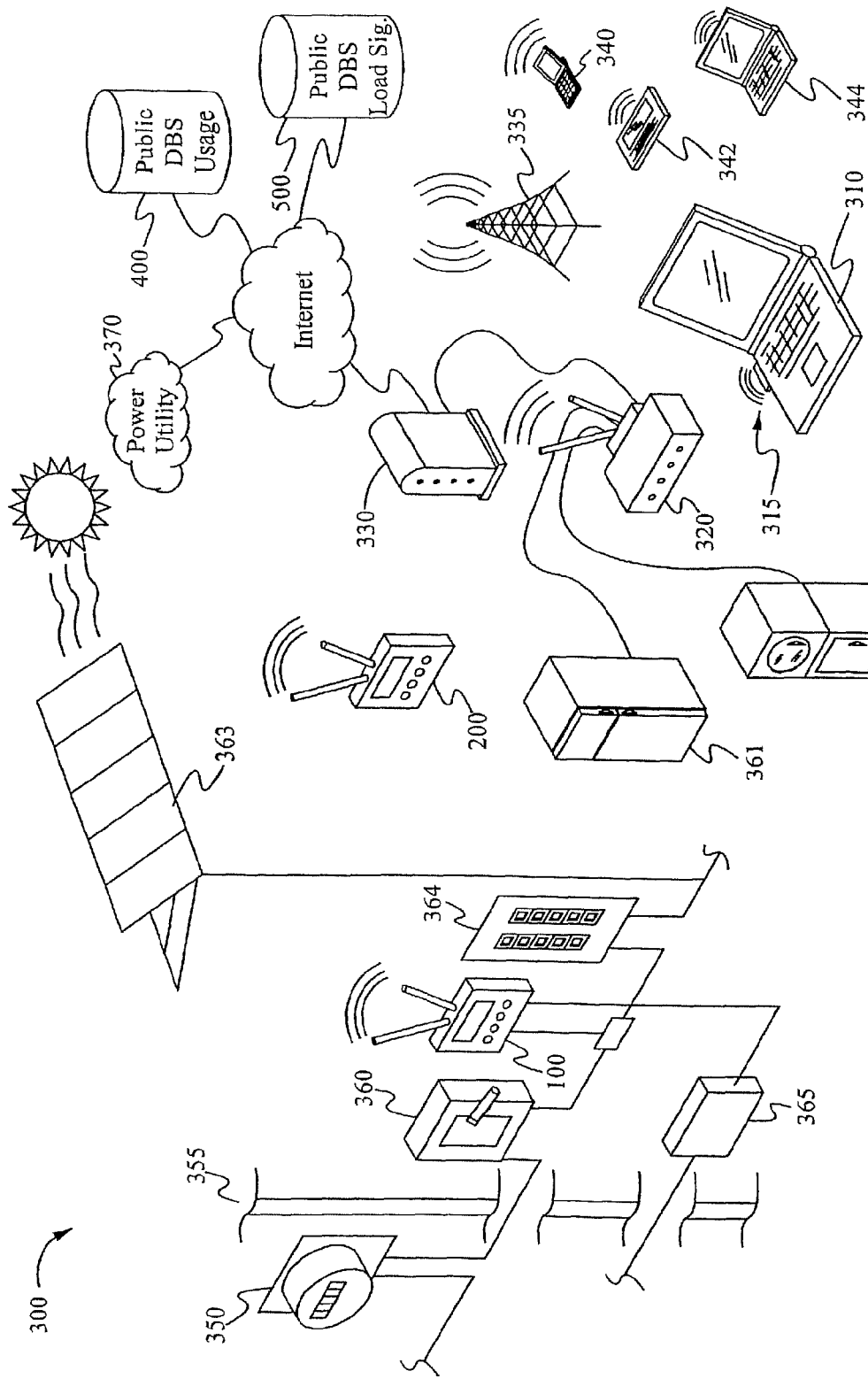
FIG. 3A illustrates a diagram of a communications network of energy monitoring devices and related equipment according to some embodiments.

Although both FIGS. 1A and 1B have been shown comprising a wireless interface 134 and a USB port 138, one skilled in the art will recognize that communication between the energy monitoring device and a remote device can be by any appropriate wired or wireless communication protocol such as RS232 serial communication, RS-485 serial communication, Ida., Ethernet, IEEE-1394 (Firewire®), X10 or other power line carriers, IEEE 802.11 wireless, IEEE 802.15 wireless, Zigbee® wireless, Bluetooth® wireless, or other communications protocol. The communications are further able to comprise secure (encrypted) transmission protocols to maintain privacy. One skilled in the art will also recognize that the clock/calendar module 160, the load signature table 150, the display module 170, and the keypad module 180 can be located in any appropriate remote device. Appropriate remote devices include, but are not limited to, the remote device disclosed in FIG. 2, an iPhone® 200, a personal computer 310, a personal digital assistant 342, a pocket PC (not shown), a mobile computer 344 as shown in FIG. 3A or other device comprising a time keeping function, memory, and a user interface comprising a display and an input device.

Figure 1C:
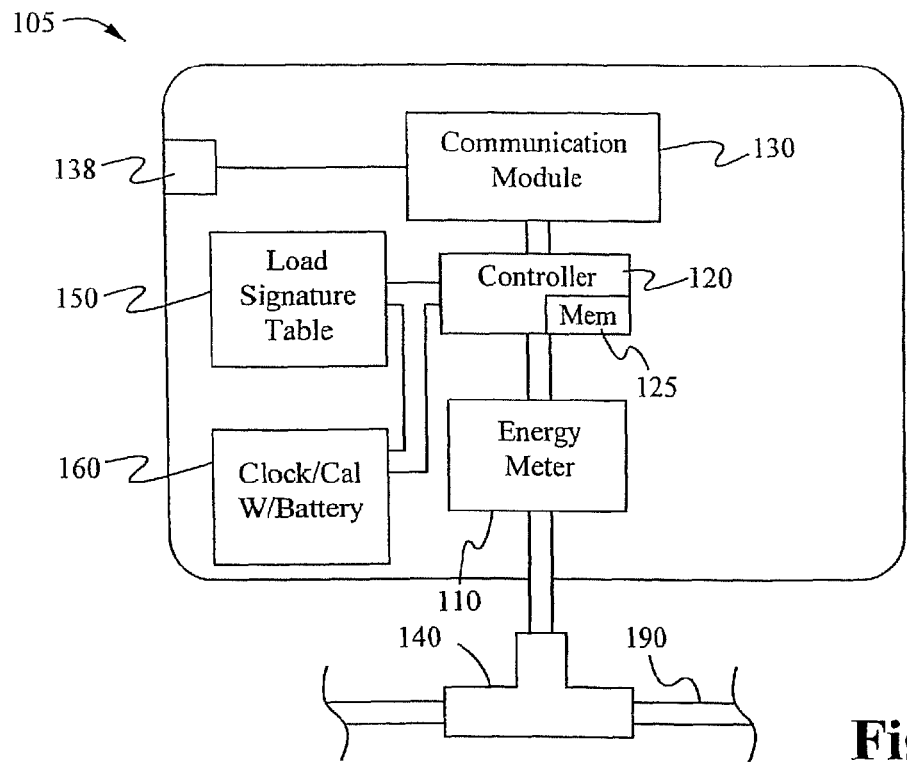
FIG. 1C illustrates a diagram of the internal components of an embedded energy monitoring device coupled to a power supply inside of an Energy Aware Appliance according to some embodiments.

FIG. 1C illustrates a diagram of the internal components of an embedded energy monitoring device 105 coupled to a power supply inside of an Energy Aware Appliance according to some embodiments. The internal components are able to be quite similar to the internal components of the energy monitoring device 100. A controller 120 is coupled to a memory 125 programmed with instructions implementing the embedded energy monitoring device functionality. The controller 120 is further coupled to a communication module 130. The communications module 130 is coupled to, for example, an Ethernet port 132 (not shown). The Ethernet port 132 is able to be coupled to a home network via a router to enable communication with the energy monitor device 100. The USB or Ethernet port is able to be coupled to a personal computer for the purpose of upgrading the software programmed in the memory 125 and exchanging information with the Energy Aware Appliance.

Figure 1D:
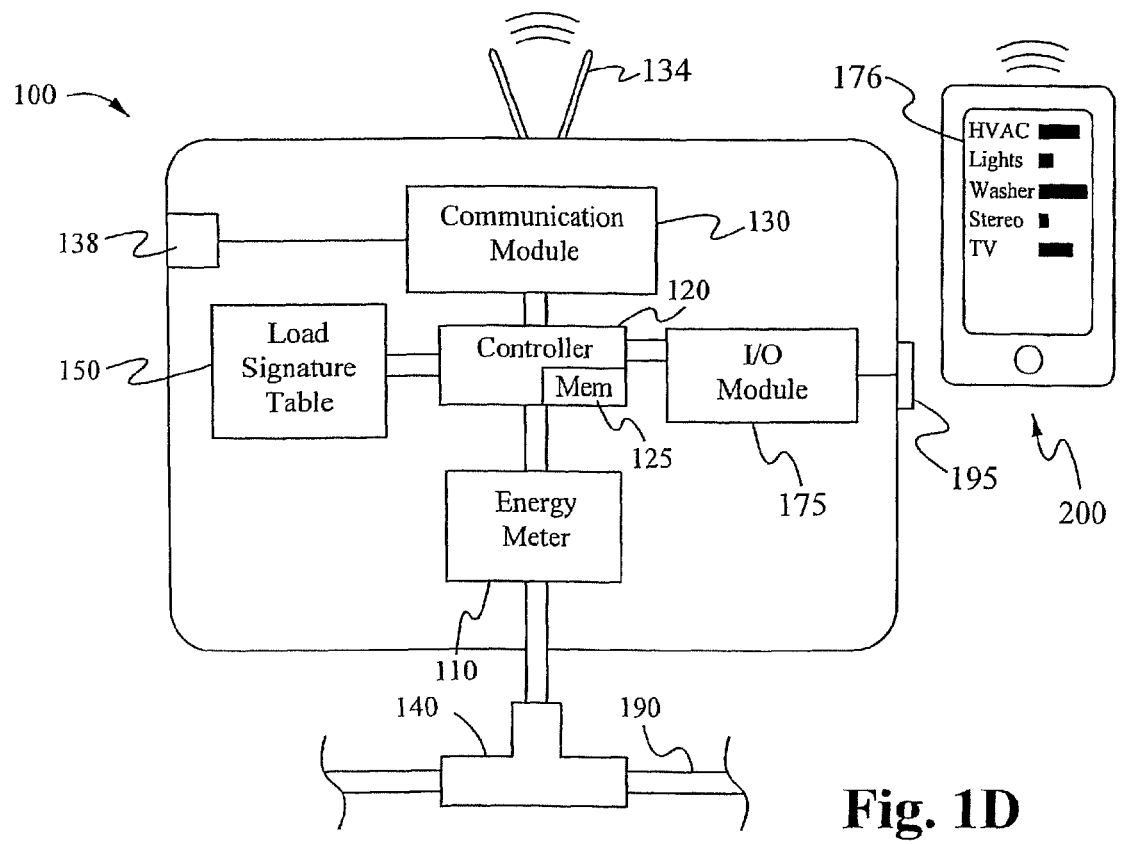
FIG. 1D illustrates a diagram of the internal components of an energy monitoring device coupled to a power supply, and an external interface device, according to some embodiments.

FIG. 1D illustrates a diagram of the internal components of an energy monitoring device coupled to a power supply, and an external interface device, according to some embodiments. A low cost, highly compact version of the energy monitoring device 100 is as able to comprise an energy meter 110, a controller 120 with a memory 125, a communications module 130, a memory for a load signature table 150, an I/O module 175 with an associated I/O connector 195, a wireless antenna 134, a USB port 138, and Ethernet port 132 (not shown). The I/O module 175 and associated connector 195 enable the energy monitoring device to monitor other, non-electrical, devices such as a gas meter, a water meter, and a home security system. The highly compact version of the energy monitoring device is able to communicate directly with remote devices such as an iPhone® 200 (shown), a laptop computer (not shown), a PDA or other remote display device such as the remote display device 200 shown in FIG. 2. The iPhone® 200 (shown) comprises a touch screen 176, as described in FIG. 1A, above. The controller 120 further includes a memory 125 programmed with instructions for computing a load signature from successive power supply measurements. The controller can be a programmed device which is able to comprise at least one of selected and interconnected discrete components, microprocessor, a system on a chip, an application specific integrated circuit (ASIC), a programmed field programmable gate array (FPGA), and one or more configured and interconnected integrated circuits. The controller 120 is further coupled to a communications module 130. The communications module 130 is able to communicate using one or more protocols including RS-232 serial communication, RS-485 serial communication, IEEE 802.11 wireless, IEEE 802.15 wireless, Zigbee® wireless, Blue Tooth® wireless, USB, IEEE 802.3x, IEEE-1394, I²C serial communication, Ida. or other communications protocol. The communications are further able to comprise secure (encrypted) transmission protocols to maintain privacy. As shown in FIG. 1A, the communications module 130 is coupled to a USB port 138 and a wireless antenna 134 in some embodiments. The memory 125 and the load signature table 150 are both able to be read or written to via the communications interface. For example, the USB port 138 can be used to upgrade the software stored in memory 125. Energy meter information and load signature information are able to be communicated to remote device(s) via the wireless antenna 134. The controller 120 is further able to be programmed to compute and store load signatures in the load signature table memory 150. The controller 120 is also able to retrieve load signatures from the load signature table 150. The load signature table memory 150 is able to further comprise memory for storing the public and private databases, described further below, configuration information, and other uses.

Figure 1E:
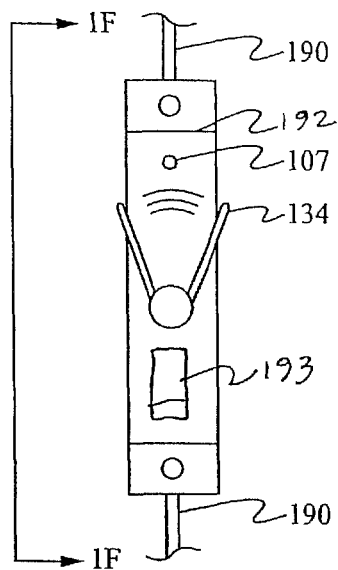
FIG. 1E illustrates a diagram of the internal components of an energy monitoring device coupled to a power supply, and installed inside of a circuit breaker box according to some embodiments.
Figure 1F:
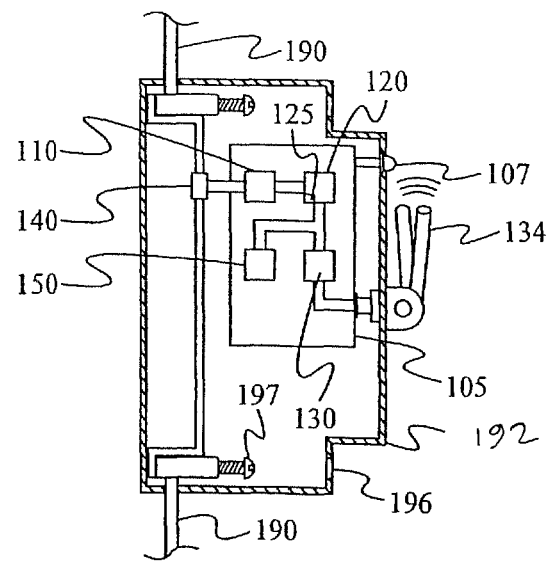
FIG. 1F illustrates a diagram of the internal components of an energy monitoring device coupled to a power supply, and installed inside of a circuit break box according to some embodiments.
Figure 1G:
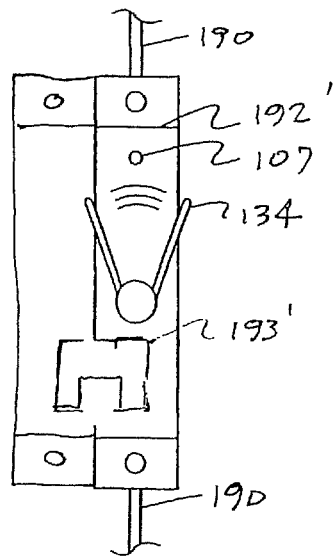
FIG. 1G illustrates a 220 V breaker with breaker switch according to some embodiments.

FIGS. 1E and 1F illustrate diagrams of the internal components of an energy monitoring device 100 coupled to a power supply 190 and installed inside of a circuit breaker box (FIG. 3A, element 364), with breaker switch 193, upstream of all electrical devices to be monitored, according to some embodiments. In this ultra-compact embodiment, the entire energy monitoring device 100 is installed inside the form factor of a circuit breaker housing for installation or inclusion in a circuit breaker box or panel, with the exception of the wireless antenna 134, which is mounted outside of the circuit breaker box to facilitate wireless communication as shown in FIG. 1F. For example, in the case of monitoring a 220V network supplied with 110 V phase, neutral and 110V counter-phase, the 220V circuit breaker form factor provides access to all necessary power mains for monitoring the network while achieving a compact form factor compatible with existing circuit breaker panels and allowing for ease of installation. The internal components are substantially similar to FIG. 1A. The energy monitoring device 100 is coupled to the power supply 190 via a power supply connection 140 as is known in the art of circuit breaker design. Screw terminals 197 are used to couple the circuit breaker type housing 192 to the power supply 190, and thereby to the power supply connection 140. The screw terminals are accessed through access holes 196 in the circuit break type housing 192. The energy meter 110 is coupled to the power connection 140 and is communicatively coupled to the controller 120 with memory 125. The controller 120 is communicatively coupled to the load signature table 150 and to the communications module 130. The energy meter 110, controller 120 with memory 125, the load signature table 150 and the communications module 130 are all able to be mounted on a single printed circuit board 105. The communications module 130 is shown coupled to a wireless antenna 134. One skilled in the art would appreciate that the communications interface need not be wireless. Any suitable communications medium will work including USB, Ethernet, RS232 serial communication, RS485 serial communications or I²C serial communications. Like the compact energy monitoring device shown in FIG. 1D, embodiments according to FIGS. 1E and 1F can communication with a remote device such as an iPhone® (not shown) or other smart phone, a tablet PC, a laptop computer (not shown) or a remote display device such as is shown in FIG. 2, above. An LED 107 can be added to indicate that the energy monitoring device is functioning properly. FIG. 1G shows a 220V breaker with breaker switch 193', that is otherwise described in FIGS. 1E and 1F.

FIG. 2 illustrates a diagram of a remote energy monitoring display device 200 including a thermostat according to some embodiments. The internal components are able to be quite similar to internal components of the energy monitoring device 100. A controller 120 is coupled to a memory 125 programmed with instructions implementing the remote energy monitoring display device functionality. The controller 120 is able to be coupled to a thermostat 123 with corresponding terminal strip interface 124 in order to communicate with a heater, air conditioner, or combination unit. The controller 120 is further coupled to a communication module 130. The communications module 130 is coupled to, for example, a USB port 138 and a wireless antenna 134. The USB port 138 is able to be coupled to a personal computer for the purpose of upgrading the software programmed onto the memory 125. The wireless antenna 134 is able to receive the energy monitoring information from the energy monitoring device 100 and process and display the energy usage information. The controller 120 is also coupled to a display module 170 and an input module 180. The display module 170, an I/O module 175 with an associated I/O connector 195, input module 180, and thermostat module 123 cooperate via programming of the controller 120 to operate a connected heater, air conditioner, or combination unit. The I/O module 175 and associated connector 195 enable the energy monitoring device to monitor other, non-electrical, devices such as a gas meter, a water meter, and a home security system. Energy monitoring information is able to be received via the communication module 130 and displayed on the display module 170. The display module 170 and the input module 180 are able to comprise a touchscreen 176 (not shown). Configuration of the remote device 200 is able to be accomplished by the user via the input module 180. Alternatively, configuration is able to be performed via the communications port, for example, the USB port 138. Configuration, as discussed below, can include selecting a default display mode for the remote device. Power for the remote device 200 is able to be supplied to the remote device by either the thermostat wiring through the terminal strip interface 124 or via a DC input 210 and an AC/DC adapter 220.

FIG. 3A illustrates a typical installation configuration for a home or small business. A power utility meter 350 is located outside a building wall 355 and coupled to the grid at a mains junction box 360 for the building. The energy monitoring device 100 is able to be installed near, just downstream of, the mains junction box 360, and upstream of the circuit breaker box 364. In some embodiments, such as described in FIGS. 1E and 1F, the energy monitoring device is able to be installed inside the circuit breaker box 364, upstream of all circuit breakers. The typical installation is further able to comprise coupling the communications module 130 on the energy monitoring device 100, in this case an 802.3x Ethernet connection 132, to an Internet interface 365 or to a network router 320, a D.L. or cable modem 330, and then to the Internet interface 365. A power utility 370 can receive energy monitoring information from the energy monitoring device 100. In some embodiments, the power utility 370 is able to receive the energy monitoring information from a remote device 200, or a computer 310 acting as a remote device. Further, the power utility 370 is able to transmit messages to the energy monitoring device 100. Such messages can be processed by the energy monitoring device 100, or passed on to a remote device 200 which is communicatively coupled to the energy monitoring device 100 via the communications module 130. Messages can also be transmitted to alternate, or supplemental, remote devices including, but not limited to, a personal computer 310 with a wireless interface 315, or mobile remote devices such as a cell phone 340, a personal digital assistance 342, or a mobile laptop computer 344. The energy monitoring device 100 is able to communicate with remote mobile devices 340, 342 and 344 either via an Internet interface 365 or via a network router 320, a D.L. or cable modem 330, over the Internet, to a cellular tower 335, then to the remote mobile devices. One skilled in the art would recognize that the mobile devices 340, 342, and 344, the remote device 200, and the computer 310 are also able to send query messages to the utility 370, the public usage database 400, the public load signature database 500, and the energy monitoring device 100. The energy monitoring device 100 is similarly able to furnish energy usage information to the power utility 370. Energy monitoring information is also able to be furnished to a public data base of usage data 400. The power utility 370 is able to furnish information to the energy monitoring device 100, which in turn is able to forward the information from the utility to any of the above remote devices. The energy monitoring device 100 is further able to access the public usage database 400 and a public database of load signatures 500. Energy Aware Appliances, such as a refrigerator 361 and a washer/dryer 362, can contain an embedded energy monitoring device 105 in each Energy Aware Appliance, which is coupled to the router 320 or otherwise communicatively coupled to the energy monitoring device 100. Energy Aware Appliances are discussed in detail, below. Energy generating DC devices, such as a solar panel 363, a generator (not shown) or a wind generator (not shown) can be electrically coupled to the power supply wherein the energy monitoring device is able to measure the power generated and fed back to the utility grid.

Figure 3B:
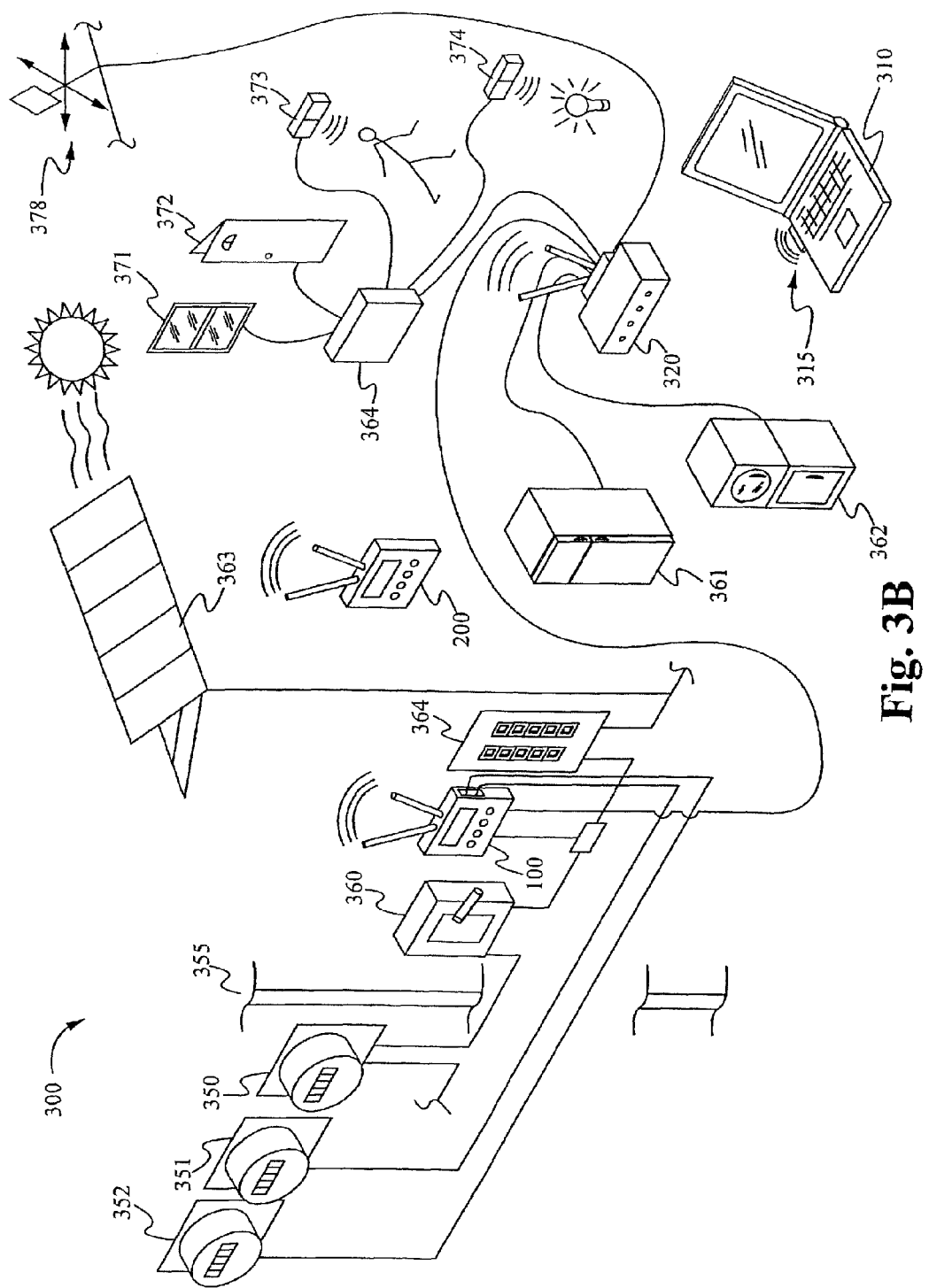
FIG. 3B illustrates a diagram of a communications network of energy monitoring devices and related equipment according to some embodiments.

FIG. 3B illustrates a typical installation configuration for a home or small business. A power utility meter 350, a water meter 351, and a gas meter 352 are located outside a building wall 355. Inside the building, a home security system 364 comprising a windows sensor 371, a door sensor 372, a motion detector 373, and a light detector 374 can interface to the energy monitoring device 100 via a home network router 320 or at the energy monitoring device I/O connector shown in FIGS. 1A, 1D, and 2. The water meter 351 and gas meter 352 can be interfaced to the energy monitoring device 100 at the I/O connector 195, or through a home network router 320 similar to the configuration shown for the home security system 364. By interfacing the above devices to the energy monitoring system, information received from these devices can be used to reduced energy costs. The energy monitoring system 100 can detect that the home air conditioner (not shown) is running Assume that the outdoor temperature measured by the home weather system 378 is 100° F. The home security system 364 has detected that a window 371 is open, and that a motion detector 373 in the home security system 364 has detected that a person is in the house. With these devices all interfaced to the energy monitoring device 100, the energy monitoring device 100 can send a message to the property owner to call home and ask the person there to close the window 371 so that the air conditioner is not wasting energy by cooling air that is escaping to the outdoors. One skilled in the art can envision numerous such factual situations where energy can be saved by interfacing home systems to the energy monitoring device. Other devices (not shown) which can be interfaced to the energy monitoring device 100 include, and are not limited to, temperature sensors for sensing the temperature of hot water in a hot water heater, steam temperature, fuel oil flow metering, pressurized gases flow such as air, natural gas, inert gases for processes, refrigerator temperature, freezer temperature, and the temperature within a room of a building on the property. Other devices with sensors that can interface to the energy monitoring device include electricity storage unit based on batteries, a reservoir for compressed gas, steam, air, and a water reservoir. Sensors such as gas or water meters may provide information such as volume consumed, and associated cost for a period of time.

FIG. 4 illustrates a sample public usage database. Each energy monitoring device is able to have a unique IP address, a public utility meter serial number, or other unique identifier 410 which identifies the source of the energy meter data while still maintaining a user's anonymity. User billing information, physical residence information, rate date, or a zip code 420 can be used to identify the neighborhood and house where the energy meter information originates, and can be linked to the energy monitoring device. A user can configure their energy meter to publish data to a public usage database 400 as a business, a residence, an industrial user, or other user type identifier 430. A user may choose to publish the square footage 440 of their building where the energy meter is installed. The public database may further have usage types 450, device types, or other breakdown to facilitate query. An energy monitoring device is able to publish incremental or aggregate energy usage information 460. The collection of energy monitoring information published to the public usage database by energy monitoring device users provides a body of data which may be queried and collated to provide usage information to individual users, municipalities, and power utilities.

FIG. 5 illustrates a sample public load signature database 500. A public load signature database record is able to comprise a manufacturer 510 of an electrical device, a model 520, a description 530, and one or more associated states 540. For each state of an electrical device, a default load signature 560 is able to be provided, accessible to energy meters as a default load signature for an electrical device and state detected by the energy meter. Default load signatures are able to be furnished by the manufacturers of electrical devices, independent testing laboratories, or published to the public database by energy monitoring device users. In addition, or alternatively, generic load signatures suitable for a typical house or small business can also be loaded, or pre-loaded, into the energy monitoring device. Loading and pre-loading are able to be performed via the communications port 138, shown in FIG. 1A.

Figure 6:
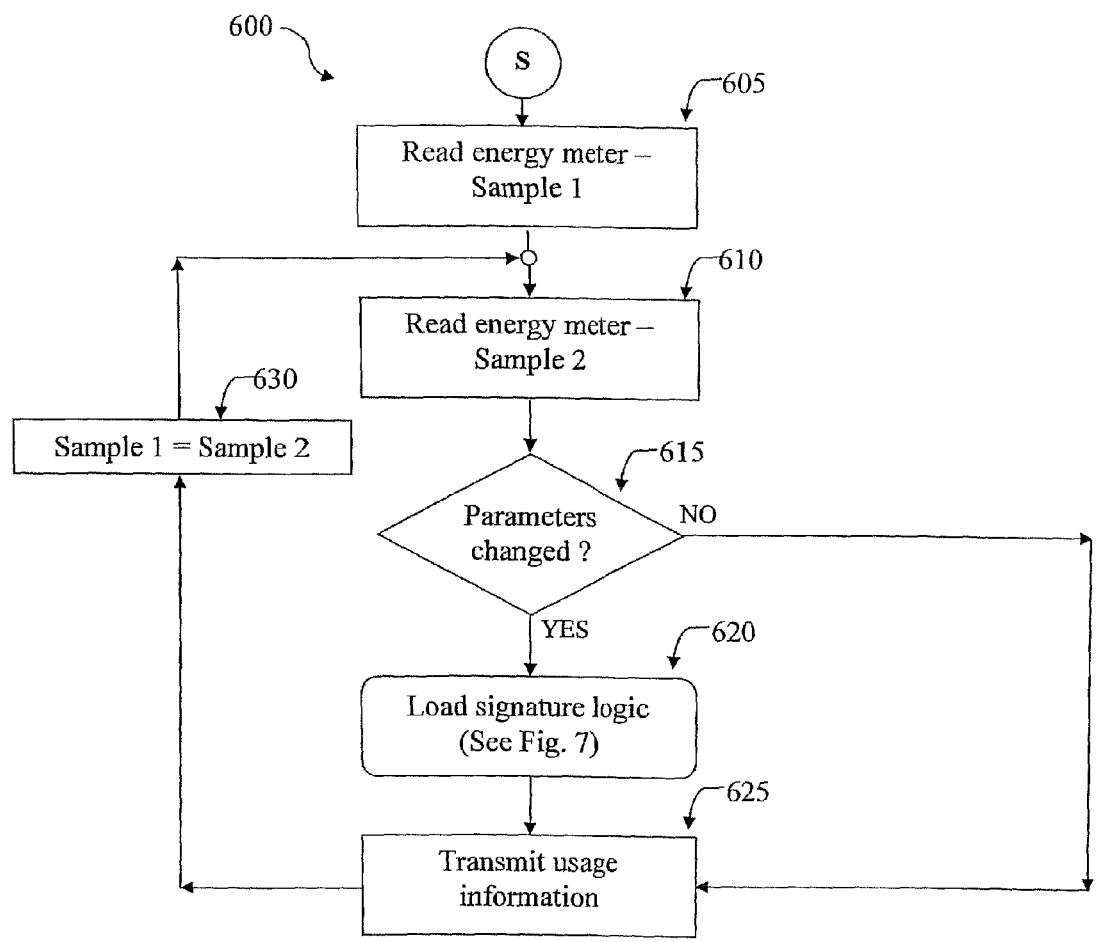
FIG. 6 illustrates a flow diagram of an energy meter operating according to some embodiments.

FIG. 6 illustrates a flow diagram of an energy meter operating according to some embodiments. At step 605, the energy meter measures a first sample of the power supply. Additional power supply parameters are able to be computed from the energy meter sample. Together, the energy meter first sample and the computed power supply parameters comprise first power supply parameters. At step 610, an analogous set of second power supply parameters is measured and computed. A determination is made at step 615 as to whether one or more power supply parameters have changed. If no power supply parameters have changed at step 615, then at step 625 current energy usage information is transmitted either to the display module in the energy monitoring device, or to a remote device within the building, or a combination of these. Optionally, at step 625, current energy usage information is able to be transmitted to the power utility and/or a public database. Then the first power supply sample is set to the second power supply sample at step 630, and a new second set of energy meter measurements is read and additional parameters are computed, comprising a new second power supply parameters list at step 610. If one or more power supply parameters have changed at step 615, then the load signature logic of FIG. 7 is invoked at step 620.

Figure 7:
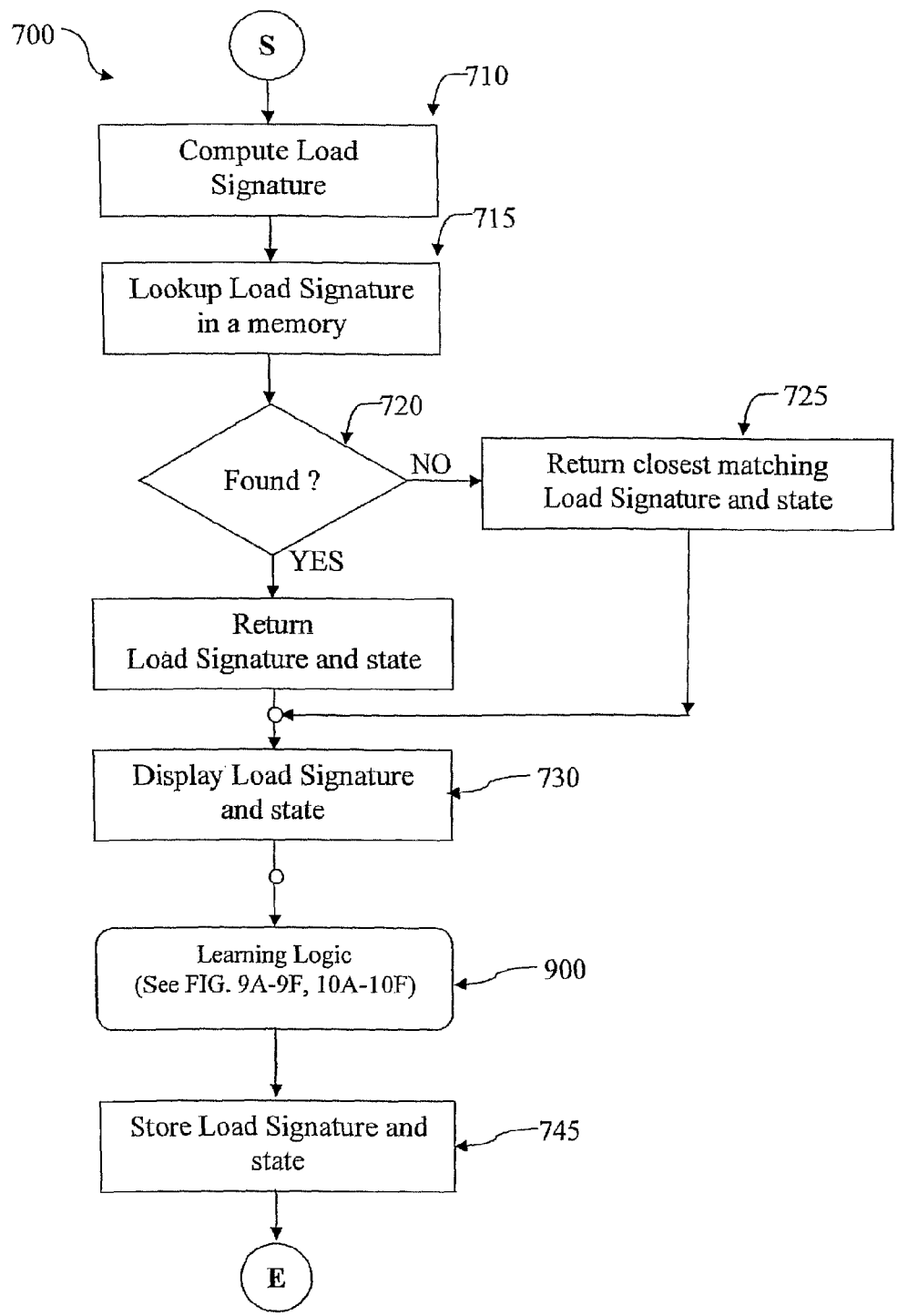
FIG. 7 illustrates a flow diagram of a method of automatically creating a load signature database according to some embodiments.
Figure 8:
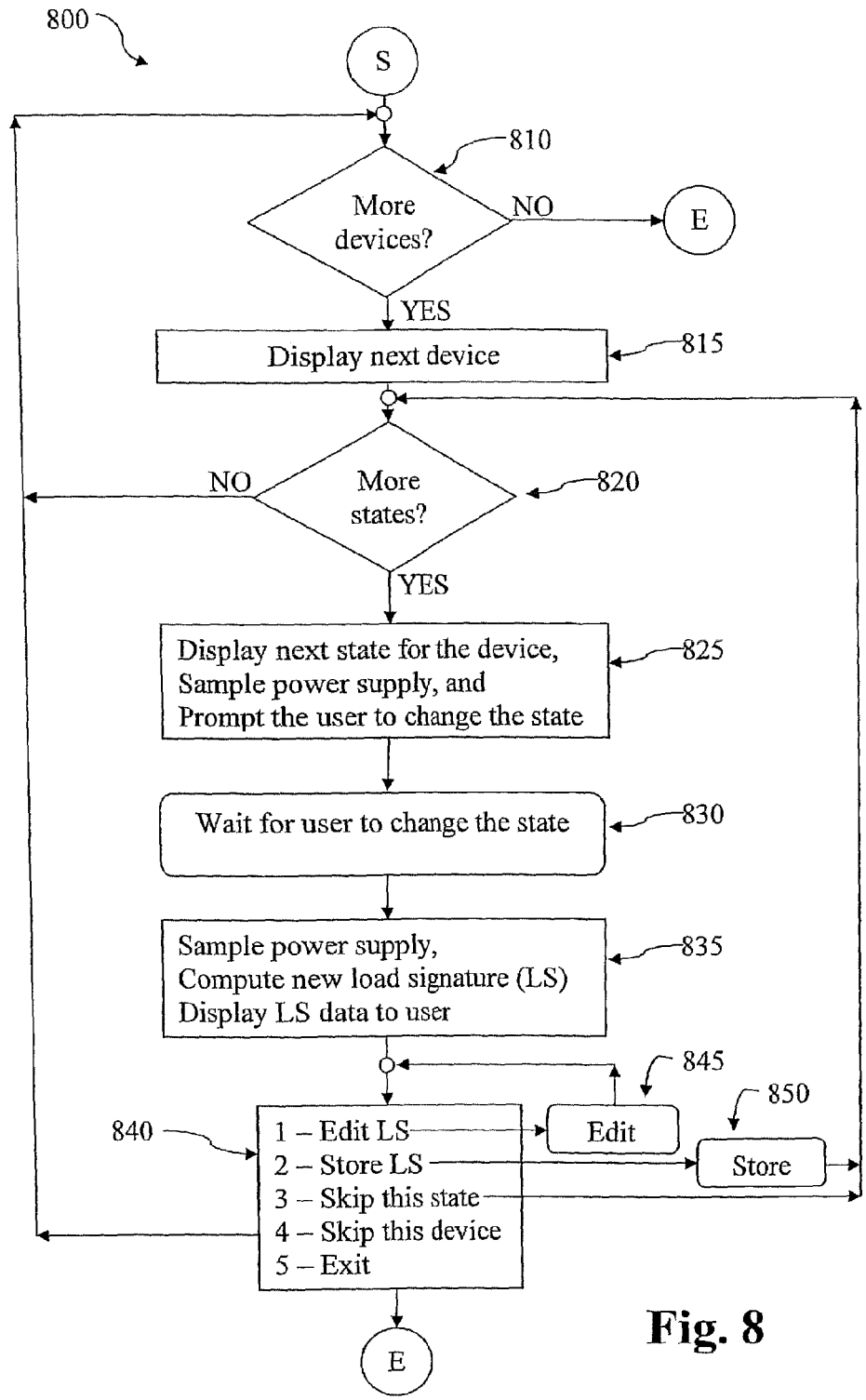
FIG. 8 illustrates a flow diagram of a method of manually creating a load signature database according to some embodiments.

FIG. 7 illustrates a flow diagram of a method of automatic learning for creating a load signature database according to some embodiments. As described at step 740, below, the user can interact with energy monitoring device in this learning mode, to aid the learning. However, if the user does not participate in the automatic learning process, the automatic learning process simply times out where user input is allowed and performs default actions automatically. First, a new computed load signature is calculated at step 710. At step 715, the computed load signature is looked up in a memory. If the load signature is found, the load signature and its corresponding state are returned. If, at step 720, the load signature is not found then the closest matching load signature and state is returned at step 725. At step 730, the load signature found, or the nearest match returned from step 725, and the associated state, are displayed on the user display. The user is permitted to make changes at step 740. FIG. 8 describes the user's interaction in "learning mode." If the user accepts, or a timer expires, at step 735 then the load signature and state are stored in a record in the private database at step 745. Then the method ends and returns to Step 625 of FIG. 6. As described above, at step 625 of FIG. 6, energy usage information is then transmitted to the display module on the energy monitoring device, or a remote device within the building, or a combination of these. Optionally, at step 625, current energy usage information may be transmitted to the power utility and/or a public database.

FIG. 8 illustrates a diagram of the steps for manual learning of load signatures and states for one or more electrical devices. As described in Private Databases, below, the user is able to store records in the private database which identifies one or more electrical devices installed in his home or small business office. For each electrical device, he is further able to store records for one more states for each electrical device in private databases. The private database is then able to be downloaded to the energy monitoring device using well-known communication methods. The private database, downloaded to the energy monitoring device, is then able to be used to step the user through the manual learning process as described in FIG. 8. In a preferred embodiment, the user interface to the learning process is implemented as an application on an iPhone® or other portable device with wireless communications, a display screen and input module, such as a touch screen. At step 810, if the energy monitoring device has not yet learned all of the electrical devices, then the next device to be learned is displayed on the user's display device, else the process ends. At step 820, if there are more states to be learned for the displayed device, then at step 825 the next state to be learned is displayed to the user, the power supply is sampled, and the user is prompted to change the state of the electrical device to the displayed state. For example, if the device is a lamp with a 60 W incandescent bulb, the user is prompted to turn the lamp to the ON state. The process waits at step 830 for the user to change the state. The wait process can be terminated by the user confirming that he has changed the state, by the energy monitoring device monitoring the power supply to see that the apparent power has increased by approximately 60 W, or other means such as manual termination of the process by the user or time-out. At step 835, the power supply is sampled and a new load signature is computed and displayed for the user. At step 840, the user has plurality of options which can comprise selecting and editing mode 845 for the load signature, selecting a storing option 850 to store the load signature, skipping the state and looping back to step 820 to check for more states for this electrical device, skipping the electrical device and looping back to step 810 to check for more electrical devices, or exiting the learning process. One skilled in the art will in possession of this disclosure would recognize that steps can be added or deleted, or the order changed, within the scope of the disclosure.

Figure 9A:
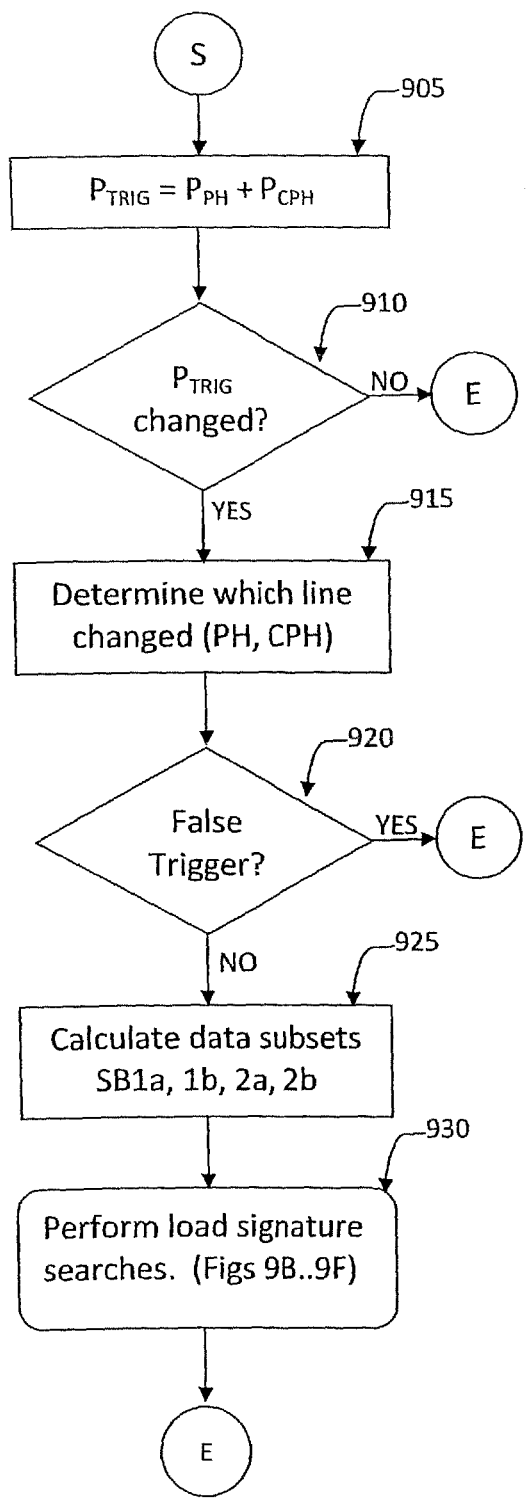
FIG. 9A illustrates a flow diagram of a portion of a method of identifying a device and state from a load signature according to some embodiments.

FIG. 9A illustrates a flow diagram of a portion of a method of identifying a device and state from a load signature according to some embodiments. At step 905, $_{PRIG}$ is calculated to determine whether a load signature needs to be calculated. If $P_{TRIG}$ has changed at step 910, then it is determined which wire (phase, counter phase) experienced the change. If there is no change in $_{PRIG}$ at step 910, then the method is ended. A false trigger is checked for at step 920. If there is a false trigger, then the method is ended. If there is no false trigger, then at step 925 data subsets SB1$a$, 1$b$, 2$a$ and 2$b$ are calculated as described below in Load Algorithms. At step 930, load signature search algorithms are invoked, as described below.

Figure 9B:
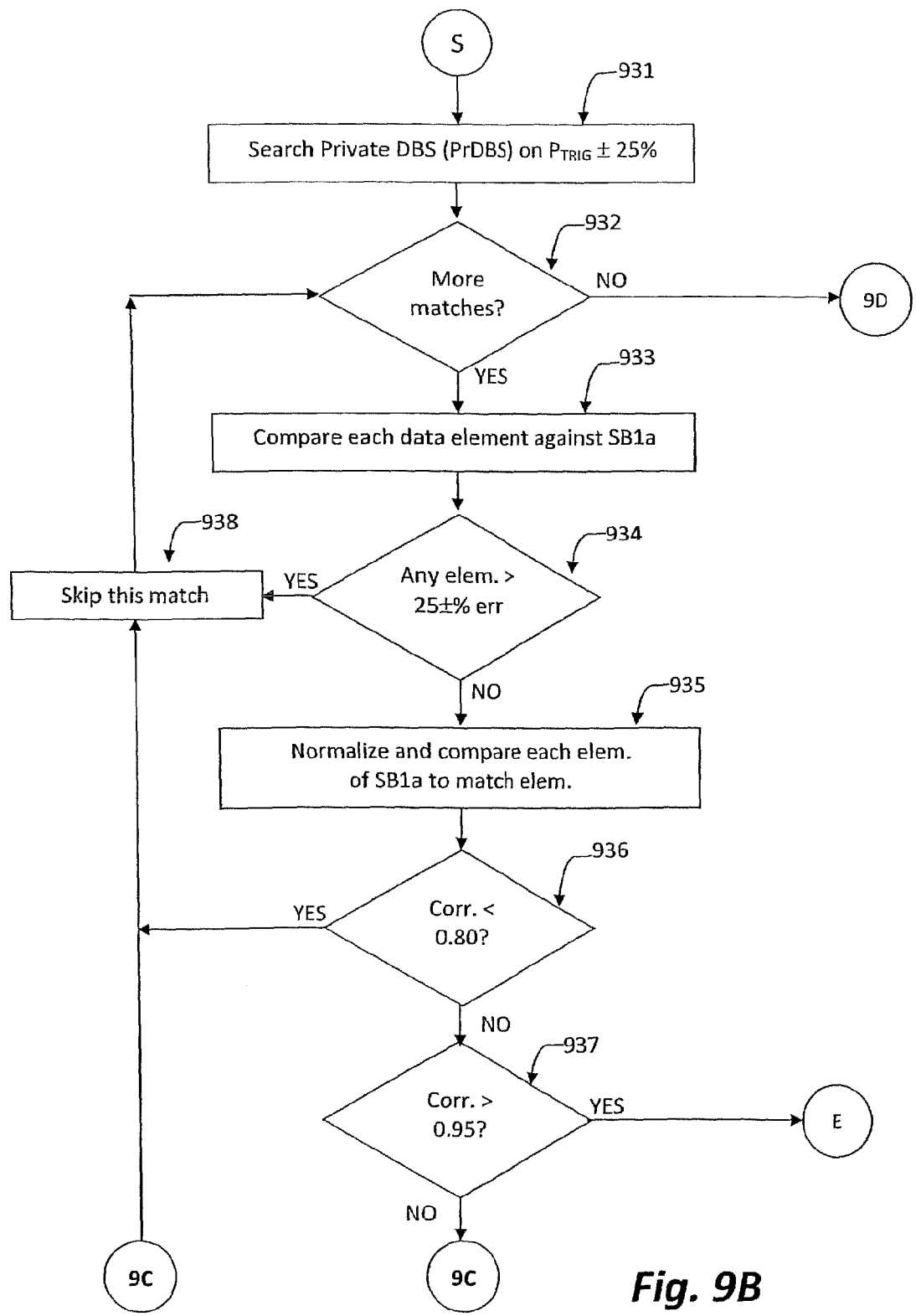
FIG. 9B illustrates a flow diagram of a portion of a method of identifying a device and state from a load signature according to some embodiments.

FIG. 9B illustrates a flow diagram of a portion of a method of identifying a device and state from a load signature according to some embodiments. At step 931, the private database of load signatures in the energy monitoring device is searched on $_{PRIG}$, for a coarse match such as ±25%. If there are no more matches at step 932, then the method exits to FIG. 9D for further analysis. At step 933, for a match to the search of step 931, each data element in SB1$a$ of the load signature being looked up is compared against each data element of the match. At 934, if any element has greater than 25% error, then the match is skipped at step 938, otherwise the data are normalized at step 935 and compared again, element by element. At step 936, if the correlation is less than 0.80 then the match is skipped. If the correlation is greater than 0.95 at step 937, then a match has been found to the load signature and the method ends. Otherwise a second level analysis is performed at FIG. 9C.

Figure 9C:
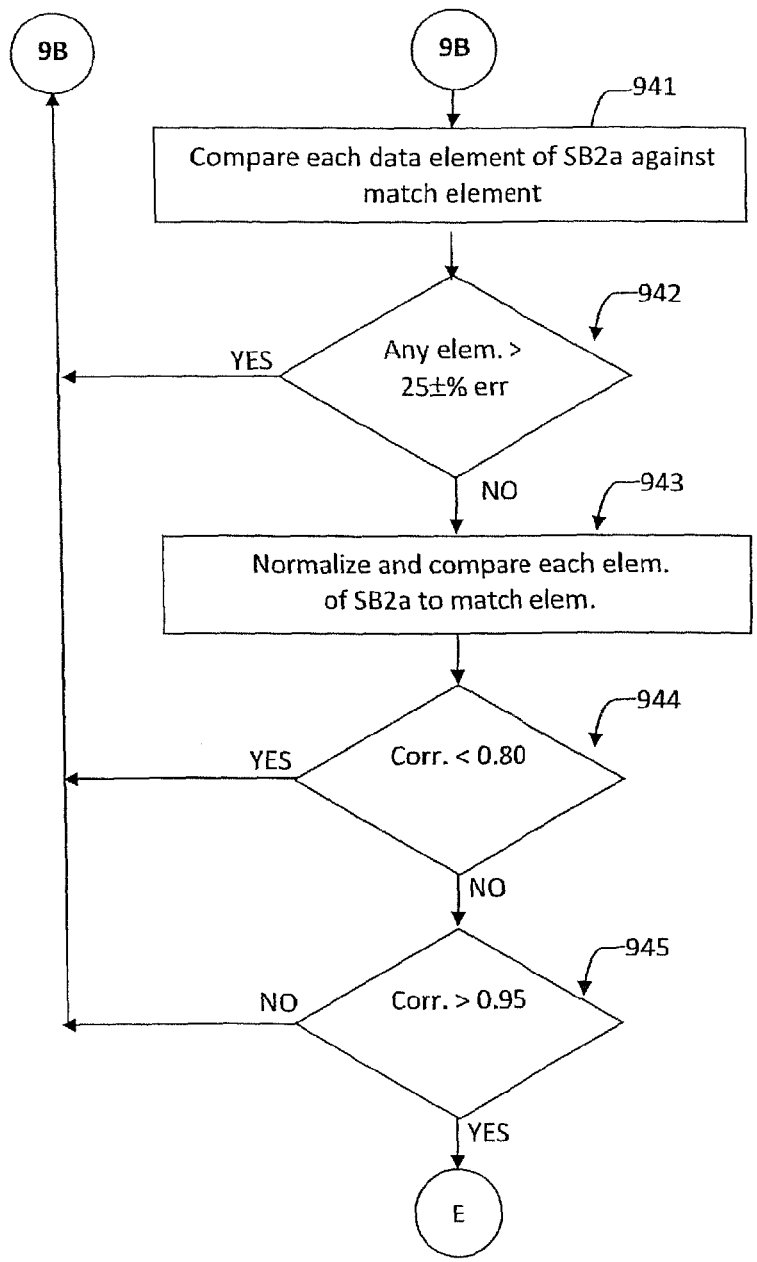
FIG. 9C illustrates a flow diagram of a portion of a method of identifying a device and state from a load signature according to some embodiments.

FIG. 9C illustrates a flow diagram of a portion of a method of identifying a device and state from a load signature according to some embodiments. At step 941, each element of data subset SB2$a$ is compared against its corresponding element in the match. If any element has greater than 25% error, then the match is skipped and the method returns to FIG. 9B. Otherwise, the data are normalized and compared element by element similar to step 941. If the correlation at step 944 is less than 0.80, then the method returns to FIG. 9B. If the correlation is greater than 0.95 at step 945 then the load signature has been found and the method ends, otherwise the method returns to FIG. 9B.

Figure 9D:
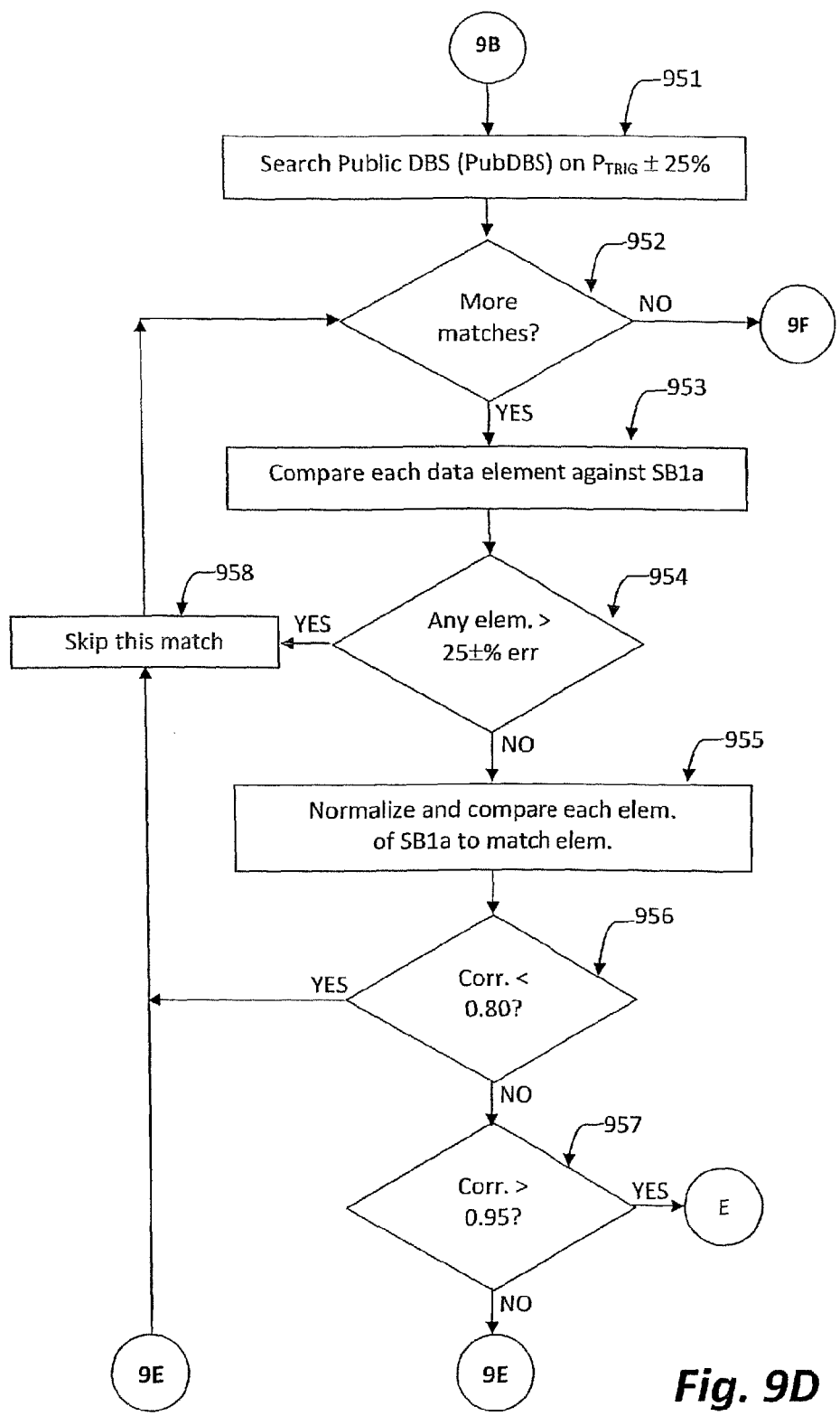
FIG. 9D illustrates a flow diagram of a portion of a method of identifying a device and state from a load signature according to some embodiments.

FIG. 9D illustrates a flow diagram of a portion of a method of identifying a device and state from a load signature according to some embodiments. If the search of the private database does not yield a matching load signature, then the public database is searched at step 951 on $_{PRIG}$ with a coarse search of ±25%. If there are no more matches at step 952, then the method exits to FIG. 9F for further analysis. At step 953, for a each match to the search of step 951, each data element in SB1$a$ of the load signature being looked up is compared against each data element of the match. At 954, if any element is has greater than 25% error, then the match is skipped at step 958, otherwise the data are normalized at step 955 and compared again, element by element. At step 956, if the correlation is less than 0.80 then the match is skipped. If the correlation is greater than 0.95 at step 957, then a match has been found to the load signature and the method ends. Otherwise a second level analysis is performed at FIG. 9E.

Figure 9E:
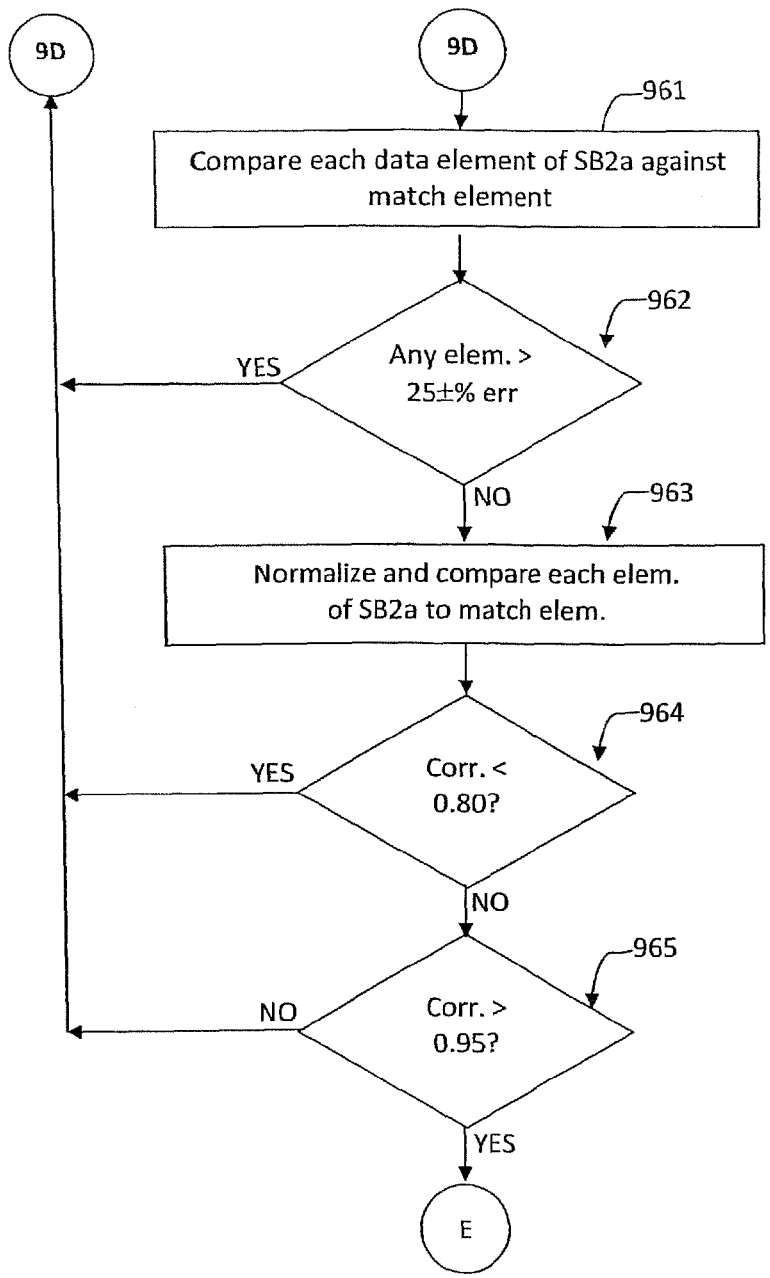
FIG. 9E illustrates a flow diagram of a portion of a method of identifying a device and state from a load signature according to some embodiments.

FIG. 9E illustrates a flow diagram of a portion of a method of identifying a device and state from a load signature according to some embodiments. At step 961, each element of data subset SB2$a$ is compared against its corresponding element in the match. If any element has greater than 25% error, then the match is skipped and the method returns to FIG. 9D. Otherwise, the data are normalized and compared element by element similar to step 961. If the correlation at step 964 is less than 0.80, then the method returns to FIG. 9D. If the correlation is greater than 0.95 at step 965 then the load signature has been found and the method ends, otherwise the method returns to FIG. 9D.

Figure 9F:
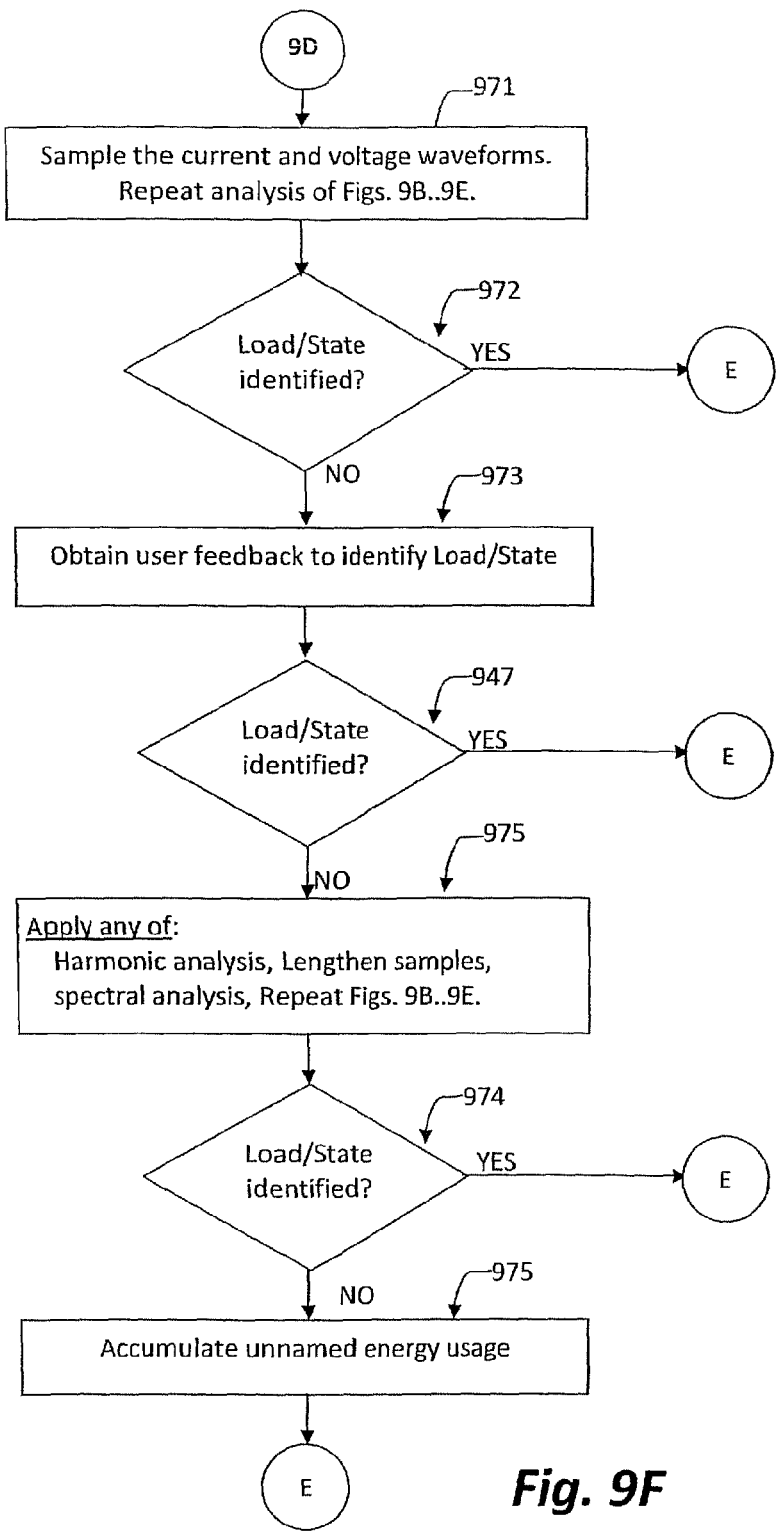
FIG. 9F illustrates a flow diagram of a portion of a method of identifying a device and state from a load signature according to some embodiments.

FIG. 9F illustrates a flow diagram of a portion of a method of identifying a device and state from a load signature according to some embodiments. At step 971, the current and voltage waveforms are sampled. The steps in FIGS. 9B through 9E are repeated. If the load signature is identified at step 972, then the method ends. Otherwise the user is prompted for feedback to assist in identifying the load and state. If the user identifies the load and state then the method ends, otherwise additional analysis is performed, including but not limited to harmonic analysis, lengthening the samples, spectral analysis, and re-running the analysis of FIGS. 9B through 9E. If the load signature still cannot be identified, then the energy usage is accumulated and reported as "unidentified energy usage.

Figure 10A:
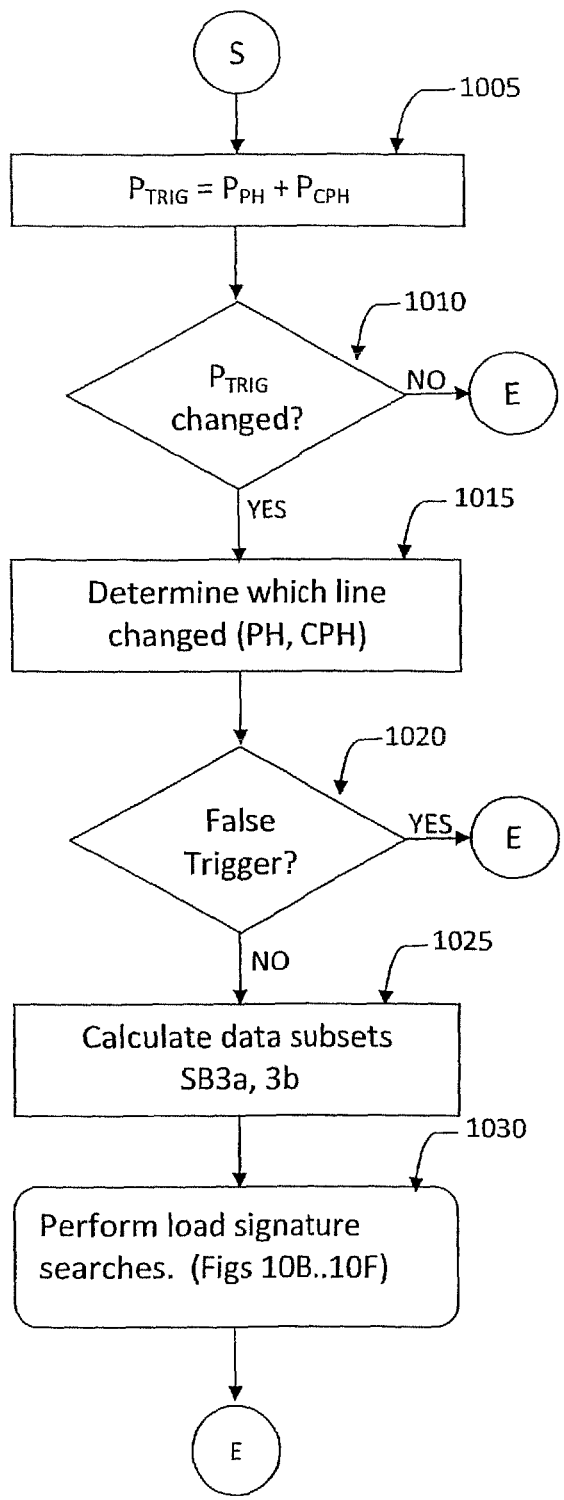
FIG. 10A illustrates a flow diagram of a portion of a method of identifying a device and state from a load signature according to some embodiments.

FIG. 10A illustrates a flow diagram of a portion of a method of identifying a device and state from a load signature according to some embodiments. At step 1005, $_{PRIG}$ is calculated to determine whether a load signature needs to be calculated. If $_{PRIG}$ has changed at step 1010, then it is determined which wire (phase, counter phase) experienced the change. If there is no change in $_{PRIG}$ at step 1010, then the method is ended. A false trigger is checked for at step 1020. If there is a false trigger, then the method is ended. If there is no false trigger, then at step 1025 data subsets SB3$a$ and 3$b$ are calculated as described below in Load Algorithms. At step 1030, load signature search algorithms are invoked, as described below.

Figure 10B:
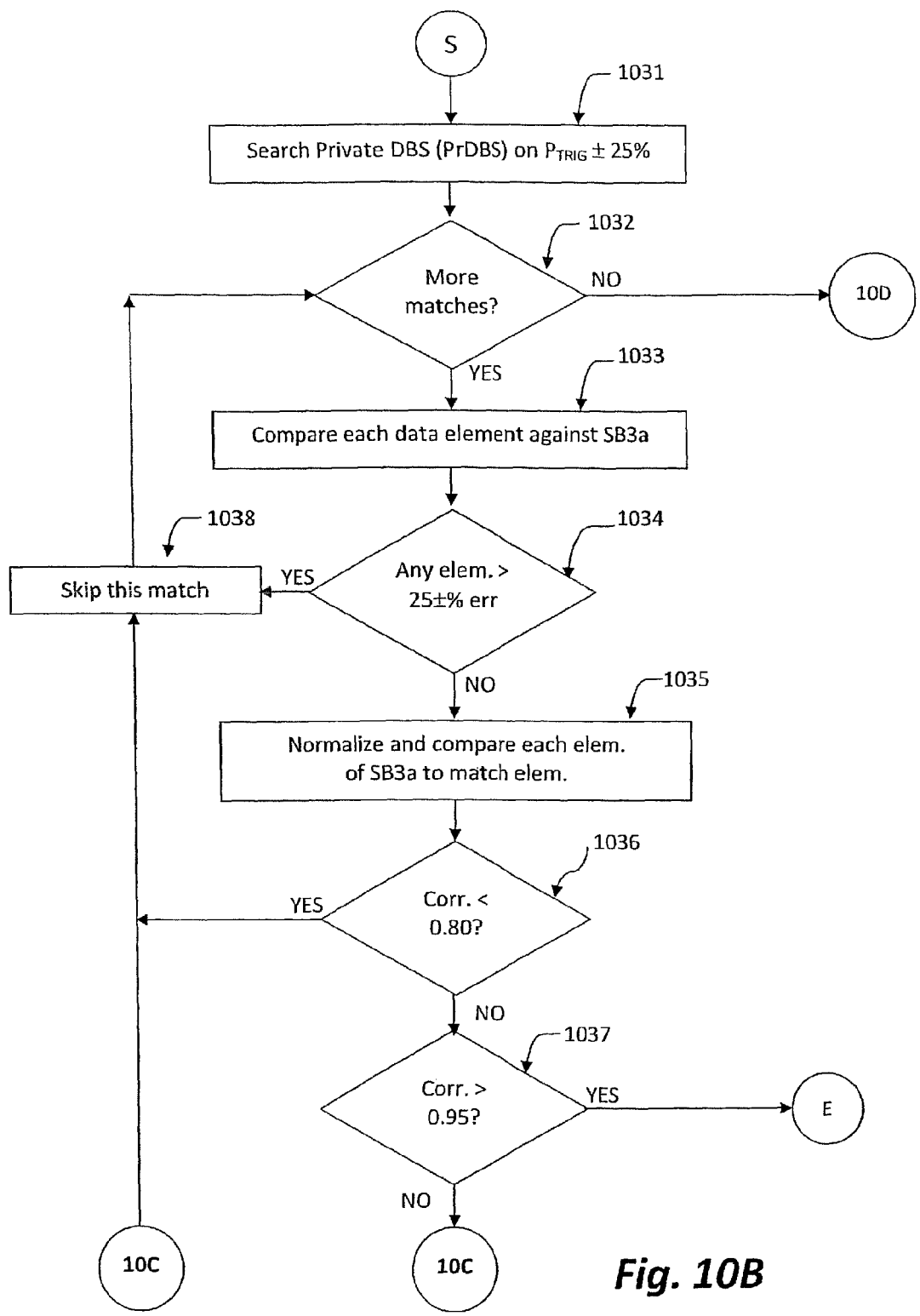
FIG. 10B illustrates a flow diagram of a portion of a method of identifying a device and state from a load signature according to some embodiments.

FIG. 10B illustrates a flow diagram of a method of searching a private database to find a match to a load signature. At step 1031, the private database of load signatures in the energy monitoring device is searched on $_{PRIG}$, for a coarse match such as ±25%. If there are no more matches at step 1032, then the method exits to FIG. 10D for further analysis. At step 1033, for a match to the search of step 1031, each data element in SB3$a$ of the load signature being looked up is compared against each data element of the match. At 1034, if any element has greater than 25% error, then the match is skipped at step 1038, otherwise the data are normalized at step 1035 and compared again, element by element, to SB3$a$. At step 1036, if the correlation is less than 0.80 then the match is skipped. If the correlation is greater than 0.95 at step 1037, then a match has been found to the load signature and the method ends. Otherwise a second level analysis is performed at FIG. 10C.

Figure 10C:
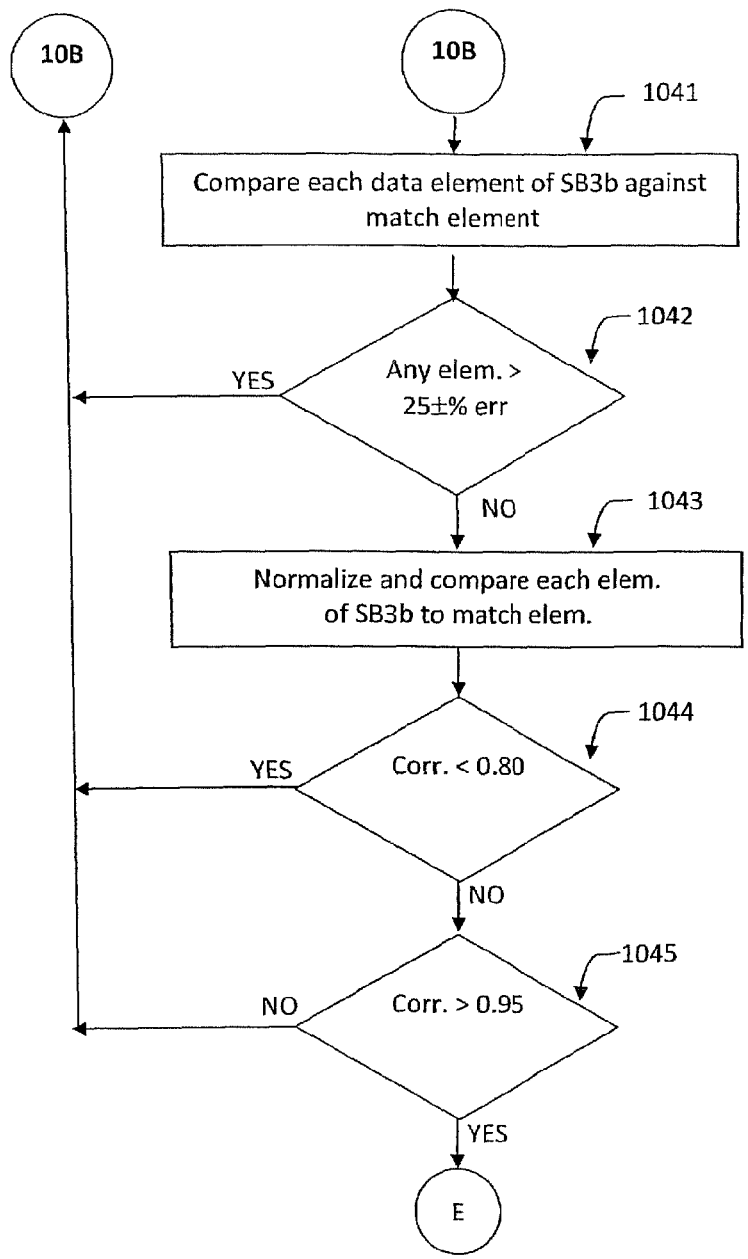
FIG. 10C illustrates a flow diagram of a portion of a method of identifying a device and state from a load signature according to some embodiments.

FIG. 10C illustrates a flow diagram of a portion of a method of identifying a device and state from a load signature according to some embodiments. At step 1041, each element of data subset SB3$b$ is compared against its corresponding element in the match. At step 1042, if any element has greater than 25% error, then the match is skipped and the method returns to FIG. 10B. Otherwise, the data are normalized and compared element by element similar to step 1041. If the correlation at step 1044 is less than 0.80, then the method returns to FIG. 10B. If the correlation is greater than 0.95 at step 1045 then the load signature has been found and the method ends, otherwise the method returns to FIG. 10B.

Figure 10D:
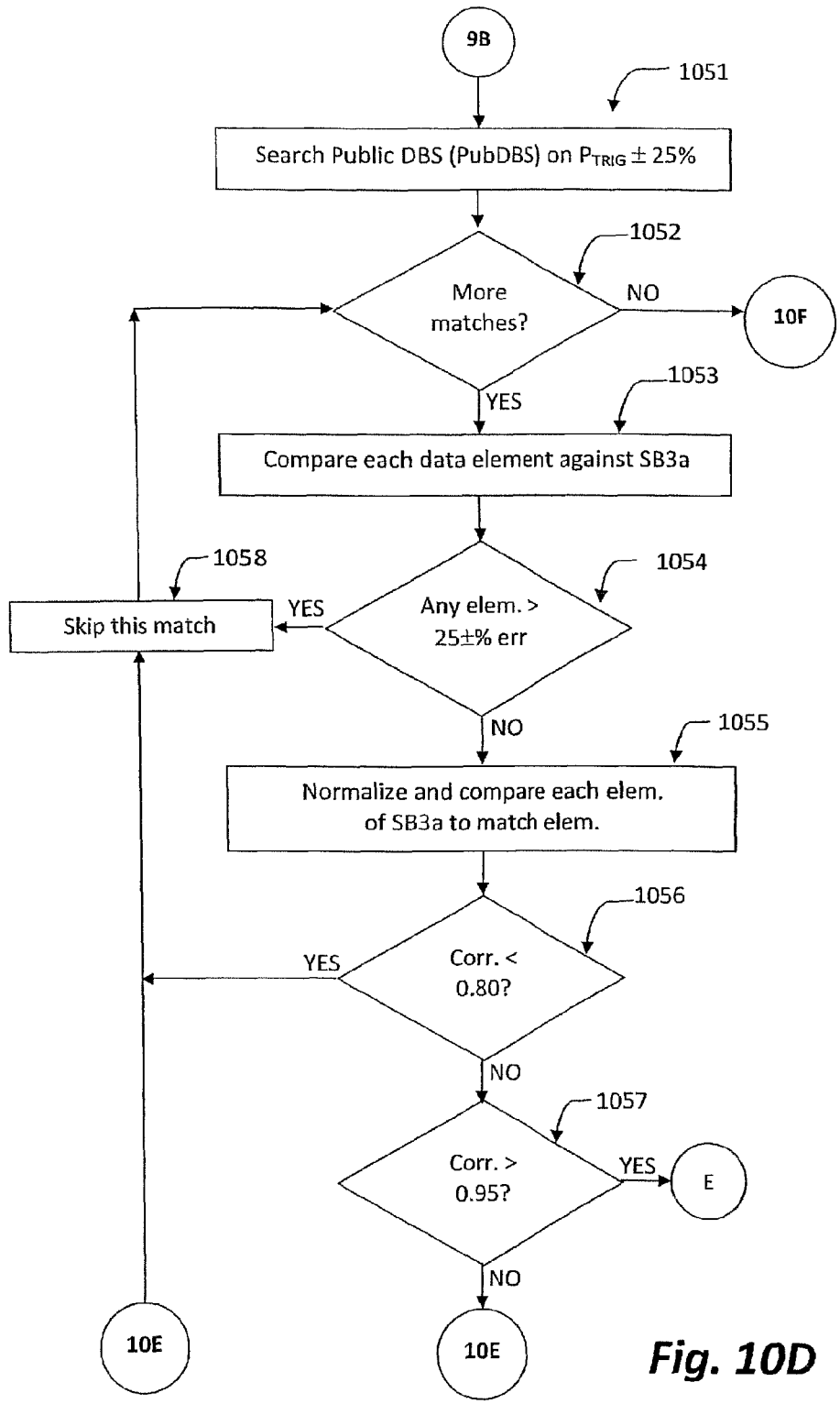
FIG. 10D illustrates a flow diagram of a portion of a method of identifying a device and state from a load signature according to some embodiments.

FIG. 10D illustrates a flow diagram of a method of searching a public database to find a match to a load signature. If the search of the private database does not yield a matching load signature, then the public database is searched at step 1051 on $P_{TRIG}$ with a coarse search of ±25%. If there are no more matches at step 1052, then the method exits to FIG. 10F for further analysis. At step 1053, for a each match to the search of step 1051, each data element in SB3$a$ of the load signature being looked up is compared against each data element of the match. At 1054, if any element is has greater than 25% error, then the match is skipped at step 1058, otherwise the data are normalized at step 1055 and compared again, element by element, to SB3*a*. At step 1056, if the correlation is less than 0.80 then the match is skipped. If the correlation is greater than 0.95 at step 1057, then a match has been found to the load signature and the method ends. Otherwise a second level analysis is performed at FIG. 10E.

Figure 10E:
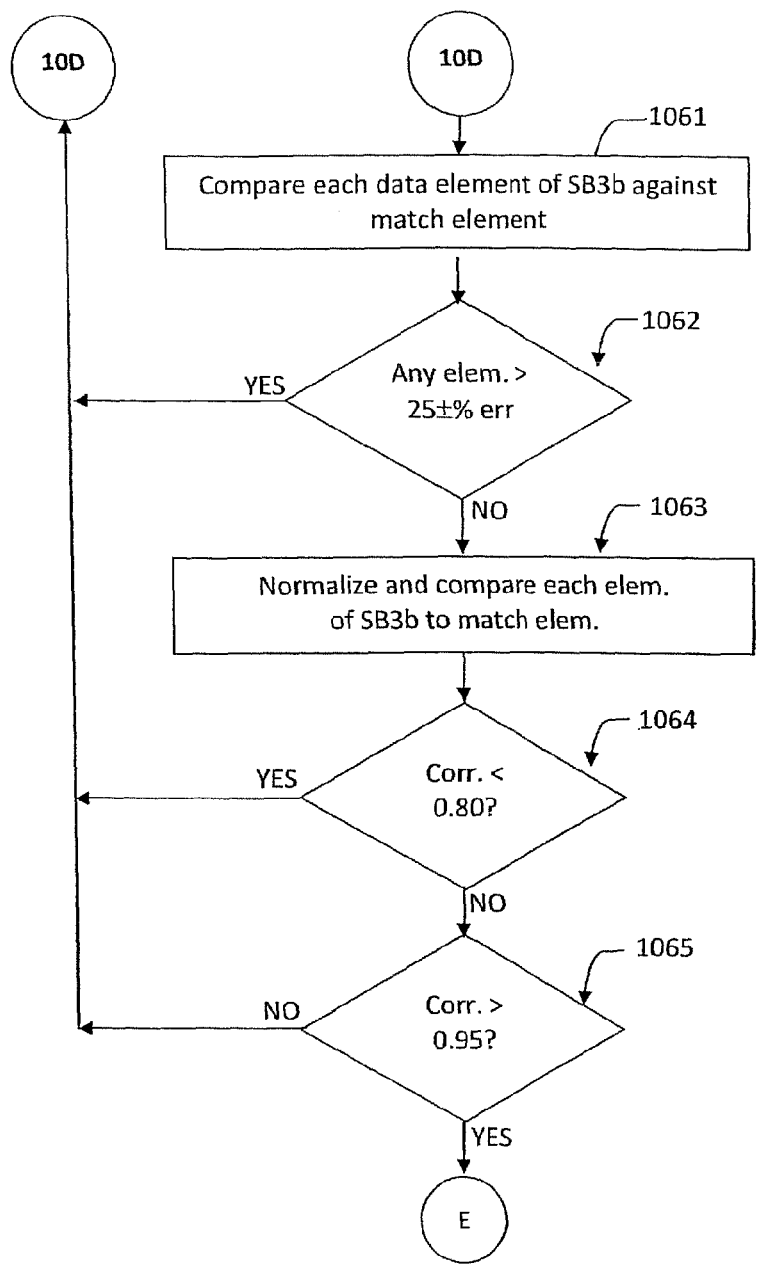
FIG. 10E illustrates a flow diagram of a portion of a method of identifying a device and state from a load signature according to some embodiments.

FIG. 10E illustrates a flow diagram of a portion of a method of identifying a device and state from a load signature according to some embodiments. At step 1061, each element of data subset SB3*b* is compared against its corresponding element in the match. If any element has greater than 25% error, then the match is skipped and the method returns to FIG. 10D. Otherwise, the data are normalized and compared element by element similar to step 1061. If the correlation at step 1064 is less than 0.80, then the method returns to FIG. 10D. If the correlation is greater than 0.95 at step 1065 then the load signature has been found and the method ends, otherwise the method returns to FIG. 10D.

Figure 10F:
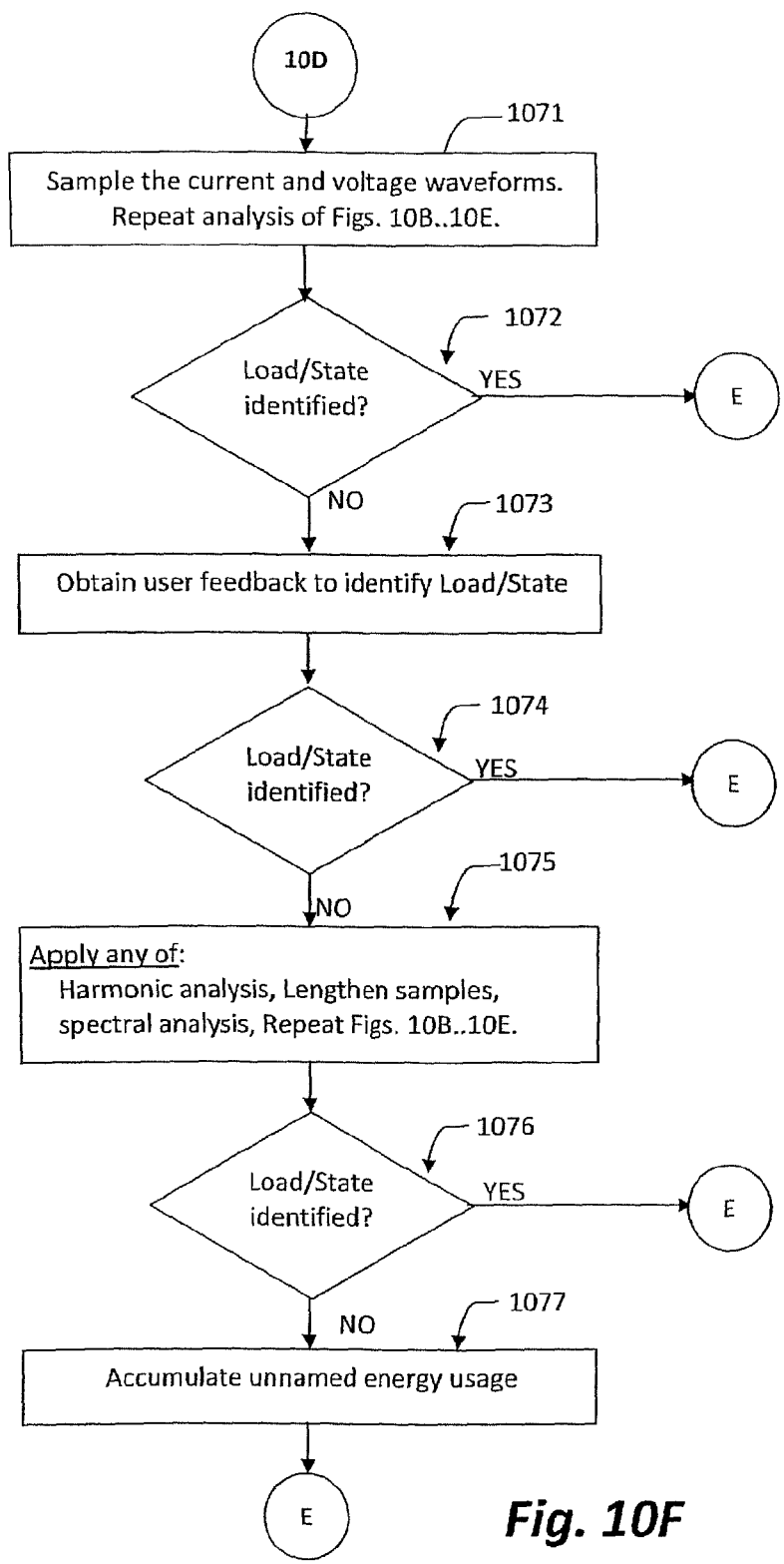
FIG. 10F illustrates a flow diagram of a portion of a method of identifying a device and state from a load signature according to some embodiments.

FIG. 10F illustrates a flow diagram of a portion of a method of identifying a device and state from a load signature according to some embodiments. At step 1071, the current and voltage waveforms are sampled. The steps in FIGS. 10B through 10E are repeated. If the load signature is identified at step 1072, then the method ends. Otherwise the user is prompted for feedback to assist in identifying the load and state. If the user identifies the load and state then the method ends, otherwise additional analysis is performed, including but not limited to harmonic analysis, lengthening the samples, spectral analysis, and re-running the analysis of FIGS. 10B through 10E. If the load signature still cannot be identified, then the energy usage is accumulated and reported as "unidentified energy usage.

Figure 11:
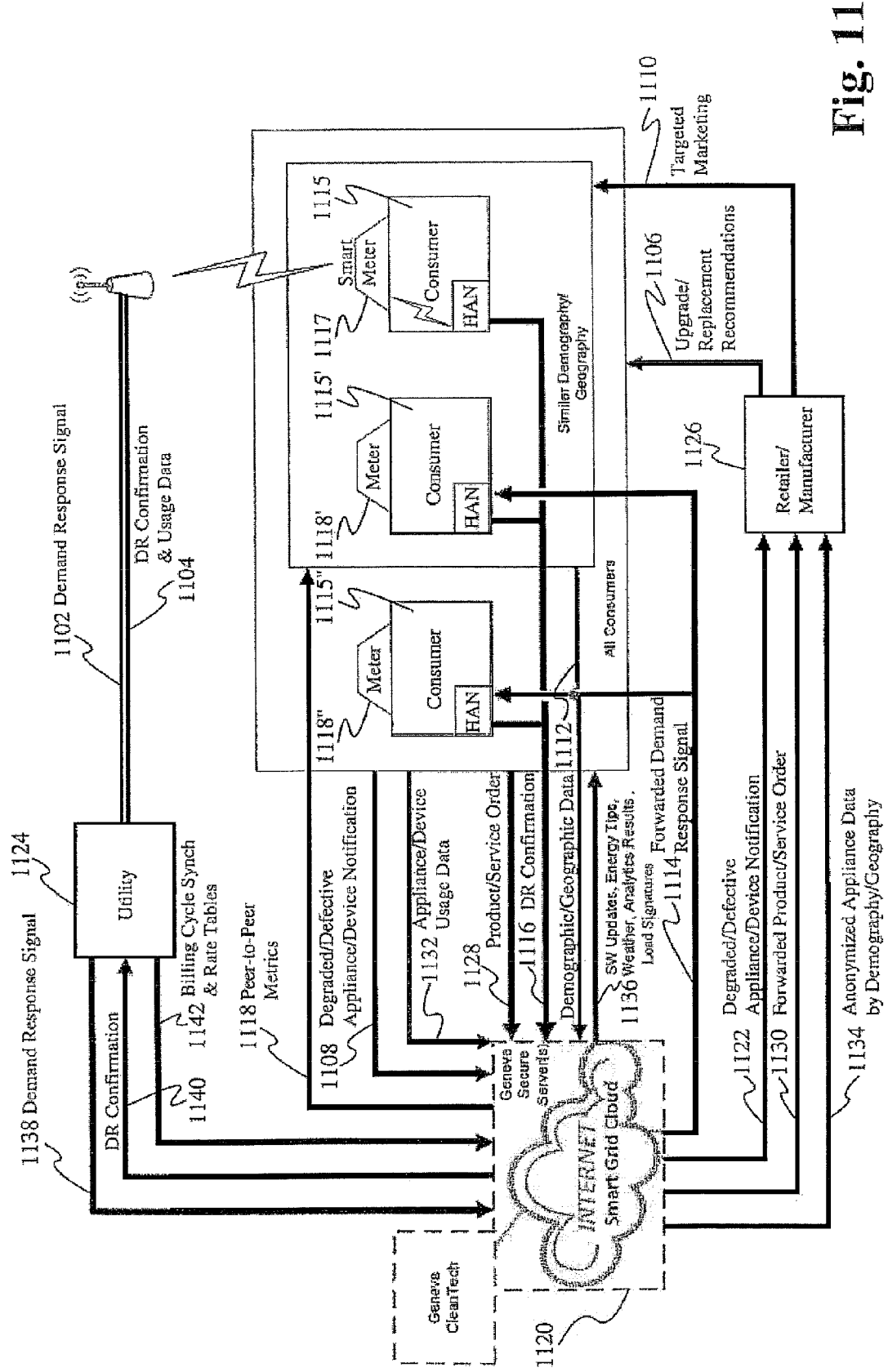
FIG. 11 illustrates a flow diagram of information between a utility, a property, and a public database according to some embodiments.

FIG. 11 illustrates a flow diagram 1100 of information between a utility 1124, a property 1115, 1115', and 115", and a public database 1120 according to some embodiments. Many aspects of the processing and storage of energy monitoring data take place within the property owner's premises. An application running on a property owner's personal computer or other local computing device can be used to process the energy monitoring device's raw data and to generate the information that is to be made available for remote access by the property owner, and optionally to a public database. In some embodiments, raw, unprocessed data is transmitted to a property owner at a remote location, and optionally to a public database of energy usage information. In those embodiments, the raw data will need to be secured so that the data is not intercepted and misused by criminals, law enforcement, solicitors and others.

Many utilities are now using "Smart Meters". Data passed by a utility 1124 to a consumer's smart meter 1117, or standard meter 1118', 1118", including a DR Signal 1102 and smart meter usage data 1104, is out of the control of the energy monitoring device and is thus not secured by the energy monitoring device. Retailer or Manufacturer upgrade/replacement recommendations 1106, tagged as referrals opted-into by a property owner, are forwarded to the property owner based on opted-into services by the user based on earlier notifications supplied to the retailer/manufacturer regarding defective or degrading appliances 1108. Retailer/manufacturer targeted marketing programs 1110 can be generated by processing demographic and/or geographic information 1112 furnished to retailers based on opted-into services by a user.

A forwarded demand response (DR) signal 1114 is one that has been generated by an opted-into service in response to a utility-originated DR Signal 1102 and broadcast to specific participating consumers 1115, 1115' and 1115", in the effected outage block(s) identified by the utility. Information is stored about consumers who have opted-in to, or who are required to participate in, demand response programs whether the consumer has a smart meter or standard meter. A forwarded DR signal 1114 is no different, from a security standpoint, than a DR signal 1102 generated by the utility.

A demand response (DR) confirmation 1116 is forwarded from the confirmation received by the opted-into services for users opting-into the DR program. There is no requirement for encryption or security unless usage data is also required.

Peer-to-peer metrics 1118 are comparisons of an individual's or group's data to another individual's or group's data. This data/information must be anonymized to a level where it cannot be associated with an individual consumer. Like a Zillow® listing that shows various attributes of a home such as estimated price, square footage, number of bedrooms and date built, the categories that metrics could be displayed regarding energy efficiency and usage could be similar. However, unlike Zillow®, the consumer's address would not be listed. One could see comparisons like monthly usage at other 4BR, 3BA homes with 4 occupants in the 62xxx zip code or usage per square foot per occupant for a climate zone. Ideally, all data processing for the generation of the metrics is done in the consumers premise and just the metrics are transmitted over the internet from opted-into services.

Appliances have specific spectral or parametric performance characteristics that can be initially benchmarked and then monitored over time. For example, a refrigerator is usually plugged in, set a specific setting, then left to operate over time. A public database hosting system 1120 stores information locally on the consumer's network-connected computer that characterizes the refrigerator's performance and can compare that performance characterization over time on a periodic basis. The comparison identifies significant changes and alerts/advises the consumer via a degraded/defective appliance/device notification 1122. The public database hosting opt-in services can then generate recommendations 1122 such as, "Your refrigerator is using 20% more energy. Did you change settings? If not, consider cleaning coils or calling for service." If the user has opted-in to the Retailer/Manufacturer 1126 interface, a recommendation from the retailer 1126 may be presented to the consumer such as, "It appears that you have a 10 year old refrigerator. If you replace with one of these listed EnergyStar® models you can save between $3.75 and $14.00 per month." Since the information provided is specific to the consumer, it needs to be encrypted at a minimum.

A forwarded product/service order 1128 can be a secured transaction, through opted-into services at the public database 1120. The product/service order 1128 can be forwarded to the retailer/manufacturer 1126 as a forwarded product/service order 1130. Secured transaction are known in the art, such as VeriSign®.

Anonymized appliance data from all consumers 1132 is optionally transmitted from all consumers 1115, 1115' and 1115" via a home area network (HAN) to a public database 1120. The anonymized usage data 1128 can be queried by customers 1115 to compare their own usage with those of similar properties in their area. Anonymizing of usage data 1132 should be done at the property owners premises. At a minimum, all individual usage data transmitted from the public database 1120 to other property owners and third parties needs to be fully anonymized. This anonymized appliance data 1134 is transmitted to, and utilized by, third parties such as retailers/manufacturers 1126 to define targeted marketing programs or new product customer requirements. Anonymization can comprise removing, masking, erasing, or encrypting fields in the data that specifically identify a home address or other personal identifying information.

Services hosted by the public database 1120, that a property owner can opt-in for, are sent via secure line 1136. Services include updated load signatures, energy monitoring device software upgrades, downloadable applications for energy usage analysis, weather information, and analysis of electrical device usage information for a property owner.

A demand response (DR) signal 1138 from a utility 1124 and is broadcast to the public database 1120 and forwarded to users as forwarded demand response signal 1114. The public database system 1120 is capable of responding to all demand response levels from both the apply controls and release controls sides, ultimately settling back into a non-DR state. DR signals 1138 are sent as broadcast signals from the utility or independent system operator 1124.

A demand response (DR) confirmation 1140 is a confirmation signal that is sent back to the utility 1124 indicating that the DR Signal has been received and that the usage controls have been deployed. The DR confirmation is not necessarily a specific usage measurement, but a verification of compliance to the utility's 1124 DR rules.

A utility 1124 can send a billing cycle synchronization signal and tariff tables 1142 to a public database host 1120. The tariff tables enable the public database host 1120 to compute the cost of the used by a property owner based on usage data 1132 sent to the public database 1120. The billing cycle synchronization signal 1142 synchronizes energy usage costs computed from energy usage information 1132 to the utility 1124 billing cycle. The tariff tables and billing cycle information are public knowledge and do not need to be transmitted securely.

A degraded/defective appliance/device notification 1122 is sent to a retailer 1126 when a single appliance or device has been detected, and confirmed, to be operating in a degraded or defective condition. A retailer or manufacturer 1126, and a property owner, can opt-in to a service that informs the retailer or manufacturer 1126 that a property owner's appliance is in a defective or degraded condition based on a defective or degraded appliance notification 1108 from a property owner. When the public database 1120 receives a degraded or defective appliance notification 1108 from a property owner who has opted-in to receive information about upgrades or replacement appliances 1106, a notification 1122 of a defective or degraded appliance is sent by the public database 1120 to a retailer or manufacturer 1126 who has opted-in to receive such notifications 1122, and the retailer upgrade or replacement recommendations 1106 to the property owner. The entire communication loop, from the property owner's energy monitoring device sending a degraded or defective appliance notification 1108 to the public database 1120, the public database 1120 sending a degraded or defective appliance notification 1120 to an opted-in retailer or manufacturer 1126, and the upgrade or replacement recommendation 1106 sent to the property owner, should be both anonymized and secured such the owner's name, appliance information, and contact information are secured. The user will have opted-in through policy or rule-based selections and the information provided will be limited to device type/model#/serial# data as available, plus performance data, but without time of use information. The detection can be performed locally at the energy monitoring device, at a property owner's computing device, or computed from energy usage information 1132 stored at the public database 1120.

Data collection is done locally, and can be processed and analyzed locally, but can alternatively be communicated in batches or streamed, to a specific server, the cloud, or to end-user devices such as smart phone or tablets, where applications could process, post-process, and/or analyze data and present information.

A user opts-in to share demographic/geographic data 1112 with the public database 1120. This data is consumer-specific, but anonymized before being shared outside of the public database 1120. Preferably the data is anonymized before being transmitted from the consumer's property 1115, 1115', and 1115". Alternatively, the data can be broken into parts and data that is of a private nature can be encrypted, while other non-sensitive data is transmitted separately.

Appliance/device usage data 1132 should be secured by the most secure means of protecting consumer data stored locally at their own property. Local processing of this data is preferred to minimize privacy concerns and transmit only anonymized and summary data. Where this is not possible or preferred, the highest level of security using AES, RSA or PGP type encryption, soft keys and perhaps other means should be applied.

A user interface panel will be supplied, via a web-browser, a downloadable application to a Smart Phone, or personal computer, or via the energy monitoring device, allowing the consumer to make binary choices and/or rules-based settings related to how they want to interface with manufacturers or retailers 1126. Consumers can select to opt-in to the Retailer/Manufacturer 1126 and choose what information, if any, that they are willing to share with retailers, e.g. The Home Depot® or Lowes® or manufacturers, e.g. Whirlpool®, GE®, LG®, Siemens™, or Amana®. There may be benefits to sharing information with retailers/manufacturers in the form of incentives, discounts and/or rebates as well as recommendations for energy savings.

A user interface panel can be supplied, via a web-browser, a downloadable application to a Smart Phone, or personal computer, or via the energy monitoring device, allowing the consumer to make binary choices and/or rules-based settings related to how they want to interface with their utility 1124. Consumers can select to opt-in to the utility's 1124 services and choose what, if any, information that they are willing to share with the utility 1124. There may be benefits to sharing information with their utility 1124 in the form of discounts related to Demand Response (DR) programs or other energy efficiency programs, other incentives or rebates as well as recommendations for energy savings.

A user interface panel can be supplied, via a web-browser, a downloadable application to a Smart Phone, or personal computer, or via the energy monitoring device. The user interface panel allows the consumer to make binary choices and/or rules-based settings related to how they want to interface with the public database 1120 as well as how they would like their energy monitoring system to operate with respect to the public database 1120. Consumers can elect to opt-in to certain aspects of the public database 1120 and choose what, if any, information that they are willing to share with the public database 1120 services. The benefits of sharing data include additional features or functionality, discounts, incentives, rebates, and recommendations for energy savings offered by, or through, the public database 1120 services.

Communication between a utility's 1124 Smart Meter 1117 and property owner's Home Area Network (HAN) is over the Smart Meter's inward facing wireless system, most commonly a ZigBee® network interface. The HAN and Smart Meter will communicate over the wireless protocol with the meter-defined security and privacy protocols.

Figure 12:
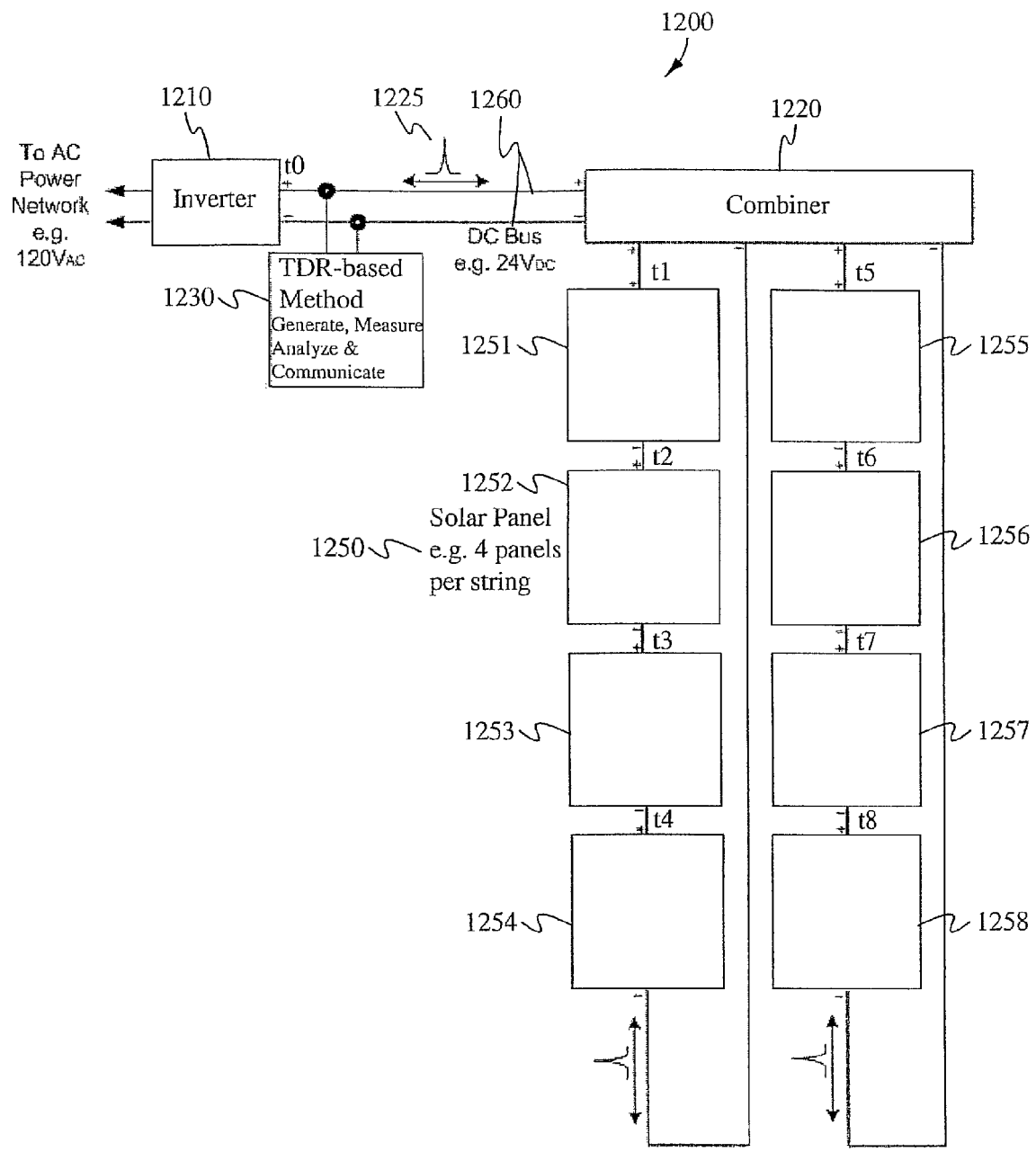
FIG. 12 illustrates a solar panel system coupled to a time domain reflectometry (TDR) system between the solar panels and an inverter coupled to the solar panels according to some embodiments.

FIG. 12 illustrates a solar panel system 1200 comprising an inverter 1210, a time domain reflectometry (TDR) system

1230, a solar panel combiner 1220 and eight solar panels 1251-1258, arranged in to series strings of four panels, 1251-1254 and 1255-1258. The inverter 1210 and the combiner 1220 are coupled together via a VDC bus 1260, e.g. 24 VDC. The TD system 1230 is coupled to the 24 VDC bus 1260. The TDR system can send a pulse 1225 to the combiner, and on to the solar panels. The pulse is reflected back to the TDR system 1230 at times t1 through t8 that vary depending upon which solar panel is reflecting the TDR pulse 1225.

Figure 13:
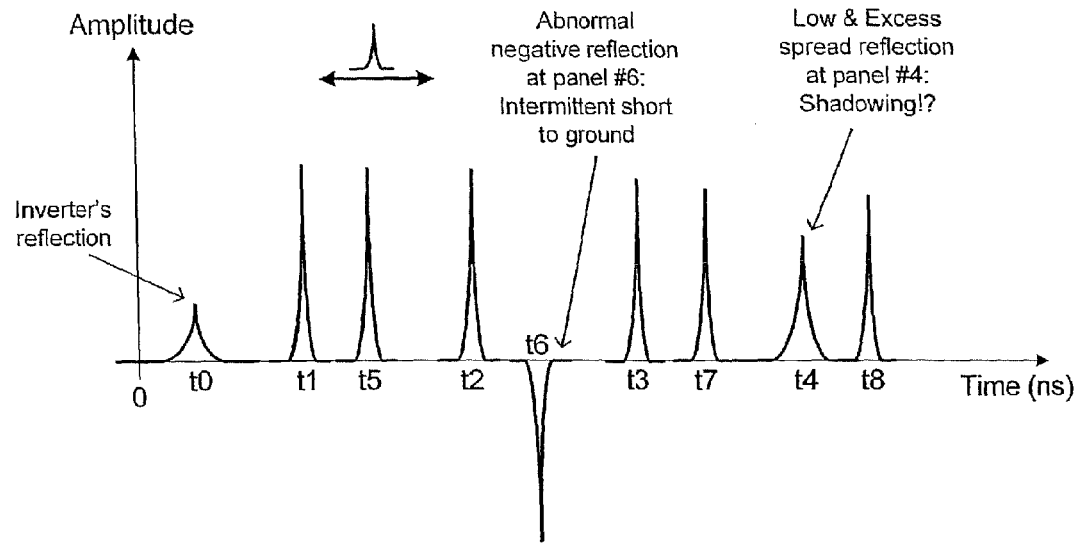
FIG. 13 illustrates a sequence of reflected signals according to some embodiments.

FIG. 13 illustrates a sequence of reflected signals t0-t8 on the 24 VDC bus 1260 of FIG. 12. Reflected signal t0 is the inverter's reflection. The profile of signals t1, t5, t2, t3, t7, and t8 indicate that the panels corresponding to these signals have similar profile and magnitude, indicating a properly working solar panel. Signal t6 is of the opposite polarity of the expected polarity and indicates a possible short to ground. Signal t4 is temporally broader and of a smaller magnitude than the properly working solar panels. Accordingly, the panel corresponding to t4 may be in a shadow or be obscured by debris on the surface of the panel. An appropriate message can be sent to the user's remote display device, such as a Smart Phone.

Figure 14:
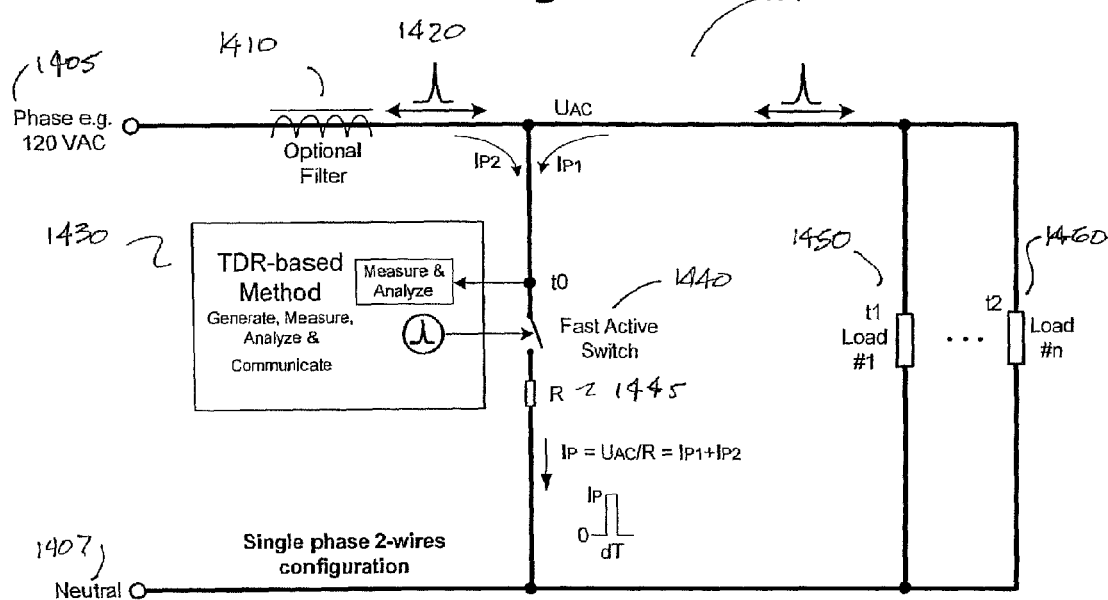
FIG. 14 illustrate a TDR system for use with parallel loads according to some embodiments.

FIG. 14 illustrate a TDR system for use with parallel loads in a low impedance AC power network according to some embodiments. A TDR system 1430 is coupled between the phase voltage 120 VAC 1405 and neutral 1407. A fast switch 1440 injects a high impedance, current pulse through resistor 1445 into the parallel network of loads 1450 and 1460. The pulse will propagate downward inside the power network property, and upward in the grid with a ratio of the impedance in both directions. The TDR system measures the reflected signal IP1 and IP2. A filter 1410 can be added to be added to a 120 VAC source 1405 for reducing excessive noise on the circuit.

Figure 15:
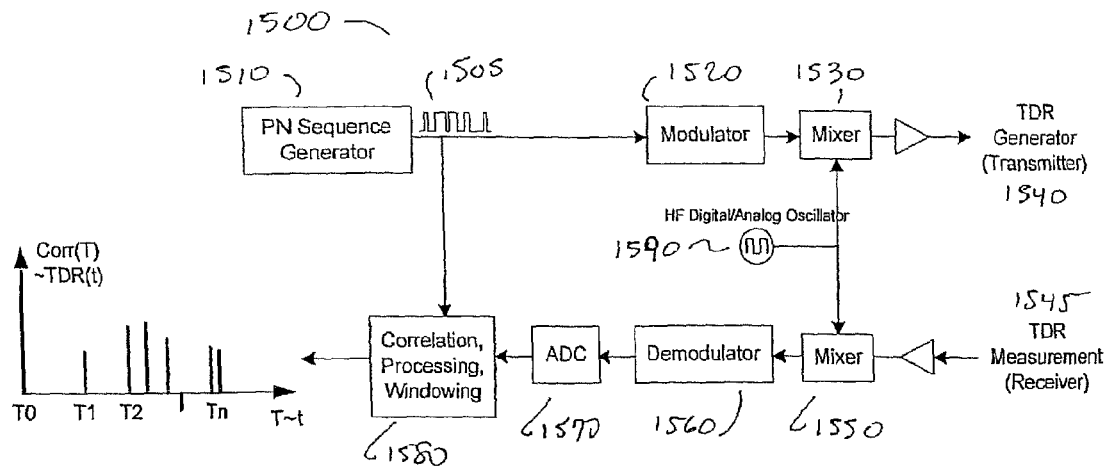
FIG. 15 illustrates a TDR system using autocorrelation and a pseudo noise (PN) sequence according to some embodiments.

FIG. 15 illustrates a TDR system 1500 using autocorrelation and a pseudo noise (PN) sequence. The TDR system 1500 comprises a PN sequence generator 1510, a modulator 1520, a mixer 1530, an input high frequency digital over analog oscillator 1590, a TDR generator output 1540, a TDR measurement 1545, a mixer 1550, a demodulator 1560, an analog to digital converter 1570, and a correlation processing and windowing module 1580. In preferred implementation, a fast pulse 1505 is created, measured and processed in the autocorrelation space rather than in the time space. The autocorrelation of a PN sequence 1505 is close to a single pulse such as with a Dirac delta function. The measured responses 1545 are mixed with the high frequency digital/analog oscillator 1590 at the mixer 1550, demodulated at the demodulator 1560, and converted from analog to digital at the ADC 1570. The digital signal may be processed, decorrelated and can output the impulse response of the power network at module 1580. Benefits include relaxed requirements for generation and measurement of the TDR, and reduction of complexity and cost.

The period of the PN sequence 1505 must be longer than the measurement time otherwise the correlation result may become periodic. Particular care should be given to the TDR generator 1540 and TDR measurement receiver 1545 to avoid the reflections affecting the linearity of any function or component. Part or all of the TDR system 1500 may be borrowed from commercially available technologies such as integrated RF transmitters and receivers. The RF energy is sent through the signal wires in our application oppositely to standard wireless radio where radiated by antennas in free air. This implementation in FIG. 15 may be used with the "TDR Measure, Control and Analyze" and TDR generator blocks of FIG. 16 below. The TDR system 1500 may be implemented as a system on a chip as used for WLAN devices.

The TDR system 1500 can be implemented in baseband and therefore is shifted in frequency (no mixing). This is simpler but may collide with the THD correction method unless time division precautions are taken such as previously taught. Also it may be more susceptible to noise or other electrical or non-electrical parameters of the power network.

Another implementation is TDR generating and measuring voltage pulses, using PN sequence and correlation method being in baseband or RF modulated.

Figure 16:
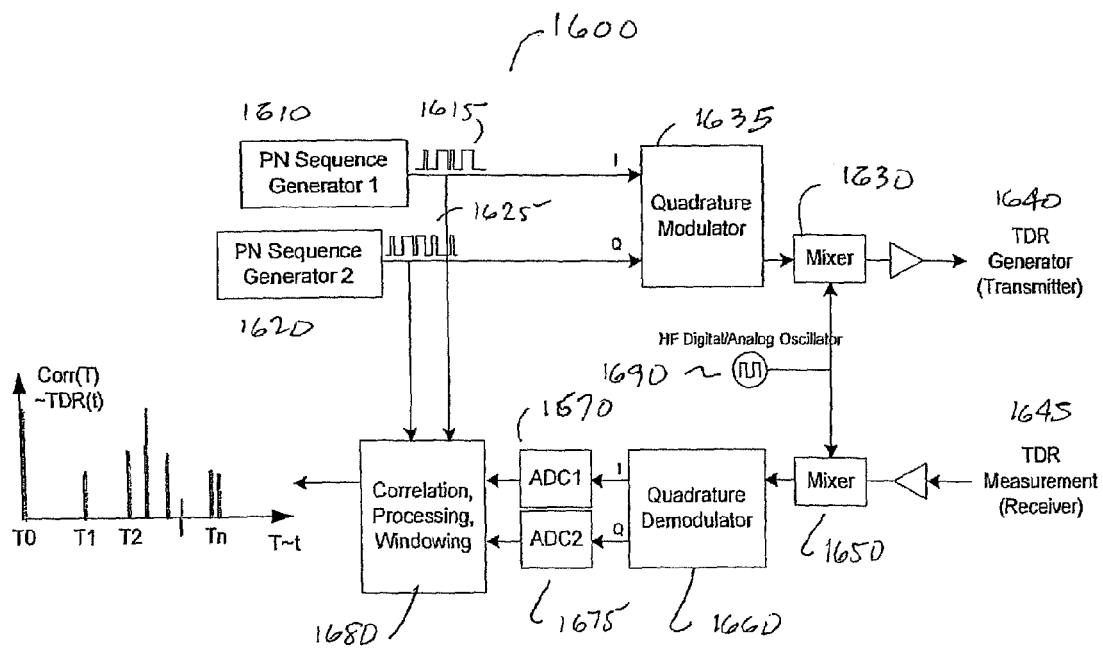
FIG. 16 illustrates a TDR system based on quadrature, according to some embodiments.

FIG. 16 illustrates a TDR system based 1600 on quadrature in baseband or RF. A first PN sequence generator 1610 generates a first PN sequence 1615 to the "I" input of a quadrature demodulator 1635. A second PN sequence generator 1620 generates a sequence PN sequence 1625 to the "Q" input of the quadrature demodulator 1635. The output of the quadrature demodulator is input to a mixer 1630, and mixed with a high frequence digital/analog oscillator 1690. The output of the mixer 1630 is transmitted as the TDR generator output 1640. TDR measurements 1645 are received at a mixer 1650 that is mixed with the high frequency digital/analog oscillator 1690 and output to a quadrature demodulator 1660. The I and Q outputs of the quadrature demodulator 1660 are output to a first analog to digital convertor 1670 and a second analog to digital converter 1675 respectively. The outputs of the two analog to digital converters are output to a correlation, processing and windowing module 1680.

Public Databases

Public Usage Database

The energy monitoring device 100 is able to generate detailed usage information about the electrical devices connected to a customer's power supply and the customer's energy usage. Such detailed information can readily be received and collated by a public database server which is able to be hosted by a widely accessible public database service such as Google®, MSN® or Yahoo®. A public usage database comprises a storage of database records comprising a unique identifier for the energy monitoring device producing the using information, geographic or locality information such as a neighborhood, zip code or street in a city and state, a type of structure, such as home, small business, or industrial, an approximate square footage of the structure in which energy using devices are located and an identifier for the class of a device, such as electronics, appliances, lighting, etc, or an identifier of a specific device. Query tools can be used to access the database records, as described in FIG. 4. At a minimum, the query tools enable an energy monitoring device to lookup a load signature and an associated state for an electrical device. Other parties interested in hosting information can comprise manufacturers hosting load signature databases of their products, testing laboratories hosting databases of load signatures, and energy-saving enthusiasts. Information stored in the public usage database can be as detailed as the configuration of the energy monitoring device 100 is capable of producing, and as limited as the user is willing to share, as controlled by the customer's configuration of the energy monitoring device. Detailed information can include the manufacturer, model, and purchase date of a specific electrical device, the time and date which a specific device changes state, the room in which a device is installed, the user typically using the device, the total energy usage and time duration in specific state, the cost of the usage, and the tariff schedule used. Detailed information can further comprise generic appliance information, e.g., a ¼ HP electric drill (no manufacturer), a 12,000 BTU air conditioner, or a 40 W incandescent light bulb. Generic device information is able to be uploaded from users, or computed or estimated from analysis of one or more similar devices. Customer demographic information can also be stored such as the zip code and street on which a customer lives or works, the number of people in the household or business, and the square footage of the household or business. The public usage database is able to aggregate the detailed information and provide query tools to inform customers as to the usage patterns of other energy users. The public usage database can further comprise a forum for suggestions by users as to how they reduced their energy consumption such that similarly situated energy users are informed of known options for reducing energy usage. One skilled in the art will recognize that a wide variety of energy user profile information can be added to the detailed usage information to enable broad public awareness of energy usage patterns, thereby enabling a wide spectrum of energy-saving tools. The availability of detailed energy usage information provided by the energy monitoring device 100 and its associated private databases, enables the implementation of the public usage database.

Public Electrical Device Database

A record in a public database of electrical devices is able to comprise an identifier for the electrical device, the manufacturer, model, part number, country of origin, software version, hardware version, nominal device voltage, maximum rated amperage, and a list of states of operation of the electrical device. As individual users utilize their energy monitoring systems, the users are able to export their private databases of electrical devices to populate the public electrical device database. In addition, the public database of electrical devices is able to be populated through database administration methods such as manually entering device data, or receiving device data via upload from manufacturers.

A user is able to connect his energy monitoring device to his laptop computer having an internet connection. An application on the laptop computer enables the user to enter information about the electrical devices on his property. The identification information is stored in the energy monitoring device Private Tables. Then, the user can use the interface on his laptop computer to download additional electrical device information and initial load signatures for his electrical devices from a public electrical device database, as described above. Alternatively, the energy monitoring device can access the internet itself and download the additional electrical device information and initial load signatures from a public electrical device database. In another embodiment, the energy monitoring device can be directed to download the additional electrical device information from the public electrical device database using the keypad and display interface on the energy monitoring device. The energy monitoring device can further access a public database having links to manufacturers' web sites to access the necessary information. Alternatively, the energy monitoring device can access an application on a server where the application is programmed to lookup a location where the necessary information is stored, and forward the information to the energy monitoring device. The user can also manually program the energy monitoring device with the necessary information to access a public electrical devices database. This process can be especially helpful for initial setup of the energy monitoring device for appliances having many widely varying operating states and load signatures, such as a washing machine, dishwasher, or heating, ventilating and air conditioning device.

As described below, an appliance can have an energy monitoring device embedded in the appliance, called an Energy Aware Appliance. Energy Aware Appliances can request a load signature from the public electrical device database for a specific state of the appliance. Alternatively, an Energy Aware Appliance can request load signatures for a plurality of states of the appliance. Information downloaded from a public electrical devices database can then be downloaded into the private load signature tables of the energy monitoring device to provide an initial set of load signatures for the energy monitoring device. Energy Aware Appliances can further be pre-programmed by the manufacturer with an initial set of load signatures and the other information listed above for a public electrical devices database.

Public Electrical Device States Database

Records in a public database of electrical devices states are able to comprise a device identifier, a state identifier, a state description, and a load signature for the state. As individual users utilize their energy monitoring systems, the users are able to export their private databases of device states to populate the public electrical device states database. In addition, the public database of electrical device states is able to be populated through database administration methods such as independent testing laboratories providing device state load signatures to the public database, or manufacturers uploading states and/or load signatures for their electrical devices.

Public Load Signature Database

Records in a public database of load signatures are able to comprise electrical device identifier information, as described for the public electrical device database above. The public database of load signatures is further able to comprise generic devices and types. For each state of each device type, a load signature, as described below under Load Signature Algorithms, is able to be stored. Additional information related to a load signature is able to be stored with the load signature for an electrical device and a state, as described in FIG. 5.

Private Database

An energy monitoring device is coupled to a power supply upstream of one or more electrical devices whose energy usage is to be monitored. The electrical devices, and their associated states are stored in a private database accessible to the energy monitoring device. At a minimum, the private database further comprises the load signatures associated with the electrical devices coupled to the power supply, and their states. The energy monitoring device uses the private load signatures database to identify an electrical device, and its state, so that usage information for the device can be reported. For example, a load signature associated with a "Lamp 1" changing state to "ON" is stored in the private load signature database accessible to the energy monitoring device. When a load signature is calculated from successive power supply measurements, the load signature is compared against the private load signature database to identify the electrical device and state associated with the load signature. The private database is able to be created using software tools on the energy monitoring device or on an alternate computing device such as a personal computer. If the private database is created on a device other than the energy monitoring device, then the private load signature database is able to be downloaded to the energy monitoring device via a communications connection such as Ethernet, or a USB port on the energy monitoring device.

In order that the energy monitoring information presented to the user be more meaningful, or actionable, additional tables or lists of information can be populated. Such tables or lists can also facilitate building the load signature database for the connected electrical devices and their states. For example, the private database can comprise a list of rooms in a building, electrical devices in the building, energy users in the building, an associations of users with rooms, and associations of electrical devices with rooms. To facilitate set-up of the energy monitoring device, these data items and relationships can be created on any convenient computing device and downloaded to the energy monitoring device via the USB port, or other communications method, on the energy monitoring device. Example private databases are described below. One skilled in the art would recognize that database fields may be added or deleted.

Rooms Table

A table or list of rooms for a building enables monitoring energy usage by room and by attributes associated with the room. A table or list of rooms can comprise an identifier for the room, a textual description of the room, the square footage of the room, and the type of room (office, bedroom, den, boardroom, utility closet, garage, kitchen, etc.).

Energy User Table

A table or list of energy users can comprise an identifier for the user, a textual description of the user, demographic information such as age group, gender, occupation, title of position, percentage of time the user occupies a given room, the division for which an employee works, an account for which their usage will be charged back to their division, and other user-related information. It is contemplated that user information is often considered personal and will either not be disclosed or exported at all, or will only be disclosed or exported generically, or will be password protected or otherwise non-disclosed.

Accessible Network Devices Table

The energy monitoring device is able to communicate with Energy Aware Appliances comprising an embedded energy monitor, with connected network equipment such as a router or hub, server, and network clients, remote locations such as a public utility web site, web sites which host public databases, web sites of manufactures of the brand of equipment installed in the user's building, and the user's own remote communication devices such as a cell phone, personal digital assistance (PDA), mobile computer, or other remote communication device. Records in the Private Accessible Network Devices database comprises a unique identifier such as an IP address, web page URL, or other access identifier, a text description of the network device, and a set of permissions for access to the remote sites, and by the remote sites. One skilled in the art will recognize that control of access to remote devices by the energy monitoring device can be accomplished by a wide variety of known techniques. Similarly, access control by remote devices to the energy monitoring device can be accomplished by a wide variety of known techniques.

Electrical Devices Table

A table or list of electrical devices can comprise a device identifier, a textual description, a date purchased, a general category of device (appliance, electronics, lights, etc.), a specific circuit number, such as a circuit breaker number, identifying the electrical circuit on the property to which the electrical device is coupled, and a specific type of device (stove, microwave, stereo, computer, refrigerator, washer, etc.). The private database can further include a manufacturer and model number of an electrical device, thus enabling the private database to access a public database of electrical devices to retrieve electrical device information, states, and default load signature information for each state of the electrical device.

Misc. Tables, Lists and Associations

The private database is able to comprise tables or lists of electrical devices, states, users, and rooms can be associated together using well-known relational database techniques to enable detailed energy usage information reporting by room, by user, by device, by date/time, by device, by device and state and such other relevant breakdown as is enabled by the private and public databases. For example, a user may obtain energy usage information by room, and observe that a substantial amount of energy is consumed by his 13 year old son's video game console. He may further view energy usage information for the game console based upon state (ON/OFF) and date and time, to also monitor the amount of time of game console usage. A user is able to view the amount of energy consumed by devices in a specific state, such as STANDBY. Many contemporary devices have a standby state which visually appears very similar to the OFF state, but consumes power. A user can query the private databases to find the devices which are in STANDBY mode, and power OFF those devices thereby saving an identifiable amount of energy.

One skilled in the art would recognize that populating the private database, and its associated tables, lists and associations, is most expediently accomplished using a conventional computing device with access to the public databases, then downloading the initialized private database to the energy monitoring device.

Privacy of Energy Monitoring Information

As described above, the energy monitoring device receives, collects, and exchanges a great deal of information for multiple purposes and audiences. As with any information system, privacy and security are important issues with respect to the energy monitoring device described herein. The following illustrative, non-limiting, examples describe some of the privacy features for the energy monitoring device.

Exchange of Information Between the Energy Monitoring Device and the User.

Using the interface on the energy monitoring device, an energy monitoring display device, a computer, or other electronic device having a user interface, a memory and a processor, the user can populate the Private Database on the energy monitoring device described above. The Private Database can contain a description of the property including the property owner's name, contact information, device forwarding information such as the property owner's email address or cell phone number, a login for the property owner or other user, a table of rooms on the property, a table of energy users on the property, and a table of electronic devices on the property, their states and load signatures. A property owner can create relations between the tables such as creating a relation between a room and the property owner's daughter, "Susie." The table of electronic devices can further be related to the rooms such that it is possible for the energy monitoring device to determine whether a device in Susie's room is on or off at any given time based on a load signature of the device. The above information is private to the property owner and can be secured by a login with a password, a secure login, encryption, or other means as known in the art.

The user can locally or remotely access the energy monitoring device to view current energy usage information, check the status of electronic devices on the property, configure the energy monitoring device, request usage reports, and download and store energy monitoring information for analysis or archival. Access to the above information can also be secured by a login with a password, a secure login, encryption, or other means as known in the art.

Exchange of Information Between the Energy Monitoring Device and a Public Database One goal of the energy monitoring device is to share usage information so that the public can become informed as to energy usage norms for similar properties with similar electronic devices on the property. As discussed above, some of the usage information is private, such as whether or not the property owner's daughter is home. In order to maintain the security of each household, certain information can be made anonymous. When transmitting energy usage information to a Public Database, the information identifying the property can omit detailed information about the individual energy users, truncate the property zip code, or only list the city and state, and state the property description generically, such as "Residential property, 1920 square feet, 3 bedrooms, 2 bathrooms". Any information specifically identifying a property to an energy monitoring device IP address or other unique identifier can be omitted when transferring energy usage data to the Public Database.

A user may choose to opt-in to certain energy saving programs such as receiving notifications of sales on energy saving appliances, receiving recommendations and advice on repair or replacement aging appliances based on energy usage information. To facilitate these opt-in programs, the user must furnish at least enough information to the Public Database service to receive notifications from the opt-in services, and to pay for the services to which he opts-in. Opt-in for programs can be by registration with a service on a Public Server, or hosted by a private service, and the user can opt-in to programs by registering with the service as is well-known in the art, including a login account with the service. Thereafter, the user can maintain his account to update contact information, opt-out of services, or opt-in to new services by logging into his account. Payment for goods and services can be by secure transaction as is known in the art.

An energy monitoring device may periodically require software updates. An opt-in service can provide software available for download, for a fee or otherwise, using a secure transaction as described above for payment of other goods and services.

Exchange of Information Between Public Databases and Manufacturers

As described above, a Public Database and associated services can be hosted by a private service provider or other Internet web host, such as Google® or Yahoo®. Some services may benefit by setting up a business relation with manufacturers of electronic devices. A user can opt-in to a service to receive notifications regarding discounts on appliances that are similar to his current, aging, device. The user would like to be able to make a buying decision that takes into account features of the appliance, including whether the appliance is Energy Star® rated, what the estimated cost savings may be, and the load signatures associated with the electronic device. Manufacturers can further provide detailed information about their appliances to a service for storage in the Public Database. Since it is in the manufacturers' interest that appliance information be widely disseminated, privacy issues are not implicated in the transmission of appliance information.

Exchange of Information Between Manufactures and Users

In addition to manufacturer information received via an opt-in service on a Public Database, the manufacturer can host such information and the user can opt-in to the service with the manufacturer. Thus, a user who prefers Amana® appliances could opt-in to a similar service as described above except that the service is hosted by Amana® and the user only receives information about Amana® appliances. Again, the manufacturer's information need not implicate privacy issues. If the user chooses to purchase an appliance or service directly from a manufacturer, the sale can be accomplished through a secure purchase transaction as is known in the art.

Exchange of Information Between a Utility and a User

A utility and a user can exchange information between the utility and the user's energy monitoring device. The utility can electronically send the user's periodic energy bill to the energy monitoring device, notify the user of planned outages, notify the user of recovery after a power outage, make recommendations as to a tariff schedule change that would reduce the user's energy costs, make recommendations as to energy usage scheduling that would reduce the user's costs and help the utility manage the grid at peak energy usage periods. The user can also receive notifications of incentive programs offered by the utility. Since the exchange of information is ultimately with the user, the information exchange can be by login, by secure socket, encryption, or other secure means as known in the art.

In some areas, utilities have begun installing "Smart Meters" which provide the utility with the information the utility requires. In all other areas, the energy monitoring information collected by the user can assist the utility with managing its grid. The utility can offer the user an incentive to furnish detailed energy usage information to the utility. The energy usage information transferred to the utility necessarily requires identification of the property, but does not require identification of specific electronic devices, rooms, or names of energy users on the property. Thus, the energy monitoring information can be made generic to the extent that it omits, or makes generic, some information about the user and the property. The transfer of usage information to the utility can be via a secure connection as described above and as known in the art.

The energy monitoring device can receive a demand response signal from the utility, and furnish a demand response confirmation, optionally including energy usage information, to the utility. The demand response confirmation and optional energy usage information can transmitted to the utility via a Smart Meter on the property. For a property not yet using a Smart Meter, the demand response confirmation, and option energy usage information, can be transmitted to the utility via a public database. Property-specific energy usage information routed through the public database can be made anonymous as described above.

A user can further review and pay his energy bill via the energy monitoring device. Payment is by secured transaction as described above and as known in the art.

Improving the Granularity of Energy Monitoring

It can become difficult to discriminate between electrical loads when a property has many electrical circuits, where there are many dozens of electrical loads and states to identify, and where the circuits are noisy or have poor power factor. In the following example embodiments, multiple energy monitoring devices can be used to improve the granularity of energy monitoring.

In one embodiment, an energy monitoring device can be installed between the mains breaker for the property and a circuit breaker panel, and additional energy monitoring devices can be installed in each circuit breaker as shown in FIGS. 1E and 1F. In a residential property, lights are frequently installed on one circuit and wall outlets are installed on another circuit. Large appliances are typically on their own circuits, such as a washer/dryer in a garage. Ground-fault protected circuits are often on yet another circuit. A current limiting shunt can be installed on a circuit such that the maximum wattage to measure on a circuit is limited by the current shunt value times the voltage. The energy monitoring device for the circuit can be programmed with a maximum wattage value. An analog to digital convertor (ADC) in an energy monitoring device on a circuit measures a plurality of electrical parameters for a load on the circuit. The ADC has a fixed number of bits with which to perform measurements. By limiting the maximum current and wattage to measure on the circuit, the ADC can dedicate more bits to measuring the load, thereby increasing the granularity of measurements. For example, a 12-bit ADC can distinguish 4,096 data points. If a circuit carries up to 4,000 Watts, then about 1 bit per Watt is used to distinguish loads. If the same circuit is current limited to 1,000 Watts, then 4 bits per Watt can be used to distinguish loads, thereby increasing granularity.

In another embodiment, major appliances such as a refrigerator, washer, dryer, dishwasher, or heating ventilating and air conditioning unit, can each have their own energy monitoring device, preferably embedded in the appliance. As discussed below, in "Energy Aware Appliances", when an energy monitoring device is embedded in an appliance, the appliance can inform the energy monitoring device of the state that the appliance is currently in and the state to which it is about to change, and can further confirm that the state change has occurred. For example, a refrigerator can inform an embedded energy monitoring device in the refrigerator that the refrigerator is about to turn on the ice maker, or about to start a defrost cycle in the freezer. The embedded energy monitoring device in the refrigerator can then notify a master energy monitoring device of the upcoming state change, and that the embedded energy monitoring device in the refrigerator will compute the load signature. The embedded energy monitoring device computes the load signature for the state change in the refrigerator, and notifies the master energy monitoring device of the state change so that the master energy monitoring device will account for the energy usage due to the new state of the refrigerator. Thus, the master energy monitoring device need not utilize the computational resources, and need not use the dynamic range, to account for load signatures triggered by a state change in an Energy Aware Appliance.

Monitoring of Non-Electrical Data

The energy monitoring device can comprise general purpose digital and analog inputs for monitoring non-electrical data. In some embodiments the energy monitoring device is coupled to a water meter and a gas meter on the property. The energy monitoring device can collect water and gas usage information in addition to energy usage information that the property owner can access via an application on the energy monitoring device, an energy monitoring display device, or other electronic device comprising a user interface, a processor, and memory. The energy monitoring device can be also be coupled to electrical devices such as self energy generation to control and monitor them. Self generating energy systems include battery-based and capacitor-based electrical storage, a hydro-electric system, a water reservoir storage, compressed gas storage such as air, steam, and other gases, a solar panel system, a geothermal system, a wind power system, and a co-generation system such as a natural gas and steam turbine driven co-generation system. Other non-electrical information can include the temperature and atmospheric pressure as reported by a home weather sensor unit, the temperature of water in a hot water heater, the average temperature of the $n^{th}$ floor of the property, the outdoor temperature of the property in the sun and/or in the shade, the temperature of cold water on the property, steam temperature, hot water or gas pressure, flow of water, flow of gas, flow of oil, flow of steam, flow of hot water, the temperature of solar heated water, compressed fluid for refrigeration, presence detection of people, animals, moving objects per location on the property where an appropriate sensor is located, light detection for sensing room lighting, and time of day, sound level in a location on the property where an appropriate sensor is located, and the status of doors and windows on the property. Use of the foregoing detection, in conjunction with detailed energy monitoring can give a user a clear picture of their energy usage and property status. As an example, a user can detect the presence of a person on the property, that a window open, and that the air conditioner on, on a day where the outdoor temperature is over 100° F. Cool air exiting through the open window represents wasted energy and money. A user could send an appropriate message to the person on the property to close the window, or close the window remotely if the window supports automated closure. One skilled in the art would recognize numerous such combinations of energy monitoring with other sensors to detect and reduce wasted energy. An energy monitoring device can interface to a home security system. The energy monitoring device and the home security system can communicate via Energy Aware Appliance Protocol, or other protocol as appropriate.

Correlation Between Several Electrical and Non-Electrical Parameters and Energy Consumption Consolidation In order to determine the source of consumption and consolidate various energy parameters, the method may correlate various processes in time synchronicity. For example to determine the consumption of the heater to heat 100 gallons of water, the system may preferably monitor a few processes simultaneously in order to derive an accurate result. Correlation may not be possible or difficult to achieve without detailed monitoring and synchronous control of several energy parameters. This permits to provide the total energy consumption overview to the end user, improve appliance detection as results of analyzing and combining several electrical and non electrical parameters, provide the next level in water, gas and hot water monitoring and how they relates with electricity consumption, and consolidate appliances that use several source of energy such as gas, water and electricity.

Public Utility Interface

The energy monitoring device 100 provides a convenient electronic communications interface between a public utility and an energy user. As a part of a power utility's customer account records, the public utility is able to store the IP address of the customer's energy monitoring device 100, or other identifier such as an email address or web URL of the user's home network, to communicate with the user's home or business communications network, and with the customer's mobile devices such as a cell phone, personal digital assistance, pocket PC, or other mobile computing device. The public utility is able to receive the customer's energy usage information, if the user configures his energy monitoring device 100 accordingly, and the public utility is able to transmit messages to the customer relevant to his account and information relevant to his energy usage. Such information can include new tariff schedules, notices of incentives and offers relevant to energy usage, notifications of the customer's account status such as when a bill is due or overdue, advice to the customer on ways to reduce energy usage such as timed scheduling of the use of certain high usage devices like HVAC units, washers, and dryers. The power utility is further able to inform the user as to how his energy usage compares to that of others in his neighborhood. One skilled in the art would recognize that the above information can be transmitted to the energy user, or queried by the energy user. The communications and information infrastructure enables bi-directional communication between the energy monitoring device 100 and the public utility 170.

Load Signature Algorithms

A load signature, as used within the present-claimed invention, is a plurality of parameters of a power supply, measured or calculated, in response to a change in state of an electrical device coupled to the power supply downstream of the energy monitoring device. The energy monitoring device measures power supply parameters from the power supply and computes additional power supply parameters from the measured parameters. A change in a power supply parameter, such as active power, may indicate a change of state in an electrical device coupled to the power supply.

In a preferred embodiment, a multi-stage approach is used for detecting a load signature for a state of a device in a network of electrical devices. For this embodiment, four subsets of data are used: SB1a, SB1b, SB2a, and SB2b. SB1a includes the parameters most used of the time for carry out a first level load detection. SB1b includes useful parameters of first level but typically not used to detect a load signature. SB2a includes the parameters most used for carry out a second level load detection. SB2b includes useful parameters of second level but not typically used to detect a load signature.

In a preferred implementation of 3-wire single phase configuration (phase, counter phase, neutral), the signature is the four (4) subsets of data of the following parameters.

TABLE II

Subset SB1a

| Data element | Description |
|---|---|
| CFG | Connectivity of the Load (phase to neutral, phase to counter phase, or counter phase to neutral) Value 0, 1 or 2. |
| $THD\_P_{PH}$ | Active power THD plus noise of the phase |
| $THD\_P_{CPH}$ | Active power THD plus noise of the counter phase |
| $THD\_Q_{PH}$ | Reactive power THD plus noise of the phase |
| $THD\_Q_{CPH}$ | Reactive power THD plus noise of the counter phase |
| $P_{PH}$ | Active Power of the phase (Fundamental and harmonics up to a maximum sampling bandwidth) |
| $P_{CPH}$ | Active Power of the counter-phase (Fundamental and harmonics up to a maximum sampling bandwidth) |
| $Q_{PH}$ | Reactive Power of the phase (Fundamental and harmonics up to a maximum sampling bandwidth) |
| $Q_{CPH}$ | Reactive Power of the counter-phase (Fundamental and harmonics up to a maximum sampling bandwidth) |
| $U_{PH}$ | RMS Voltage of the phase (Fundamental and harmonics up to a maximum sampling bandwidth) |
| $U_{CPH}$ | RMS Voltage of the counter phase (Fundamental and harmonics up to a maximum sampling bandwidth) |
| Quiescent/ Inrush current | 10-90% establishment time |

TABLE III

Subset SB1b

| Data element | Description |
|---|---|
| L_ST | Load added or removed (1 or 0) |
| LT_LS | Last time load added or removed, YYYYMMDD, HHMMSS |

TABLE III-continued

Subset SB1b

| Data element | Description |
|---|---|
| SPG | Self power generation in the network of devices (0, 1, or 2). 0 means none, 1 means 1, 2 means several. |
| LT_CH | Last time of change, YYYYMMDD, HHMMSS |
| $PFU_{PH}$ | Fundamental Active power of the phase (harmonics removed) |
| $PFU_{CPH}$ | Fundamental Active power of the counter phase |
| $QF_{PH}$ | Fundamental reactive power of the phase |
| $QF_{CPH}$ | Fundamental Reactive Power of the counter-phase |
| $SF_{PH}$ | Fundamental Apparent Power of the phase |
| $S_{PH}$ | Apparent Power of the phase |
| $SF_{CPH}$ | Fundamental Apparent Power of the counter phase |
| $S_{CPH}$ | Apparent Power of the counter phase |
| $I_{PH}$ | Current of the phase |
| $I_{CPH}$ | Current of the counter phase |
| $PF_{PH}$ | Power Factor the phase |
| $PF_{CPH}$ | Power Factor of the counter phase |
| P | Total consumed active power on phase and counter phase |
| Q | Total consumed reactive power on phase and counter phase |
| S | Total consumed apparent power on phase and counter phase |
| I | Total consumed current on phase and counter-phase |
| $I_N$ | Current of the Neutral |
| 10% power ratio | Power ratio after 10% of establishment time |
| 30% power ratio | Power ratio after 30% of establishment time |
| 60% power ratio | Power ratio after 60% of establishment time |
| 90% power ratio | Power ratio after 90% of establishment time |
| IOCR | Inrush over-current ratio |
| P_B | Pointer to baseline (old signature, for measuring age-related changes). |
| CT_S | Cycle time signature Y/N, value 0 or 1. |
| P_CS | Pointer to Cycle signature (if applicable, else nil). |
| MarkerType | Marker type (time, frequency, else). |
| MarkerTable | Marker table (provides the validity start condition of each sub-signature). |

TABLE IV

Subset SB2a

| Data element | Description |
|---|---|
| $PS_{PH}$ | m points, Active Power Spectrum of the phase (real, imaginary) |
| $PS_{CPH}$ | m points, Active Power Spectrum of the counter phase (real, imaginary) |
| $PS_{PH}\_Subset$ | s points, subset of the Active Power Spectrum of the phase (real, imaginary) |
| $PS_{CPH}\_Subset$ | s points, subset of the Active Power Spectrum of the counter-phase (real, imaginary) |
| $QS_{PH}$ | m points, Reactive Power Spectrum of the phase (real, imaginary) |
| $QS_{CPH}$ | m points, Reactive Power Spectrum of the counter phase (real, imaginary) |
| $QS_{PH}\_Subset$ | s points, Subset of Reactive Power Spectrum of the phase (real, imaginary) |
| $QS_{CPH}\_Subset$ | s points, Subset of Reactive Power Spectrum of the counter-phase (real, imaginary) |
| $IW_{PH}$ | 2n points, Current Waveform of the phase (real, imaginary) |
| $IW_{CPH}$ | 2n points, Current Waveform of the counter-phase (real, imaginary) |
| $IS_{PH}\_Subset$ | u points, Subset of Current Spectrum of the phase (real, imaginary) |
| $IS_{CPH}\_Subset$ | u points, Subset of Current Spectrum of the counter-phase (real, imaginary) |

TABLE V

Subset SB2b

| Data element | Description |
|---|---|
| $Avr\_PS_{PH}$ | r points, t-times averages of Active Power Spectrum of the phase (real, imaginary) |
| $Avr\_PS_{CPH}$ | r points, t-times averages of Active Power Spectrum of the counter phase (real, imaginary) |
| $Avr\_QS_{PH}$ | r points, t-times averages of Reactive Power Spectrum of the phase (real, imaginary) |
| $Avr\_QS_{CPH}$ | r points, t-times averages of Reactive Power Spectrum of the counter phase (real, imaginary) |
| T_LT | Temperature at last time of change |
| T_PR | Present time temperature |
| $IS_{PH}$ | 2n points, Current Spectrum of the phase (real, imaginary) |
| $IS_{CPH}$ | 2n points, Current Spectrum of the counter phase (real, imaginary) |
| $IS_N$ | 2n points, Current Spectrum of the neutral (real, imaginary) |
| $US_{PH}$ | 2n points, Voltage Spectrum of the phase (real, imaginary) |
| $US_{CPH}$ | 2n points, Voltage Spectrum of the counter phase (real, imaginary) |
| $IW_N$ | 2n points, Current Waveform of the neutral (real, imaginary) |
| $UW_{PH}$ | 2n points, Voltage Waveform of the phase (real, imaginary) |
| $UW_{CPH}$ | 2n points, Voltage Waveform of the counter phase (real, imaginary |

Table III, SB1b parameters are primarily computed from Table II, SB1a parameters. Table V, SB2b parameters are primarily calculated from Table IV, SB2a parameters. The public database of load signatures contains known appliances, electrical loads and their associated states. In some embodiments, the load signature for the public database comprises all four Tables II through V. Depending upon the specific load and state, some values are able to be undefined, zero or nil, such as CFG, the electrical connectivity of the load that is typically not known before installation and may vary from property to property. The private load signature database is able to comprise load signatures utilizing the same table elements, except that the actual values are specific to the actual loads detected by the energy monitoring device. In a preferred method of determining the electrical device and state, all four data subsets, Tables II through V, are measured or computed. $P_{TRIG}=P_{PH}+P_{CPH}$ is used to track a change in the network power consumption. The method first attempts to identify the load signature utilizing the private database. If a change is detected, first determines on what wire or wires (phase, counter phase, neutral) that the change occurred upon. For instance a load turned ON on the phase will typically show a change in the phase and the neutral. A load turned ON on the counter phase will typically show a change in the counter phase and the neutral, and a load turned ON on the phase to the counter phase will typically show a change in the phase and the counter phase but not in the neutral. Before doing any calculations, the method verifies that the $P_{TRIG}$ is not a false trigger. For example, the method verifies the length of the power change. If it is shorter than 0.50 seconds, it assumes a false trigger due to noise. The values for the four data subsets, Tables II through V, are then measured or calculated from measured values. Next, $P_{TRIG}$ is used to search the private database for possible candidates for a load signature, using a wide tolerance of, such as 25%. For each possible candidate, a wide tolerance check is performed on the Table II data. If at least one Table II data element is outside the 25% tolerance of the candidate load signature, then the candidate is skipped and the next candidate is considered in a like manner. Then, for each candidate, for every parameter of Table II, the corresponding element of the candidate is normalized toward the corresponding element of the load parameter. The normalization provides a ratio close to the value one if the candidate parameter is very close or identical to the load parameter; else if away from the value of one this shows a weak correlation. Thereafter, all the normalized parameters are put in a temporary table and the table is auto correlated to average out the correlation amongst all parameters. For each candidate, each Table II data element is compared against the normalized candidate data element. If the peak correlation value of the temporary table is greater than 0.95, then the method assumes with high probability that the load is found and the electrical device and state corresponding to the load is identified. If the peak correlation value of the comparison is less than 0.80, then a second level algorithm is used. The first loop of the second level algorithm uses the same steps as above, except using Table IV data elements instead of Table II data elements. Note that Table IV values can comprise multiple parameters per data element, and not single data values as in Table II. For data elements with multiple values (a vector of values), the load signature is analyzed in two stages. First, for each data element in Table IV, the vector of values in the data element is compared to the corresponding vector of values in the candidate load signature data element by calculating the peak correlation value between the two vectors, and secondly, comparing the single values used to calculate the peak correlation value. If the peak correlation value is lower than 0.80, then the next candidate is evaluated. If no identification is found to one of the possible candidates in the private database, then the load signature to be identified is analyzed using each of the two levels of the above algorithm against the public database of load signatures. If the load signature is identified, then the energy monitoring devices stores the computed load signature and the identified electrical device and state in a private database. If the load signature is still not identified, then a third level algorithm is used to identify the load signature. In the third level algorithm, the load signature parameters are recalculated using voltage and current waveform samples. If the recalculated load signature is different, then the method performs the two level analysis, above, using the recalculated load signature against the private database. If no match is found, then the method performs the two level analysis, above, using the recalculated load signature against the public database. If the recalculated load signature is still not identified, then the method can signal the user to ask for feedback regarding the load and state. Additional analysis can also be performed using signal processing techniques including harmonic analysis using fast Fourier transforms (FFT's), digital filters, correlation, comparison, averaging, spectral analysis and any combination of these. Additional analysis can be done using Table III and Table V and following the same two level analysis as described above. If the recalculated load signature is different, then the method performs the two level analysis, above, using the recalculated load signature against the private database. If no match is found, then the method performs the two level analysis, above, using the recalculated load signature against the public database. Further, sample times can be lengthened for complex or long duration load signatures such as the start up cycle of a large motor, e.g. driving a pump, fan or compressor. A next level can be added considering that several loads may change their states simultaneously versus the sampling rate. In this scenario, a identification search would use a combination of two or more loads changing their state and use this new table versus the private or public data base.

Additional load signature calculation and identification methods include the following. A simple implementation of the load signature is to measure and compute the active power and the reactive power. From these values, more can be derived such as the power factor percentage, the cos(phi), and other power supply parameters. Assuming the line voltage $V_{NOMINAL}$ is known and equal to, for example, 110 VAC in the United States or 220 VAC in most European countries, the apparent RMS current, the active RMS current, and the reactive RMS current can be further calculated from the active power, reactive power, nominal voltage, and power factor.

A second implementation for the load signature is to measure and compute the apparent power, the active power, the reactive power, and the energy over a time period. Again, from these values, more power supply parameters can be derived such as the power factor percentage, cos(phi), and other parameters. Assuming a line voltage of $V_{NOMINAL}$ is known, the apparent RMS current, the active RMS current, and the reactive RMS current can be further calculated with possibly higher accuracy.

A third implementation can add the measurement and computation of the RMS values of the active current, apparent current and reactive current. Additionally, the method can add the measurement and computation of the RMS value of the active voltage, apparent voltage and reactive voltage.

Another implementation for the load signature is to measure and compute the waveform of the active power. From this table of data, FFT, averaging, filtering and correlation can be calculated to compute and identify load signatures.

Another implementation for the load signature is to measure and compute the waveform of the apparent power. From this table of data, FFT, averaging, filtering and correlation can be calculated to compute and identify load signatures.

Another implementation can add the measurement and computation of the THD or an approximation of the THD of the active power taking into account a limited number of harmonics, for example, up to the "$n^{th}$" harmonic, the THD of the fundamental active power without any harmonic content, the frequency, the period, over- or under-voltage conditions, sag, and number of periods for the event(s), the quality of the network, and other non-electrical data such as the time, day, temperature, and humidity.

Yet another embodiment can add measurement and computation of a collection of instantaneous samples such as instantaneous current and/or instantaneous voltage, in-rush current, or settling time. In-rush current does not necessarily equate to the settling time. For instance when an electrical motor starts, the in-rush current may be 15 A peak for 3 seconds, until the motor acquires a speed of 150 rpm. In this example, the settling time may be 7.3 seconds meaning that the motor reaches 90% of the quiescent current after 7.3 seconds. Settling time and in-rush current may be added to the signature such as:

(1) Settling time: $t_s$ @ 90% $I_{QUIESCENT} < I_{PEAK} < 110\% I_{QUIESCENT}$
(2) In-rush current: $I_{INRUSH\_MAX}$ @ $t_1$ and $I < 130\% I_{QUIESCENT}$ @ $t_2$

TABLE VI

Subset Sb3a

| Data element | Description |
|---|---|
| $P_{PH}$ | Fundamental Active Power of the phase in Watts, 0-max. |
| $P_{CPH}$ | Fundamental Active Power fo the counter phase in Watts, 0-max. |
| $PT_{PH}$ | Total Active Power of the phase, in Watts, 0-max. Includes all of the harmonic and noise content. |
| $PT_{CPH}$ | Total Active Power of the counter phase, in Watts, 0-max. Includes all of the harmonic and noise content. |

TABLE VI-continued

Subset Sb3a

| Data element | Description |
|---|---|
| $Q_{PH}$ | Fundamental Reactive Power of the phase |
| $Q_{CPH}$ | Fundamental Reactive Power of the counter phase |
| $QT_{PH}$ | Total Reactive Power f of the phase, including all of the harmonic and noise content. |
| $QT_{CPH}$ | Total Reactive Power of the counter-phase, including all of the harmonic and noise content. |
| $U_{PH}$ | RMS Voltage of the phase, 0-max. |
| $U_{CPH}$ | RMS Voltage of the counter phase, 0-max. |
| $APS_{PH}$ | Total Active Power Spectrum of the phase, "n" values [db] |
| $APS_{CPH}$ | Total Active Power Spectrum of the counter phase, "n" values [db] |

In addition to the Subset Sb3a values, the following parameters can be measured or computed from the above Sb3a values for the phase and counter phase: apparent power, current, power factor, total harmonic distortion and noise for the fundamental active power, and the total harmonic distortion and noise for the total reactive power. In addition, the frequency, peak current, peak voltage, voltage sags, over-currents, and over-voltages on each phase, in-rush current, settling time for full power, spectral content of the reactive phase, and counter phase, spectral content of the current, can be measured or computed.

The load signature for an electrical device for a state can be obtained by replacing the total active power and the total reactive power by the corresponding distortion and noise values, THD_N, as shown in the Table VII: Data Subset 3b, below.

TABLE VII

Data Subset 3b

| Data element | Description |
|---|---|
| $P_{PH}$ | Fundamental Active Power of the phase in Watts, 0-max. |
| $P_{CPH}$ | Fundamental Active Power fo the counter phase in Watts, 0-max. |
| $THD\_P_{PH}$ | Total Active Power of the Phase. $THD\_P_{PH} = (PT_{PH} - P_{PH})/P_{PH}$ in % and includes all harmonic and noise content. |
| $THD\_P_{CPH}$ | Total Active Power for the counter phase. $THD\_P_{CPH} = (PT_{CPH} - P_{CPH})/P_{CPH}$ in %, and includes all harmonic and noise content. |
| $Q_{PH}$ | Fundamental Reactive Power of the phase. |
| $Q_{CPH}$ | Fundamental Reactive Power fo the counter-phase. |
| $THD\_Q_{PH}$ | Total Reactive Power of the phase. $THD\_Q_{PH} = (QT_{PH} - Q_{PH})/Q_{PH}$ in %, including all harmonics and noise. |
| $THD\_Q_{CPH}$ | Total Reactive Power of the counter phase, including all harmonics and noise. $THD\_Q_{CPH} = (QT_{CPH} - Q_{CPH})/Q_{CPH}$ in %, |
| $U_{PH}$ | RMS Voltage of the phase, 0-max. |
| $U_{CPH}$ | RMS Voltage of the counter phase, 0-max. |
| $APS_{PH}$ | Total Active Power Spectrum of the phase, "n" values [db] |
| $APS_{CPH}$ | Total Active Power Spectrum of the counter phase, "n" values [db] |

The term "previous load signature" refers to the load signature last computed before a change in the plurality of power supply parameters was detected. The term "current load signature" refers to the load signature computed after the change in the plurality of power supply parameters was detected. The following describes how to compute the parameters listed above for the phase, indicated by subscript "P". The calculations apply equally to the counter phase, and to a DC power source.

The Fundamental Active power, $P_{PH}$, is the difference in fundamental active power between the current load signature and the previous load signature. The Fundamental Reactive Power, $Q_P$, is the difference in fundamental reactive power between the current load signature and the previous load signature. The Total Active Power, $PT_P$, is the difference in total active power between the current load signature and the previous load signature. The Total Reactive Power, $Q_{TPH}$, is the difference in total reactive power between the current load signature and the previous load signature. The Total Active Power Spectrum, AS, for the phase is, for each value of the table, the difference between the current load signature and the previous load signature, in dB. RMS values for the above parameters can be calculated shown in the following Table VIII. Subscripts for the phase and counter phase are omitted, except to calculate total values of the phase and counter phase. Both the phase and counter phase can use the same algorithms for their respective values.

TABLE VIII

Calculated RMS parameters and Total Consumed Power

| Data Element | Description | Calculation |
| --- | --- | --- |
| S | Apparent power | S = sqrt($P^2 + Q^2$) |
| I | Current | I = S/U |
| PF | Power factor | PF = S/P |
| THD_N | Active power THD | THD_N = (PT − P)/P |
| THD_N | Reactive power THD | THD_N = (QT − Q)/Q |
| PT | Total consumed fundamental active power | $P_{PH} + P_{CPH}$ |
| QT | Total consumed fundamental reactive power | $Q_{PH} + Q_{CPH}$ |
| ST | Total consumed fundamental apparent power | sqrt($PT^2 + QT^2$) |
| IT | Total consumed current | $I_{PH} + I_{CPH}$ |

For continuously variable loads, such as a light dimmer or a fan, a load signature can be computed for the load in a first state, such as 100% ON, and a load signature for a second state of the load can be computed by correlating data elements of the second load signature to data elements of the first load signature. In some embodiments, the data elements of the load signature of the second state are scalar values to be applied to each corresponding data element of the load signature of the first state.

In another embodiment, the load signature can be doubled: one for the load to be switched ON and one for the load to be switched OFF. If the change is positive, the first signature is used, otherwise the second load signature is used. This may be useful when the load transient versus the sampling rate appears different for a positive or negative change.

In further embodiments, more measurements and computations can be added including the effective number of bits of the voltage, current, active power, or reactive power waveforms, matrix calculations and/or analog digital processing such as FFT, auto-correlation, cross-correlation, digital filtering, windowing, and metric/error minimization. Spectral content is able to be analyzed including the harmonic content up to the $n^{th}$ harmonics of the current waveform, the voltage waveform, the active power waveform, the reactive power waveform, for example. Spectral content can also be analyzed for correlation of the measured spectral content versus a reference spectrum, difference in the spectrum magnitude, the phase, the real and imaginary values for each point in the FFT, the frequency spectrum, and the variation of an aspect of the spectrum with time. The load signature can further comprise a wideband aspect of the spectrum including many harmonics. The load signature is further able to comprise a selective detail of one or a few harmonics, such as the low frequency phase noise of a particular harmonic. For example, two loads may have the same similar power consumption and similar THD but may have different spectral content which is able to be used to discriminate between the two loads.

In another embodiment, the load signature comprises computation of the active power, the reactive power, the apparent power, the RMS voltage, the current, the power factor, and active power THD.

The above load signature algorithms are able to discriminate between different devices and the different states of each device. The dynamic range to be monitored can be quite large. For example, the system can discriminate between a small electrical load, such as a five watt night light being turned on, and a very large electrical load, such as a washing machine starting its spin cycle for a large load of laundry or an HVAC unit sized for a large building starting up its warming cycle on a Monday after a cold winter weekend. Large devices also frequently have complex operating characteristics comprising numerous states. Modern devices are also frequently controlled by embedded controllers which set their operating states. Therefore, it can be desirable to embed an energy monitoring device into such appliances and to interface the embedded energy monitoring device to the controller of the electrical device such that the electrical device controller can inform the embedded energy monitoring device when it is transitioning to a new state. In some embodiments, the embedded energy monitoring device can be interfaced to the controller of the electrical device such that the embedded energy monitoring device can assert one or more control commands of the electrical device. As an alternative to fully embedding an energy monitoring device in an appliance, the controller in an appliance having communication protocols compatible with the energy monitoring device described herein is to interface to the energy monitoring device and is able to transmit a factory-stored load signature from the appliance to the energy monitoring device for a state of the appliance. In some embodiments, an energy monitoring device interfaced to an appliance controller, as described below, is able to transmit actual load signature information to the appliance to update the factory-stored load signature tables stored in the appliance.

Change Detection

Triggering Methods

This section describes a collection of methods for accurately detecting a change in the power network. Triggering is a science in itself and amongst several methods one may be more suitable than another one depending of the signals and context. Let's take for example an oscilloscope: Many options exist in triggering and not always the same option is used whether the signal to capture is AC, DC, HF, low or high frequency, noisy or not, repetitive or single shot, whether the signal is mostly digital or analog, whether it has rare or common glitches, etc.

We can define several classes of trigger applicable for the automatic detection of appliance method: simple trigger, smart trigger, logic trigger, correlation-based, digital filter-based on spectral analysis-based.

Detecting a change in the power network starts with the selection of a representative metric that has a good correlation with these changes. Amongst several, a preferred parameter is the total apparent power S in (VA). One point to keep in mind is that a trigger starts the process of new signature calculation and identification. A false trigger may lead to no signature found which is benign when there is no actual change. However a missed trigger is an important error that leads to a missed appliance and possibly a misunderstanding of the power network status.

1) Simple trigger: A change in contiguous samples of S is searched. If the change exceeds a given threshold, the method generates a trigger T, $T=(\Delta S > \Delta S_{THSD})$.

2) Simple trigger with averaging: A change in contiguous averaged samples of S is searched. A simple averaging method is to average each sample with its m neighbors. If the change exceeds a given threshold, the method generates a trigger T, $T=(\Delta S_{AVR\_M} > \Delta S_{THSD})$.

3) Logic trigger: Logic conditions are added to the change, such as p contiguous samples before the change must have close values to each other and close to a state "0". After the transition q samples must be similar in value and close to state "1". Assuming a transition at t=n, trigger $T=[(\Delta S_{0-1} > \Delta S_{THSD})$ AND $\{S(0) \approx S(t_{n-1}) \approx S(t_{n-2}) \approx \ldots S(t_{n-j})\}$ AND $\{S(1) \approx S(t_{n+1}) \approx S(t_{n+2}) \approx \ldots S(t_{n+k})\}]$ 4) Logic trigger with delay: Similar to "logic trigger", above, with the addition of a delay of f+g samples around the transition to take into account an appliance settling time due to the change status. Delays are added to the logic conditions such as: p contiguous samples before the change with delay f must have close values to each other and close to a state "0". After the transition q samples with delay g must be similar in value and close to state "1". Assuming a transition at t=n, trigger $T=[(cS_{0-1} > \Delta S_{THSD})$ AND $\{S(0) \approx S(t_{n-f-1}) \approx S(tn-f-2) \approx \ldots S(t_{n-f-j})\}$ AND $\{S(1) \approx S(t_{n+g+1}) \approx S(t_{n+g+2}) \approx \ldots S(t_{n+g+k})\}]$ 5) Maximum correlation/matched filter: A matched filter reference signal of m samples is defined. One or more reference time responses may be created such as a step response. This trigger searches for maximum correlation between the matched filter and the input signal. A trigger is generated when the correlation becomes greater to corr_thrd. Optionally start_trig and end_trig triggers can be generated to indicate when the correlation starts to exceed corr_start and after a good correlation when the correlation factor decreases below corr_end. Both values must be validated by the confirmed correlation trigger otherwise are invalid. For best performance, the trigger signal must be normalized and shifted such as being comprised between −1 and +1. May have some artifact in the correlation response.

6) Error minimization: Similar to correlation method "maximum correlation/matched filter", above, but simpler and more effective. One or more reference time responses may be created such as a step response. This trigger searches for minimum error between the reference response and the input signal. A trigger is generated when the correlation error falls below err_thrd. Optionally start_trig and end_trig triggers can be generated to indicate when the error starts to be lower than err_start and after a good match, when the error raises above err_end. Both values must be validated by the confirmed error trigger otherwise are invalid. For best performance, the trigger signal must be normalized between 0 and +1.

7) Digital filtering: In this method the apparent power S is filtered by a digital filter and a trigger is generated when the amplitude of change after filtering exceeds a given threshold value. A bandpass filter may be used to suppress the high frequency (noise) and cut the DC value. Since the filtered signal is the convolution of the input signal and the filter response, an optional start_trig and end_trig triggers can be generated to indicate when the change amplitude starts to be higher than filt_start and after the transition when the filtered signal falls below filt_end. Both values must be validated by the confirmed filter trigger otherwise are invalid.

8) Spectral analysis:

i. Reference template: A number of n samples of the S signal are fed into a FFT. A spectral reference threshold template is used to determine if any spectral content exceed the template. A trigger is generated if yes. In sliding mode, the next FFT is processed on the same signal slide by k samples, k may be 1 to m. In by-block processing, a block of n new samples are presented to the FFT and processed. Windowing may be added to reduce artifacts especially in the block by block approach.

ii. Reference Metric: In another spectral analysis method, a metric is used to determine is the energy of the change is higher than a threshold and different than noise signature, no change status or else.

iii. Reference spectral signature: This method is similar to the reference template but instead of testing what exceeds the template for any frequency, the method searches for the maximum correlation with a reference spectral signature, not to mix up with the appliance signature.

9) Multiple triggers: Nothing prohibits implementing several trigger methods as above. In that case the complexity may be increased and additional analysis should be done in case of conflicting trigger results. The common denominator is to make the inclusion of all trigger methods since it leads to a benign error in case of false trigger.

10) Multiple parameter trigger: This method may use a collection of trigger methods as above and one or more for each triggerable parameter. For instance in one implementation the method can use the active power, the reactive power and the noise level to trigger a change in the power network. Again the complexity may be increased and additional analysis should be required in case of conflicting trigger results unless the inclusion principle is used and any generated trigger is said valid.

Applicability and Considerations:

i. The trigger signal may be filtered to reduce noise before any trigger method applied to it.

ii. In another method an adaptive noise reduction be applied.

iii. Hold off: The length of the observation window or reference correlation metric is important. Too long, it may add a delay of many dozen of samples and hold off (miss) any new power network change. Too short, it may reduce the trigger discrimination and may generate too many false triggers in the presence of noise.

iv. Maximum delay, sampling rate, digital filter number of taps, delays in FFT, filter and correlation: These parameters are important and may be interdependent. Pros and cons should be evaluated vs. design specifications.

v. Processing power, fix or floating point calculations are also important points to take into account and waged against specifications may determine the type of processor, DSP, memory and processing division.

Detecting Time Varying Loads

Slowly Varying Loads; Aging Appliances

As an appliance ages, the load signature for one or more states can change. For example, as the bearings of a motor age, the in-rush current for the motor in a dishwasher, refrigerator, washer, dryer, or HVAC fan would change as compared to the load signature when the appliance was new. The current under full load, the in-rush current, the active and reactive power, all can slowly vary with time as an appliance ages. The energy monitoring device tracks the most recently detected load signature of an electronic device in its Private Database of load signatures. The energy monitoring device can locally store a copy of one or more older load signatures for an electronic device and a state. The older, or original, load signature can also be stored on a public database of load signatures. An application running on the energy monitoring device, an energy monitoring display device, or another electronic device having a user interface, a memory, and a processor, can compare the most recent load signature for an electronic device and state to an older load signature for the electronic device and state to determine aging of the electronic device. Changes in the in-rush current, the time to reach a quiescent state, an over-current ratio, and a power ratio at specific sub-increments of the quiescent state establishment time can be measured to determine aging of the electronic device. Correlations of specific defects to changes in load signature are able to be used to identify aging components in an appliance.

In-Rush Current

When a motor is starting up, the in-rush current associated with starting up the motor varies with time until the motor reaches a steady state. To detect in-rush current, successive current measurements can be taken at fixed intervals until the motor reaches a steady state. The load signature can include a field for the in-rush current during 10% to 90% of the quiescent state time, as shown in Table II, SB1$a$ above. Alternatively, or in addition, multiple power ratios can be measured after 10%, 30%, 60%, and 90% of the establishment time of a quiescent state as shown in Table III, Subset SB1$b$.

Complex Loads

Some appliances, such as washing machines, dishwashers, dryers, and heating ventilating and air conditioning units have many different states and combinations of states comprising a complex load. Detecting the signature of a complex load is aided by the user providing feedback to the energy monitoring device as to the current state of an electronic device, by pattern matching using artificial intelligence, and by inter-device communication using the Energy Aware Appliance Protocol described herein. For example, a dishwasher can have a preheat cycle, a rinse cycle, and a wash cycle for delicate dishes, heaving dishes, and a heat drying cycle. In some embodiments, a time marker can indicate the start of an appliance function such as starting a rinse cycle. The start indication can be input by a user on the input interface of the energy monitoring device, on an energy monitoring display device, or on an electronic device having a user interface, a processor, and storage. Further, if the energy monitoring device supports the Energy Aware Appliance Protocol described herein, the appliance can notify the energy monitoring device as to the start of an appliance function. Once an initial set of cycle patterns is known, such as pre-rinse, wash, rinse, and dry, artificial intelligence can be used to predict the next appliance function as described in Cycle Patterns, herein. Appliance functions can be displayed for the user for confirmation to further establish a cycle pattern. For example, the energy monitoring device can display a message, "Start of the dishwasher detected. What program was used?" The user can confirm that the dishwasher was started, on a large load with a heat drying cycle at the end of the wash. Each appliance function in a cycle pattern has a load signature which can be construed as a sub-signature of the cycle pattern of appliance functions, each function with its own time marker. As also described herein, an appliance with a complex operating pattern comprising many load signatures can further have its own embedded energy monitoring device, thereby making the appliance an Energy Aware Appliance. The Energy Aware Appliance knows its own state(s), measures its own load signatures, and can transfer load signatures, states and usage information to an energy monitoring device.

Loads with Many Operating Levels

A particular implementation to characterize a load with many operating power levels is to analyze the correlation between the parameters of its signature when the operating level change from the minimum to the maximum of the operating power range.

A method to discover a load with many operating power levels is to previously define several sub-signatures of it at various levels of operation from minimum to maximum and to interpolate the parameters of its signature at the nominal power level of the new measured signature to attempt to identify it.

In a particular implementation, a load signature may be updated to identify signatures for continuously variable loads with the addition of the sequence 1-7 as follows:

1. Detect a change in the power network
2. Compute the new signature and identify the connection of the new load
3. Search the private data base for signature identification with possible candidates
4. If none find with high level of probability, do a second pass with continuously variable loads for which the min-max range falls inside the measured new signature
5. For each one, interpolate the signature at the level of the measured new signature
6. Attempt to identify the signatures. If the probability of discovery is high, stop process and identify the new signature to the one from the data base.
7. If no identification with high level of probability then search the public database The same method can be used to detect time varying loads.

Energy Aware Appliances

As shown in FIG. 1C, above, the energy monitoring device 100 described above can be modified for embedding into an electrical device, thereby creating an Energy Aware Appliance. An embedded energy monitoring device 105 is particularly appropriate for embedding in electrical devices which consume large amounts of energy and/or have complex operational patterns comprising numerous states, each with its own load signature, especially where the device has a high initial cost. The additional incremental cost of adding an embedded energy monitoring device is readily absorbed in the appliance cost and defrayed by the energy savings achieved through effective use of the embedded energy monitoring device. An embedded energy monitoring device is further beneficial where changes over time in the load signature for a state of the device can be used to detect excessive wear in one or more electrical components in the appliance. In such instances, the Energy Aware Appliance is able to notify the user of upcoming maintenance issues in the appliance, or when it is time to replace the appliance. The embedded energy monitoring device is able to comprise a private database with a factory default load signature and a factory test result load signature for each operating state of the Energy Aware Appliance, a list of states in which the Energy Aware Appliance operates, manufacturer and model information, nominal operating voltage, maximum operating current, and an Energy Aware Appliance Protocol for communicating with the energy monitoring device 100. When an energy monitoring device 100 is first powered on, it is able to broadcast a message to any connected energy appliances, querying whether any such devices are present and connected to the communications network. The embedded energy monitoring device 105 monitors the power supply of the device in which it is embedded and creates an actual load signature for each operating state of the Energy Aware Appliance. The embedded energy monitoring device 105 is further able to inform the energy monitoring device 100 that the energy monitoring device 100 does not need to compute the load signature for the current state of the electrical device changing state because the embedded energy monitoring device 105 has already computed it. For each state, the embedded energy monitor 105 can compare the computed load signature against the factory default, or a load signature computed by a testing laboratory, to determine the electrical operating efficiency of the device. Such information can be transmitted from the embedded energy monitoring device 105 to the energy monitoring device 100 along with an optional advice message for the user. For example, in a refrigerator as the compressor ages, the embedded energy monitor 105 can detect the changes in the load signature as the compressor turns on or off and report it via the energy monitor 100. An Energy Aware Appliance whose appliance functionality is implemented with a controller, can interface the appliance controller to the embedded energy monitoring device 105 to inform the energy monitor that the appliance is changing state in operating state of the Energy Aware Appliance. For example, the appliance controller of a washing machine can inform the embedded energy monitoring controller that the machine is transitioning to the state "rinse cycle of large laundry load". In response, the embedded energy monitoring device can make appropriate load signature computations. Interfacing the embedded energy monitoring device to the appliance controller greatly reduces the computations and error probability for determining the electrical device, the state, and the load signature for the state because the electrical device identity and state are given to the embedded energy monitoring device by the appliance controller. The Energy Aware Appliance architecture also greatly increases the accuracy and automation of an energy monitor system because the user does not need to confirm the device and state, and the embedded energy monitoring device 105 can select a load signature algorithm which is appropriate for the known device and state, and approximate load. Using the Energy Aware Appliance Protocol, described below, the embedded energy monitoring device 105 can then inform the energy monitoring device 100 of the electrical device, the state, and the associated load signature calculated by the embedded energy monitoring device. A person of skill in the art would recognize that a manufacturer of an electrical device is in the best position to understand how their electrical device components will age and require service or replacement. Thus, the embedded energy monitoring device can have substantial custom logic added to the core embedded energy monitoring device functionality in order to give energy savings tips and advice to the user on repair and replacement of parts based on the manufacturer's specialized knowledge of their own appliance. Embedded energy monitors are further able to be embedded in power supply subsystems, such as might be found in a home entertainment system, a computer, or other contemporary electronics device.

Instead of embedding an energy monitoring device in an appliance, a manufacturer of an appliance having a means for bi-directional communication can store a set of load signatures for the electronic device in a storage on the appliance. As described below, the energy monitoring device can use the Energy Aware Device Protocol described below to request the initial load signatures from the appliance. The manufacturer can further store other information including an appliance type, function, brand, part number, country of origin, software version, hardware version, and date of purchase.

Remote Control of Appliances

Devices appliances that only uni-directional communication can assist in the load and state detection for an appliance Devices which support receipt and processing of the Energy Aware Appliance Protocol, described herein, can be commanded to a known state by the energy monitoring device. Then, the energy monitoring device can detect the load for the state and device addressed in a command to the device. A remote command to a device can also be implemented by control panel electrically coupled to a plurality of electronic devices and communicatively coupled to the energy monitoring device. A user can control an electronic device coupled to the control panel by manually entering a command for a state of the electronic device, or by using a remote control device such as an infra-red remote control or a programmed SmartPhone, communicatively coupled to the control panel. Alternatively, an application running on the energy monitoring device, an energy monitoring display device, or other electronic device having a user interface, processor, and a memory, communicatively coupled to the energy monitoring device, can send a command to an electronic device having uni-directional communication to enter a certain state. The energy monitoring device then computes the load signature for the commanded device and state, and stores the load signature in a Private Database.

Appliance Replacement Advisor

The energy monitoring device reads and stores detailed energy usage information about each electrical device on the property. The energy monitoring information can be aggregated by device in order to make device-specific recommendations to the user regarding the energy usage by the device. Device-specific recommendations can include recommending specific repair services, recommending replacement of a device, and informing the user as to the opportunity cost of replacing the device by showing the projected energy savings associated with a new replacement device. As described above, in Private Databases, the user is able to enter the make, model, part number, and year purchased for an electrical device. As also described above, in Public Databases, an energy monitoring device is able to lookup a load signature for an electrical device in a public database, and is also thereby able to access to the make and model information of the electrical device, and associated features of the device. Features of a refrigerator, for example, can include the cubic foot capacity of the refrigerator, whether it contains other features such as an automated defrost cycle, an ice maker, or a water dispenser, is a side-by-side model, or over-under model, whether the device is Energy Star® rated, and the projected energy consumption rates of the device. Using the identifying information for the device, the energy monitoring device is able to query a public database of electrical devices to determine whether there are newer models which have similar features and use less energy. The energy monitoring device can then prepare a report comparing projected energy costs based on the new device, or devices, and make a recommendation to the user. The report is transmitted to the user by any of the communication means described herein. As described above, the public database is able to be maintained by one or more of the utility, a manufacturer of electrical devices, a seller of electrical devices, or a web hosting service. A recommendation to the user can contain embedded links to an appliance seller or manufacturer. A utility is able to send incentive offers, either directly or via the energy monitoring device on the property, for the property owner to replace an appliance.

Energy Aware Appliance Protocol

An Energy Aware Appliance enhances the energy monitoring functionality because it is (1) able to monitor its own electrical condition utilizing the embedded energy monitoring device functionality, and (2) the energy monitoring device 100 does not need to determine the identity of the Smart Device, or the state in which it is operating, because both pieces of information are known to the Energy Aware Appliance and need only to be transmitted to the embedded energy monitoring device 105, then relayed to the energy monitoring device 100. As discussed above, the embedded energy monitoring device 105 could alternatively send the load signature, along with the state and device identifier, to the energy monitoring device 100, thereby eliminating the step of having the user confirm the device identification and the state. The manufacturer of the Energy Aware Appliance is also able to interface control of the operating states to the embedded energy monitoring device 105 such that control of the Energy Aware Appliance is possible via the energy monitoring device 100. For example, an Energy Aware Appliance oven, whose control was interfaced to the embedded energy monitoring device 105 can inform the user that the oven has been left on for two hours or more. A message can be generated either from the Energy Aware Appliance, or the embedded energy monitoring device 105, and routed to the energy monitoring device 100, then to the user's cell phone via text message. The user is able to text message back to the energy monitoring device 100 "OVEN OFF", the energy monitoring device 100 can forward the commands to the embedded energy monitoring device 105, and on to the Energy Aware Appliance, turning off the oven.

Energy Aware Appliance Protocol commands are able to originate from the energy monitoring device 100, the embedded energy monitoring device 105, and to the extent that a manufacturer of an Energy Aware Appliance supports it, from the Energy Aware Appliance. As described below, the commands are able to have the following general format. One skilled in the art will recognize that the functionality disclosed may be implemented in a variety of ways.

TABLE 1

| Start | From device | To device | Command | Parameters | Stop |
| --- | --- | --- | --- | --- | --- |

Start, Stop—The Start and Stop fields can comprise any character or bit pattern distinguishable for other data in the command packet.

From device, To device—These may be unique identifiers such as an IP address, or other unique identification of the source and destination devices. Each Energy Aware Appliance, embedded energy monitoring device 105 within the Energy Aware Appliance, and the energy monitoring device 100 are able to have unique addresses to support commands. A generic identifier, such as "ALL" can be used to address a global command to all connected devices.

Command—The following is a small command set which can be used to implement the functionality described above. One skilled in the art would recognize that many commands could be added, and some deleted, without deviating from the functionality disclosed herein.

Parameters—Parameters are able to be command-specific, including a plurality of parameters as described below. Some commands are able to implement their functionality without any parameters.

In the following list of commands, EMD refers to the energy monitoring device 100, EEMD.x refers to an embedded energy monitoring device 105, and SA refers to an Energy Aware Appliance, coupled to its EEMD.x 105. Most commands can be sent by the EMD to an EMD.x or SA, or by the EEMD.x to its associated SA. One skilled in the art of embedded system design will recognize that an appliance controller with a stored load signature table is able to use many of the following commands to directly interface to the energy monitoring device without requiring the appliance to have and embedded energy monitoring device.

Commands:

Return Device Description—This command returns description information from the destination device. Description information can comprise the textual description, IP address other unique identifier, the manufacturer, model, nominal voltage, maximum amperage, or other device information.

Return State List—This command returns the list of states for the SA, for associating a load signature with the device and state. Returning the list of states permits the EMD and/or the EEMD.x to know the list of states, rather than discover them through monitoring, presentation to the user, and confirmation by the user.

Return Load Signature—This command returns a load signature for a device for a state of that device. Parameters include the state for which a load signature is requested, and the source for obtaining the load signature. A source can be the factory, generic, default load signature for each state, a load signature based upon testing lab results, or actual load signatures obtained by the embedded energy monitoring device in the Energy Aware Appliance.

Return SA Command List—This command returns a list of commands, descriptions, and parameters exposed to the EEMD.x by the SA when the SA is interfaced to the controller of the electrical device in which the EEMD.x is embedded.

Return Software Revision—This command returns the current software revision level of the destination device. The command can be used to query the software revision level of a device in order to determine whether a software upgrade is appropriate and to determine the functionality supported by the installed software, from its revision level.

Execute Energy Aware Appliance Command—This very powerful command enables the energy monitoring device to perform a controlled recovery after a power outage, described below, manage energy usage for reducing energy costs and consumption based on time-of-day, current or anticipated load, and to effect remote control of devices inadvertently left on.

Return Current State—This command can be used in conjunction with the Execute Energy Aware Appliance Command to assist in implementing the functionality described above.

Set Software Revision—This command downloads an upgrade of software to the destination device.

Query for Devices—This command allows the energy monitoring device 100, or an embedded energy monitoring device 105, to query for whether there are other energy monitoring devices, embedded or otherwise, connected to the network, and to obtain the addresses of such devices. Through one or more of the above commands, an energy monitoring device, embedded or otherwise, is able to determine the capability of connected energy monitoring devices.

One skilled in the art would recognize that this minimal command set can be easily expanded within the teachings disclosed herein.

Controlled Recovery after a Power Outage

After a power outage, it is desirable to have a controlled recovery of electrical devices to their previous state, or other determined state. Without a controlled recovery, all devices which had a previous state other than "OFF" could begin drawing power as soon as power was restored after the outage, unless their internal control electronics, if any, were programmed otherwise. As discussed above, particularly with regard to electrical devices with complex operating states and those with high energy usage, it is desirable to control the recovery after a power outage in a manner which does not draw too much current and which safely brings the electrical devices back on line to a safe operating state. For example, if a power saw was "ON" in the garage during a power outage, it can be prevented from restarting after power is restored and can require manual action by the user to restart it. The refrigerator can be given priority in order to preserve food from spoilage. If a power goes out for a long time on a hot day, the clothes in a laundry cycle can be re-washed rather than resuming the wash cycle in progress when the power went out, thereby avoiding possible mildew problems. The energy monitoring device is able to hold devices in the OFF state, and control restart by holding all Energy Aware Appliances in the OFF state until each appliance is commanded to restart by the energy monitoring device 100, via the embedded energy monitoring device(s) 105 in the Energy Aware Appliances. The sequence can be predetermined by the energy monitoring device 100, by a user-created sequence of steps, in accordance with manufacturer's recommendations, or a combination of these. Energy Aware Appliances which interface their controllers and control commands to the embedded energy monitoring device can implement such recovery logic.

Artificial Intelligence

Usage Patterns, Optimization, Prediction

As described above, the energy monitoring device date/time stamps the energy usage it monitors, and further associates the usage with one or more devices, each device having a state. As described above, the energy monitoring device 100 has access to the tariff schedules which form the basis for reporting the cost of the energy usage monitored by the energy monitoring device. Thus, the energy monitoring device, or a remote device with data logging capabilities such as a personal computer 310, is able to analyze patterns in energy usage to determine whether cost savings can be had by changing energy usage patterns. For example, the data can be analyzed to determine whether the energy user usually washes and dries their clothes at peak usage hours, thereby triggering a higher tariff rate. A different time, with a lower tariff rate, can be suggested to the user, along with an estimate of the cost savings for following the advice. The usage patterns can also be used to forecast future energy costs based on past usage, based upon one or more tariff rate schedules. Forecasts can be for an hour, a day, a week, a month, a quarter, a year, or a season.

Complex, yet repetitive, electrical devices such as washing machines, dishwashers, and heaters which operate on a cycle are able to produce a repetitive sequence of load signatures. A load signature sequence is able to be named and stored in a local memory of the energy monitoring device, remote display device, or data logging device. For example, "Washing Machine, Large Load, Fill Cycle" could be a name to refer to a sequence of load signatures comprising signatures for turning on a water fill valve, actuating a fill level switch, and turning off the water fill valve.

Usage Patterns

Energy usage patterns, called Cycle Patterns, can be used to predict a time in which an electronic device is likely to be used on a property, with a probability, based upon past energy usage data. An application running on the energy monitoring device, on an energy monitoring display device, or on another electronic device having storage and a processor, can analyze the past energy usage data to create usage classes per incremental time period with an associated probability that a device will be utilized during the incremental time period. A time period can be a fifteen minute period, an hour, a day, a week, a month, a quarter, a season, or a year. The usage classes can be used to assist a load signature detection algorithm by giving the algorithm a list of electronic devices that are highly probable to be ON at a certain time interval. A first class of electronic devices can be a small subset of loads on the property that has a high degree of probability that an electronic device in the class will be ON within a specific time period. A second class of electronic devices can be a super-set of the first class, but with a lower probability that an electronic device in the class will be ON during the specific time period. A third class can include a substantial portion of the remainder of the electronic devices in the Private Database of electronic devices. A fourth class can comprise the entire Private Database. A fifth class can comprise a portion of a Public Database, and a sixth class can comprise a whole Public Database of electronic devices.

As an example, an analysis of past electronic device energy usage data can show that a plug-in type electric razor is used every Monday through Friday between 7:00 a.m. and 7:30 a.m. with an 0.75 probability of occurrence. As such, the electric razor can be classified in the first class. When a change in power supply parameters is detected between 7:00 a.m. and 7:30 a.m. on a Monday through Friday, and a new load signature is calculated, the load signature detection algorithm can first attempt to match the newly calculated load signature against the load signature of a state of the electric razor, because it has been determined that there is a high probability that the electric razor will be used during the time increment of 7:00 a.m. to 7:30 a.m. If the newly calculate load signature is not the electric razor, then the load signatures of other devices in the first class can be checked. If the newly calculated load signature is not found in the first class, then the load signature detection algorithm can check in the second class of electronic devices. The load signature detection algorithm continues until the device is found or all classes are searched and the device is not found. One skilled in the art would recognize that the electronic devices in a class could be sorted or indexed on any data element in the load signature to speed up the search process. For example, the electronic devices whose load signatures are in the first class could be sorted or indexed by average power consumption, active power, reactive power, or other data element of a load signature. Classes can be created by analysis of historic data. Alternatively, or in addition, a user can create specific classes for a device, or a time period, or other measurement period. For example, a user could create a class for "winter, Monday through Friday, 6:30 a.m. to 8 a.m.". During that time, a user is likely to be getting up to get ready for work, a clock radio is turned on, a razor or hair dryer is turned on, the heater is turned on to warm the house. Class definitions can help monitor specific times when a user knows that certain devices will be activated.

Once the classes for a specific time period are created, the classes and the devices in them can be used as an Artificial Intelligence pattern. Further events that match a device and class, thereby affirming the classification, can be used to increase a weight assigned to an electronic device within the classification. If an electronic device is initially classified in a first class, but during a monitoring period the device was not turned ON, then the weighting for the electronic device in the first class can be reduced. A threshold weight can be established for a class such that, if an electronic device's weight drops below the threshold, then the device is automatically reclassified to the next lower class within its database type. For example, if an electric razor is classified in the first class for time period 7:00 a.m. to 7:30 a.m. on Monday through Friday, and the device is not turned ON during that period on a particular day, the weight of the electric razor can be decreased by one. If the weight reaches zero, then the electric razor is dropped to the second class for the time period 7:00 a.m. to 7:30 a.m. on Monday through Friday in the Private Database.

Appliance Setting Optimization

Usage pattern information, in conjunction with load signature information, can be used to optimize appliance settings, such as for a refrigerator. The user selects an appliance to optimize, and enters the adjustment parameter, its unit, the minimum and maximum values, parameter increment, the test duration, and test period and the period increment. For example, "Refrigerator, temperature, F.°, 25°, 35°, 1°, 3 hours, 30 minutes". Over the period of the test, the energy meter measures the energy consumed at each incremental setting for display to the user, along with forecasted costs for each setting value, for a forecast period of time such as a month or a year. The user can then set the temperature for his refrigerator according to an optimal value based on energy savings. After setting the refrigerator to a new, more energy-efficient setting, the user would independently verify that the new temperature also keeps his food fresh for a specified time period.

Prediction

As discussed above, energy usage patterns, called Cycle Patterns, can be used to predict a time in which an electronic device is likely to be used on a property, with a probability, based upon past energy usage data. An application running on the energy monitoring device, on an energy monitoring display device, or on another electronic device having storage and a processor, can analyze the past energy usage data to create usage classes per incremental time period with an associated probability that a device will be utilized during the incremental time period. A time period can be a fifteen minute period, an hour, a day, a week, a month, a quarter, a season, or a year. Cycle patterns can also be used to generate predictions of future energy usage. Predictions can be in the form of graphs, pie charts. Predictions can be used for weekend versus weekend usage comparisons, weekly, monthly, seasonal, and yearly prediction patterns.

An application running on the energy monitoring device, an energy monitoring display device, or on another electronic device having storage and a processor can retrieve past weather pattern information and correlate the past weather information and the past energy usage information. The application can further retrieve forecasted weather data for a time period and correlate the past weather information to the forecasted weather information in order to predict an energy usage pattern from the past energy usage information. Given a predicted weather pattern, the application can further suggest a heating ventilating and air conditioning programming that would minimize energy usage in view of the past energy usage and the forecasted weather pattern.

AC Applications and Self-Power

The energy monitoring device and features described above can also be used in off-grid, self-power AC applications. Off-grid, self-power AC power sources can include electricity generation by a gas powered generator, gas powered portable generator, battery or turbine powered generator, solar panels using an electrical inverter to transform DC to AC, wind power, geothermal, and bio-electric generation. The subject property can be a house, cabin, farm house, grain tank, water tank, fire control post, fire house, national park house, amusement park house, a commercial building, a recreational vehicle, or other structure.

DC Applications and Self-Power

The above devices can be used in a direct current (DC) electrical environment such as in a hybrid-car or where a user has a self-powered electrical system such as a generator, solar panels, or wind turbine generator. The energy monitoring device is able to monitor the power generated by DC self-power systems. The energy monitoring device is able to advise the user when to reschedule his energy usage, in conjunction with self-power generation, in order to optimize delivery of self-generated power to the grid, thereby maximizing his energy savings based on a time-of-day tariff schedule. For DC applications, certain measurements which do not logically apply to load signature calculations for DC devices can be omitted, such as cos(phi), phase voltage, phase current, phase power, reactive power, apparent power, power factor, and correlation or Fast Fourier Transform analysis of these parameters. Although total harmonic distortion (THD) and frequency typically do not apply to DC signals, the signals may contain noise components which can be analyzed in terms of frequency or THD. The energy monitoring device is able to measure and compute DC load signatures in accordance with the above described algorithms, modified for DC applications.

Solar Power System Applications

Many homes and business are now installing solar power systems to lower their energy costs and produce clean energy. A solar power system comprises an array of solar panels. The array can be a single solar panel, a string of solar panels connected in series, or a collection of series strings of solar panels coupled in parallel. An energy monitoring device can monitor individual solar panels, a series string of panels, or a collection of series strings of solar panels coupled in parallel. In one embodiment, each solar panel comprises a DC current and voltage sensors capable of transmitting sensor information to the energy monitoring device. In some embodiments, the sensor information is transmitted by a radio frequency identification (RFID) tag. The information can be time-stamped and recorded along with other energy monitoring information to determine the performance characteristics of a particular solar panel in the array. For example, if one solar panel in an array of solar panels produces less energy than other solar panels in the array, that solar panel may have a defect, may need to be cleaned, or may have deposits on it such as leaves, dirt, or snow. An appropriate message can be sent to the user through the energy monitoring system, warning that a specific panel is delivering, e.g., 20% less energy than the average of all of the panels, and that the user should verify the orientation of the panel to the sun, clean the panel, and check whether the panel is regularly obstructed by a shadow or debris. If total output from the solar system deceases with time, the entire array of solar panels may need to be cleaned, and an appropriate message can be sent to the user. An appropriate message can be, e.g., "Warning: the system is regularly producing 15% less energy daily as compared to one month ago, but no specific panel substantially deviates from the system average." Clean all panels. If the problem persists, call the solar system installer to inspect the system. The information from each solar panel in the array can further be aggregated and compared against the total current and voltage returned from the solar system to determine the efficiency of the solar system as a whole. The energy monitoring system can notify user that the solar system controller or inventor may be defective.

The energy monitoring device can further provide a zero-crossing synchronization signal and line frequency of the grid power system to the solar system controller, if the property is utilizing grid power in addition to solar power. The energy monitoring device can further compare the zero-crossing and frequency on the solar power system output to determine whether the solar power controller and inverter are working properly and send an appropriate message to the user. Such a message can be, e.g., "Warning: Solar system controller and/or inverter are producing power at the wrong frequency or out of phase. Call your solar system installer to inspect the controller and inverter." Aggregated solar power system output can also be time-stamped and compared to past energy usage so as to produce a predicted cost savings per measurement aggregation period. Aggregation periods can be per minute, per ten minutes, per hour, per week, per month, per year, or any other time increment. A user can set the aggregation reporting time period using a user interface on the energy monitoring device, or via a computer communicatively coupled to the energy monitoring device.

In another embodiment, the energy monitoring device can further control injection of the solar power system output current to perform power factor correction in the property power system downstream of the energy monitoring device. The energy monitoring device can further bi-directionally communicate with the solar power system controller to manage the power factor corrective injection of current at the solar power system controller, rather than at the energy monitoring device. Power factor correction methods are further described in co-pending U.S. Provisional Patent Application Ser. No. 61/206,501, filed Jan. 26, 2009 and entitled "POWER FACTOR AND HARMONIC CORRECTION METHODS", under 35 U.S.C. §119(e), U.S. Provisional Patent Application Ser. No. 61/298,112, filed Jan. 25, 2010 and titled "POWER FACTOR AND HARMONIC CORRECTION METHODS", under 35 U.S.C. §119(e), U.S. Non-provisional patent application Ser. No. 12/694,153, filed Jan. 26, 2010, and titled "POWER FACTOR AND HARMONIC CORRECTION METHODS," and U.S. Non-provisional patent application, Ser. No. 13/013,737, filed Jan. 25, 2011, and titled, "POWER FACTOR AND HARMONIC CORRECTION METHODS", all of which are hereby incorporated by reference in their entirety for all purposes.

In another embodiment, a form of reflectometry is used to determine whether a solar panel in the solar system array is defective. Reflectometry methods include time domain reflectometry (TDR), time-domain transmissometry (TDT), and spread-spectrum time-domain reflectometry (SSTDR). By communicating with the solar power system controller, the energy monitoring device a specific string of panels can be addressed. The energy monitoring device can then generate an impulse of energy into the solar panel system, directed to the addressed string of solar panels. The energy monitoring device then measures the reflected signal from the solar panel string. The energy monitoring device then generates a set of parameters characterizing the reflected signal from the solar panel and characterizes the condition of the panel using the set of parameters. If individual panels are not addressable via the solar panel controller, then the energy monitoring device can receive the multiple reflected impulse signals for each of the solar panels in the string. The energy monitoring device then builds a characterizing set of parameters for each of the multiple reflected signals. A specific panel in a string is characterized by its relative position in the time of receipt of the reflected impulse. The first reflection received is the first panel in the string, the last reflection received is the last panel in the string. The process is repeated for each string of panels in a solar panel array. The set of characterizing parameters from all of the solar panels can be compared to determine exactly which panel in a string may be defective or underperforming. Parameters can include the magnitude, peak value, peak to peak value, RMS value, mean value, phase, duration, time of propagation, excess delay spread, delay spread standard deviation, delay spread with +/−3 standard deviation, polarity of the reflected wave, spectral content, Doppler shift if applicable, and shape of each reflected wave form. Set of parameters for a solar panel can be compared to the input impulse, and compared to any and all of the other solar panels.

Graphical User Interface

The energy monitoring device systems and methods of the presently claimed invention produced very detailed energy usage information for each state of each device in an network of devices in a household or small business. The energy monitoring information is able to be aggregated at multiple levels for a wide variety of purposes. One or more applications having a graphical user interface, running on a remote display device having graphical display capabilities, such as a SmartPhone (iPhone®, Droid®, Blackberry®, et al), a cell phone, a personal digital assistant, or a portable computer are able to provide query, display, and optimization tools using the detailed energy monitoring information. Using an application on a portable device, a property owner can access the data generated by the energy monitoring device to check the status of energy usage of the property in real-time, remotely control an electrical device on the within the property, and query any data collected by the energy monitoring device. The application can further enable the property owner to remotely set and check security features for the energy monitoring device.

Communication Between the Energy Monitoring Device and a Remote User Device

In a preferred embodiment, the energy monitoring device sends alerts and messages to a property owner via the Internet to a cell tower in a 4G all IP (internet protocol) network. As is known in the art, messages can be forwarded by other network types such as 3G, WiMax, WiFi, TCP/IP and other network protocols. Data captured by the energy monitoring device can be sent directly to a remote display device within the property, or to a user's portable electronic device. In a preferred embodiment, energy monitoring data is sent to a server for storage. Such server can be a private database on the user's property, a secure database at a utility, or a public database hosted by a hosting service. The user is able to run an application on his remote device, such as a Smart Phone, that queries his own data from his private database. The user can also query the hosted public database to compare his own energy usage to the energy usage of similar users whose data is stored on the public database.

A property owner can configure the energy monitoring device with an address or identifier of the property owner's remote display device. In a preferred embodiment, the property owner's remote display device is a 4G Smart Phone and capable of receiving SMS Text Messages. The energy monitoring device generates the alert or message, addresses the message to the property owner's Smart Phone, and the text message is sent to the property owner's Smart Phone. The user can respond to messages to his Smart Phone by SMS Text Message. In a preferred embodiment, a message sent to the user's Smart Phone incorporates a list of finite answer selections from which the user choose. For example, if the user inadvertently left the oven on before leaving for work, and the oven is running at a time when it is not expected such as during a Monday through Friday during work hours, the energy monitoring device can send a message to the user's Smart Phone, "Warning: The oven is still on. Turn OFF? Y/N." The user can send a message with the response, "Y" and the energy monitoring device can turn off the oven, if the oven supports remote control by the energy monitoring device.

A property owner can query data streamed from the energy monitoring device and stored on the user's private database or a public database hosting the property owner's stored data along with other property owner's stored data. An application running on the user's Smart Phone can access the stored information and compare his own energy usage information against comparable energy users in his area.

The energy monitoring device comprises a general purpose input-output (I/O) module that interfaces to other sensor systems on the property such as a home security system, temperature, light, sound, motion, utility flow, and other sensors. The user is able to receive alerts on his iPhone® as to what occurring on the property. For example, the energy monitoring device detects that a video game has been powered ON. The home security system detects motion in the property owner's daughter's room with a date-time stamp corresponding to a time when the property owner expects that his daughter is to be doing her homework. The energy monitoring system can send a parental alert to the property owner's iPhone® informing him that his daughter is playing video games, and not doing her homework. Other home security features, such as a sensor on a pet door, or a GPS tag on pet within range of a home security system, can trigger similar home alerts to the property owner via the energy monitoring device. The energy monitoring device, interfaced to other sensors in the home, can forward a vast array of alerts to the property owner's remote energy monitoring display device, such as a Smart Phone or iPhone®.

Using an application on his energy monitoring remote display device, a property owner can program rules relating events, and the application queries the energy monitor for those events, and sends an alert to the property owner that is related to the rule. If the elements of the rule relating events is satisfied, the alert message is sent to the property owner's phone.

Examples

A user programs a rule and alert with his iPhone®. The rule states that if the current time is between 3:00 p.m. and 5:00 p.m. and if a motion detector in the property owner's daughter's room is activated, and if a video game is ON, or the television is ON, the send a parental alert message to the property owner's iPhone®.

As another example, if the current time is between 9:00 a.m. and 5:00 p.m. on a Monday through Friday, and a temperature sensor in the stove indicates that the stove is above 200° F., and gas is flowing in the gas meter, and no motion is detected in the kitchen, then send a safety alert to the property owner that the stove is unexpectedly ON.

The Prius Effect

Energy usage is reduced when a user becomes aware of how much energy they are using, when they are using it, what they are paying for it, and the purpose for which the energy was used (the Prius Effect). The energy monitoring device of the presently claimed invention is able to time stamp energy usage information such that the energy usage information is able to be aggregated, for display on a graphical user interface device (GUI). The cumulative energy usage for a home or small business is able to be presented to the energy user by year, season, month, day, week, day, hour, minute or second, depending on the level of data zooming in the GUI application. Energy usage is further able to be aggregated for display by electrical device, broken down by any of the above time periods. The energy usage information is further able to be broken down by the various states of a device by further zooming in on the usage information of a specific device.

One state which many modern devices have, particularly devices which are powered by a controller, is a STANDBY state. The purpose of a STANDBY state is to bring a device to a power ON condition in a quicker time than if the device were brought to power ON from the power OFF state. Devices in the STANDBY state, therefore, consume power. Often, a device in the STANDBY state appears, visually, to be in the OFF state. Thus, a user visually inspecting devices to shut them off to save energy would overlook devices in the STANDBY state. The energy monitoring device of the presently claimed invention is able to track energy usage at the state level, by the time breakdowns described above. Thus, a user is able to determine their energy usage, by device, for devices consuming power in the STANDBY state.

Utilizing the additional tables or lists in the private database, described above, an energy user is also able to determine the usage of energy by room, and by therefore by user, as well as by time, by device and by state of a device. A GUI according to some embodiments displays a map of the user's home or small business, with energy usage for a selected time period displayed for each room. Alternatively, or in addition, a GUI-based application according to some embodiments displays energy usage for a selected time period based on the user assigned to a room in the home or small business. GUI-based analysis applications are able to compare energy usage between different time periods. For example, energy usage for heating in the winter and energy usage for cooling in the summer are able to be compared. Energy usage is able to be display by KWH, by dollars, by BTU's or other units supported by a conversion module and a tariff table.

Improving Grid Quality

During computation of the load signatures, as part of the normal operation of an energy monitoring device according to some embodiments, the quality of the electrical network, including power factor percentage, noise, and distortion in the spectral content of one or more computed parameters. This energy monitoring information is able to be used in conjunction with power factor correction systems and methods, as disclosed in U.S. Provisional Patent Application Ser. No. 61/206,501, filed Jan. 26, 2009 and entitled "POWER FAC- TOR AND HARMONIC CORRECTION METHODS", under 35 U.S.C. §119(e), and U.S. Provisional Patent Application Ser. No. 61/298,112, filed Jan. 25, 2010 and titled "POWER FACTOR AND HARMONIC CORRECTION METHODS", under 35 U.S.C. §119(e) both of which are incorporated by reference.

Appliance Repair Advisor

As an appliance ages, the load signature(s) for one or more states can change. For example, as the bearings of a motor age, the in-rush current for the motor in a dishwasher, refrigerator, washer, dryer, or HVAC fan would change compared with the load signature when the appliance was new. The current under full load, the in-rush current, the active and reactive power, all can slowly vary with time as an appliance ages. The energy monitoring device tracks the last load signature of an electronic device in its Private Database of load signatures. The energy monitoring device can locally store a copy of one or more older load signatures for an electronic device and a state. The older, or original, load signature can also be stored on a public database of load signatures. An application running on the energy monitoring device, an energy monitoring display device, or another electronic device having a user interface, a memory, and a processor, can compare the latest load signature for an electronic device and state to an older load signature for the electronic device and state to determine aging of the electronic device. Changes in the in-rush current, the time to reach a quiescent state, an over-current ratio, and a power ratio after specific increments of the quiescent state establishment time can be measured to determine aging of the electronic device. Correlations of specific defects to changes in load signature are able to be used to identify aging components in an appliance.

Cyclic Pattern Discovery

Energy users often use their energy consuming devices in a patterned way. An energy monitoring device is able to use load signature information, in conjunction time-stamped, past energy usage information to assist in learning devices and their states. For example, on Monday through Friday, an energy user is likely to utilize an electric hot water heater, a shaver, one or more incandescent bulbs, and a coffee maker all within a narrow window of time. Correlation of load signature with such patterned usage is able to increase the probability of successfully identifying a load. Such correlation is able to be used to in lieu or, or alternatively in addition to, second level load signature calculations in order to obtain greater reliability in load identification.

In operation, an energy monitoring device comprises an energy meter coupled to a power supply to a home or business, a controller, memory, and an optional display module and input module. A remote display device may be used instead of, or in addition to, the display and input modules for displaying energy monitoring information. The energy monitoring device is located downstream of a power utility meter and a mains box, and upstream of the circuit breaker in the home or business, and upstream of the electrical devices to be monitored. Each electrical device coupled to the power supply has one or more states associated with the electrical device. Simple examples of electrical device states include ON, OFF, STANDBY, and HALF-POWER. When an electrical device changes states, a comparison of the power supply measurements successively read by the energy meter will indicate the change of state of the electrical device. Additional power supply parameters can be computed and/or sampled from additional energy meter readings. A load signature for the electrical device, and its associated state, is a collection of parameters characterizing an electrical device in a state. The load signature is looked up in a private, and/or a public, database of load signatures, depending upon the specific configuration and equipment installed in the energy monitoring device. During a learning phase, if the load signature is found, it is presented to the user on a display device. Otherwise, a nearest matching load signature and state is presented to the user. The user then edits or accepts the identification of the device and the state, and the load signature, electrical device identification and state are stored in the private load signature database. The learning phase can be improved by pre-loading certain information regarding devices, states, and rooms in the network of electrical devices to be monitored. For example, a user can program the energy monitoring device to associate rooms in the building with the electrical devices to be monitored are located, the known electrical devices in each room of the structure, a list of states which the electrical devices can use, and energy users in the building. The energy monitoring device can further be programmed to associate rooms with electrical devices installed in those rooms, and correlating electrical devices with states. In some embodiments, the energy monitoring device can receive a unique identifier to correlate with an electrical device to be monitored for looking up the load signature of the electrical device in a public database. The public database of load signatures is able to comprise a read-only database of load signatures such that users are not able to upload or otherwise alter the public load signature database. Alternatively, or as a supplement to the public load signature database, an open, public database can reside anywhere, including a well-known website host such as Google® or Yahoo®, or an interested party such as a public utility company or a state Public Utility Commission.

As new load signatures are computed, they are compared against the existing private database of load signatures. If a new load signature does not correlate with one in the private load signature database, it is compared to the public load signature database. A minimum correlation value, such as 80%, may be set to establish a filter to determine whether the newly computed load signature represents an existing load signature and state, which is changing over time, or whether the load signature in fact represents a new device and/or state. In some embodiments, the acceptance tolerance can be narrowed over time to reflect a higher confidence in the actual values acquired enabling better discrimination between similar loads.

Energy monitoring information is collected from successive energy meter readings, the computed power supply parameters, and the electrical devices and their states. The energy monitoring information may be stored locally, up to the limit of local memory, or transmitted to a remote display device or a personal computer for data logging and analysis. The energy monitoring information can be date/time stamped by a clock/calendar installed in the energy monitoring device, or by a clock/calendar function installed in the remote display device or personal computer receiving the energy information. Since electrical devices and their states and their usage can be identified and date/time stamped, energy information can be acquired and displayed on a device-by-device, moment-by-moment basis. Energy information can also be aggregated to show usage trends over time.

The energy monitoring device, or the remote device or personal computer, can store one or more utility tariff tables which correspond to tariffs available for selection by the user, or as defined by their electric utility. Analysis of energy monitoring information can then generate recommendations to the user as to which tariff rate schedule is more favorable on a cost basis. In embodiments where the energy monitoring system is coupled to the public utility via the Internet, the energy monitoring device can download new tariff tables as they become available, receive notifications of incentive programs, information regarding planned power outages, and other energy usage programs to lower energy usage costs.

In some embodiments, a user can receive notification of events from the energy monitoring device on a mobile device such as a cell phone, personal digital assistant or laptop computer. The message can be sent via the Internet, an SMS message, a voice mail, an email, or other communication medium. Examples of events include notification of an power outages, notice that the current energy usage has triggered a next higher tariff rate, or notification of an unusual usage pattern inconsistent with past trend information.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications are able to be made in the embodiment chosen for illustration without departing from the spirit and scope of the invention as defined by the claims. For example, the presently claimed invention has been described for use with a home or small business. One skilled in the art will readily recognize that the presently claimed invention is also able to be adapted to multiple residences, such as an apartment building or duplex, with multiple residential units and a single, central, power supply source. The methods and systems disclosed in the presently-claimed invention are able to be applied to a broad range of electrical configurations including, but not limited to, single-phase 3-wire with phase, counter phase and neutral; single-phase 3-wire with phase, counter phase and no neutral; 4-wire with three phases and a neutral; dual phase 3-wire with phase 1, phase 2 and neutral; off-grid AC; off-grid DC; and power generation sources such as solar-panels, generators, and co-generators appearing as a negative in a network of electrical devices coupled to a grid power supply as a primary power source.

What is claimed is:

1. An energy monitoring device for monitoring the energy consumed by an electrical device, comprising:
   a. a controller coupled to a power supply;
   b. means for measuring a first plurality of power supply parameters and a second, subsequent, plurality of power supply parameters taken at a point upstream of the electrical device to be monitored;
   c. an input-output module coupled to the energy monitoring device; and
   d. a memory programmed with instructions to identify the presence of the electrical device coupled to the power supply and a state of the electrical device from a change detected between the first plurality of power supply parameters and the second plurality of power supply parameters, wherein the identifying comprises:
      for each of a plurality of stored load signatures, comparing one of the power supply parameters to an associated power supply parameter of the stored load signature; and
      if the value of the one power supply parameter is within a first percentage threshold of the value of the associated power supply parameter, comparing the remainder of the power supply parameters to remaining associated power supply parameters of the stored load signature;

wherein the energy monitoring device is further programmed to monitor the input-output module.

2. The energy monitoring device of claim 1, wherein the state of the electrical device is one of on, off, standby, power up, power down, a percentage of full power, and a named sequence of states.

3. The energy monitoring device of claim 1, further comprising a display device, a user input device, and a user interface software.

4. The energy monitoring device of claim 3, wherein the display device and the user input device and the user interface software are implemented on a consumer electronic device.

5. The energy monitoring device of claim 4, wherein the consumer electronic device is one from the group consisting of an iPhone®, a cell phone, a SmartPhone, a personal digital assistant, a portable computer, a desktop computer.

6. The energy monitoring device of claim 1, wherein identifying the electrical device and the state comprises computing a load signature for the electrical device from the change in successive samples of the power supply.

7. The energy monitoring device of claim 6, wherein the load signature corresponding to the electrical device and the state comprises one or more of phase voltage, phase current, neutral voltage, neutral current, apparent power, cos(phi), active energy, reactive energy, frequency, period, over/under-voltage conditions, percentage of power factor, RMS current, instantaneous current, RMS voltage, instantaneous voltage, current harmonic THD percentage, voltage harmonic THD percentage, spectral content of the current waveform, spectral content of the voltage waveform, spectral content of the active power waveform, spectral content of the reactive power waveform, quality of the network percentage, time, date, temperature, and humidity.

8. The energy monitoring device of claim 6 wherein the computed load signature is associated with the electrical device and its state, and stored in a memory.

9. The energy monitoring device of claim 1, wherein additional input is coupled to a flow meter, wherein the flow meter provides usage information on a commodity being metered.

10. The energy monitoring device of claim 9, wherein the commodity being metered by the flow meter is one from the group consisting of water, steam, natural gas, fuel oil, air, and an inert gas.

11. The energy monitoring device of claim 1, wherein additional input is coupled to a home security system, and the home security system transmits status information to the energy monitoring device.

12. The energy monitoring device of claim 11, wherein the home security system status information comprises one of: a state of a door, a state of a window, a response to a motion detector, a response to an audio sensor, and a response to a light sensor.

13. The energy monitoring device of claim 12, wherein the home security system status information further comprises an identifier of a room in the home corresponding to the status information to be transmitted to the energy monitoring device.

14. The energy monitoring device of claim 1, wherein additional input is coupled to a temperature sensor, and the temperature sensor transmits temperature information to the energy monitoring device.

15. The energy monitoring device of claim 14, wherein the temperature sensor measures the temperature of one from the group consisting of a room on a property where the energy monitoring device is located, water in a hot water heater, air exiting a heating ventilating and air conditioning unit, steam in a steam pipe, air temperature outside of a structure where the energy monitoring device is located, air temperature inside of a structure where the energy monitoring device is located, inside a refrigerator, inside a freezer, temperature of a compressed gas storage, temperature of a compressed gas transmission line, and inside an oven.

16. The energy monitoring device of claim 1, wherein additional input is coupled to a weather sensor system and the weather sensor system transmits weather information to the energy monitoring device.

17. The energy monitoring device of claim 16, wherein weather information comprises one of: inches of rain, air speed, temperature in sun, temperature in shade, barometric pressure, and humidity.

18. The energy monitoring device of claim 3, wherein the energy monitoring device displays on the display device one of: electrical energy usage information, metering information for a metered commodity, home security information, temperature information, weather information, and any combination of these.

19. The energy monitoring device of claim 18, wherein the electrical energy usage information comprises one of aggregate power consumption information, energy, current, power factor, and total harmonic distortion (THD).

20. A method of determining energy used by an electrical device coupled to a power supply comprising:
receiving a first plurality of power supply parameters;
receiving a second plurality of power supply parameters;
detecting a change in at least one power supply parameter, as between the first and second plurality of power supply parameters;
computing a load signature for the electrical device based upon the first and second plurality of power supply parameters including, active power (P), total active power (PT), reactive power (Q), total reactive power (QT), RMS voltage (U), and a total active power spectrum (APS) comprising "n" values;
looking up the load signature of the electrical device in a memory including a first group of load signatures corresponding to a plurality of electrical devices predetermined to be most probable to yield a matching load signature, wherein the load signatures stored in the memory are associated with an electrical device identifier and a state of the electrical device associated with the load signature;
computing the energy used by the electrical device as a difference between the first and second plurality of power supply parameters, and;
associating the energy used with the electrical device.

21. The method of claim 20, wherein the first group is determined by a user storing a list of electrical devices defining the group in the energy monitoring device.

22. The method of claim 21, further comprising associating a probability to each load signature in the first group that the load signature will be a match for the load signature being looked up.

23. The method of claim 22, further comprising lowering the probability associated with a non-matching load signature that most nearly matches the load signature looked up.

24. The method of claim 23, wherein a load signature and electrical device are reclassified into a second group if the probability drops below a specified threshold.

25. The method of claim 20, further comprising correlating the load signature to be looked up with a load signature in the first group before comparing the load signature to be looked up against the load signature in the first group to determine if they are a match.

26. The method of claim 20, further comprising looking up the load signature in a second group of load signatures corresponding to a plurality of devices determined to have a lower probability of yielding a matching load signature than the first group.

27. The method of claim 20, wherein detecting a change in at least one power supply parameter comprises detecting a change in one of the active power, the reactive power, the apparent power, and the RMS current.

28. The method of claim 20, further comprising receiving additional power supply parameters after detecting the change in at least one power supply parameter, and before computing the load signature for the electrical device and the state.

29. The method of claim 20, wherein measuring a plurality of power supply parameters comprises measuring one of phase voltage, phase current, neutral voltage, neutral current, apparent power, cos(phi), period, frequency, active power, active energy, reactive energy, reactive power, frequency, period, over/under-voltage conditions, temperature, and humidity.

30. The method of claim 20, wherein the state of an electrical device is one of on, off, standby, power up, power down, a percentage of full power, and a named sequence of states.

31. The method of claim 20, wherein a load signature comprises one of phase voltage, phase current, neutral voltage, neutral current, apparent power, cos(phi), active power, active energy, reactive power, reactive energy, frequency, period, over/under-voltage conditions, percentage of power factor, RMS current, instantaneous current, RMS voltage, instantaneous voltage, current harmonic THD percentage, voltage harmonic THD percentage, reactive power harmonic THD percentage, active power harmonic THD percentage, spectral content of the current waveform, spectral content of the voltage waveform, spectral content of the active power waveform, spectral content of the reactive power waveform, quality of the network percentage, time, date, temperature, and humidity.

32. The method of claim 20, wherein computing the load signature for the electrical device and the state comprises the steps:
computing the active power, P, as the difference between the active power in the first power supply parameters and the active power in the second power supply parameters;
computing the total active power, PT, including all of the harmonics and noise in the total active power;
computing the reactive power, Q, as the difference between the reactive power in the first power supply parameters and the reactive power in the second power supply parameters;
computing the total reactive power, QT, including all of the harmonics and noise in the total reactive power;
computing the RMS voltage, U; and
computing the total active power spectrum, comprising "n" values.

33. The method of claim 32, further comprising:
computing the harmonics and noise in the total reactive power, QT_THD, as the difference between the total reactive power QT and the reactive power Q;
computing the harmonics and noise in the total active power, PT_THD, as the difference between the total active power PT and the active power P;
substituting QT_THD for QT in the load signature; and
substituting PT_THD for PT in the load signature.

34. The method of claim 20, further comprising correlating the data elements of the load signature with the data elements of a second load signature representing a second state of an electrical device capable of producing a continuously variable load.

35. The method of claim 20, further comprising transmitting energy usage information to one of a display device, and a remote device.

36. The method of claim 35, wherein energy monitoring information comprises one of electrical device information, power usage information, electrical network information, user advice, and power utility information.

37. The method of claim 35, wherein energy monitoring information is presented to the user by an application running on a consumer electronic device from the group consisting of: an a cell phone, a SmartPhone, a personal digital assistance, a portable computer, and a desktop computer.

* * * * *